United States Patent
Fike, III et al.

(10) Patent No.: US 8,520,285 B2
(45) Date of Patent: Aug. 27, 2013

(54) METHODS FOR MANUFACTURING COLD SEAL FLUID-FILLED DISPLAY APPARATUS

(75) Inventors: Eugene E. Fike, III, Amesbury, MA (US); Joyce H. Wu, Somerville, MA (US); Jasper Lodewyk Steyn, Winchester, MA (US); Jignesh Gandhi, Burlington, MA (US)

(73) Assignee: Pixtronix, Inc., Andover, MA (US)

( * ) Notice: Subject to any disclaimer, the term of this patent is extended or adjusted under 35 U.S.C. 154(b) by 221 days.

(21) Appl. No.: 13/019,015

(22) Filed: Feb. 1, 2011

(65) Prior Publication Data

US 2011/0157679 A1  Jun. 30, 2011

Related U.S. Application Data

(63) Continuation-in-part of application No. 12/221,606, filed on Aug. 4, 2008, now Pat. No. 7,920,317.

(60) Provisional application No. 61/300,731, filed on Feb. 2, 2010, provisional application No. 61/301,015, filed on Feb. 3, 2010.

(51) Int. Cl.
*G02F 1/03* (2006.01)
*G02F 1/1339* (2006.01)

(52) U.S. Cl.
USPC ........... 359/253; 359/228; 359/245; 359/272; 359/290; 359/292; 359/298; 349/153; 156/145

(58) Field of Classification Search
USPC ......... 359/228, 245, 252, 253, 272, 290–295, 359/298; 353/30; 349/8, 153, 155, 156; 445/24; 156/145, 146
See application file for complete search history.

(56) References Cited

U.S. PATENT DOCUMENTS

| 4,067,043 | A | 1/1978 | Perry |
| 4,074,253 | A | 2/1978 | Nadir |

(Continued)

FOREIGN PATENT DOCUMENTS

| CN | 1309782 A | 8/2001 |
| CN | 1390045 A | 1/2003 |

(Continued)

OTHER PUBLICATIONS

"BLU," Heesung Precision Ltd., http://www.hspr.co.kr/eng/product/blu.asp Retrieved on Aug. 3, 2006.

(Continued)

*Primary Examiner* — Loha Ben
(74) *Attorney, Agent, or Firm* — Ropes & Gray LLP

(57) ABSTRACT

This methods and devices described herein relate to displays and methods of manufacturing cold seal fluid-filled displays, including MEMS. The fluid substantially surrounds the moving components of the MEMS display to reduce the effects of stiction and to improve the optical and electromechanical performance of the display. The invention relates to a method for sealing a MEMS display at a lower temperature such that a vapor bubble does not formforms only at temperatures about 15° C. to about 20° C. below the seal temperature. In some embodiments, the MEMS display apparatus includes a first substrate, a second substrate separated from the first substrate by a gap and supporting an array of light modulators, a fluid substantially filling the gap, a plurality of spacers within the gap, and a sealing material joining the first substrate to the second substrate.

52 Claims, 21 Drawing Sheets

(56) References Cited

U.S. PATENT DOCUMENTS

| | | |
|---|---|---|
| 4,421,381 A * | 12/1983 | Ueda et al. ............... 359/214.1 |
| 4,559,535 A | 12/1985 | Watkins et al. |
| 4,564,836 A | 1/1986 | Vuilleumier et al. |
| 4,582,396 A | 4/1986 | Bos et al. |
| 4,673,253 A | 6/1987 | Tanabe et al. |
| 4,728,936 A | 3/1988 | Guscott et al. |
| 4,744,640 A | 5/1988 | Phillips |
| 4,889,603 A | 12/1989 | DiSanto et al. |
| 4,958,911 A | 9/1990 | Beiswenger et al. |
| 4,991,941 A | 2/1991 | Kalmanash |
| 5,005,108 A | 4/1991 | Pristash et al. |
| 5,025,346 A | 6/1991 | Tang et al. |
| 5,025,356 A | 6/1991 | Gawad |
| 5,042,900 A | 8/1991 | Parker |
| 5,044,734 A | 9/1991 | Sperl et al. |
| 5,050,946 A | 9/1991 | Hathaway et al. |
| 5,061,049 A | 10/1991 | Hornbeck |
| 5,062,689 A | 11/1991 | Koehler |
| 5,078,479 A | 1/1992 | Vuilleumier |
| 5,093,652 A | 3/1992 | Bull et al. |
| 5,096,279 A | 3/1992 | Hornbeck et al. |
| 5,128,787 A | 7/1992 | Blonder |
| 5,136,480 A | 8/1992 | Pristash et al. |
| 5,136,751 A | 8/1992 | Coyne et al. |
| 5,142,405 A | 8/1992 | Hornbeck |
| 5,184,248 A | 2/1993 | de Vaan et al. |
| 5,198,730 A | 3/1993 | Vancil |
| 5,202,950 A | 4/1993 | Arego et al. |
| 5,233,385 A | 8/1993 | Sampsell |
| 5,233,459 A | 8/1993 | Bozler et al. |
| 5,245,454 A | 9/1993 | Blonder |
| 5,278,652 A | 1/1994 | Urbanus et al. |
| 5,280,277 A | 1/1994 | Hornbeck |
| 5,319,061 A | 6/1994 | Ramaswamy |
| 5,319,491 A | 6/1994 | Selbrede |
| 5,339,116 A | 8/1994 | Urbanus et al. |
| 5,339,179 A | 8/1994 | Rudisill et al. |
| 5,359,345 A | 10/1994 | Hunter |
| 5,379,135 A | 1/1995 | Nakagaki et al. |
| 5,396,350 A | 3/1995 | Beeson et al. |
| 5,416,631 A | 5/1995 | Yagi |
| 5,440,197 A | 8/1995 | Gleckman |
| 5,452,024 A | 9/1995 | Sampsell |
| 5,461,411 A | 10/1995 | Florence et al. |
| 5,465,175 A | 11/1995 | Woodgate et al. |
| 5,467,104 A | 11/1995 | Furness, III et al. |
| 5,477,086 A | 12/1995 | Rostoker et al. |
| 5,479,279 A | 12/1995 | Barbier et al. |
| 5,491,347 A | 2/1996 | Allen et al. |
| 5,493,439 A | 2/1996 | Engle |
| 5,497,172 A | 3/1996 | Doherty et al. |
| 5,497,258 A | 3/1996 | Ju et al. |
| 5,499,127 A * | 3/1996 | Tsubota et al. ............... 349/153 |
| 5,504,389 A | 4/1996 | Dickey |
| 5,504,614 A | 4/1996 | Webb et al. |
| 5,510,824 A | 4/1996 | Nelson |
| 5,517,341 A | 5/1996 | Kim et al. |
| 5,517,347 A | 5/1996 | Sampsell |
| 5,519,565 A | 5/1996 | Kalt et al. |
| 5,523,803 A | 6/1996 | Urbanus et al. |
| 5,526,051 A | 6/1996 | Gove et al. |
| 5,528,262 A | 6/1996 | McDowall et al. |
| 5,548,301 A | 8/1996 | Kornher et al. |
| 5,548,670 A | 8/1996 | Koike |
| 5,552,925 A | 9/1996 | Worley |
| 5,559,389 A | 9/1996 | Spindt et al. |
| 5,568,964 A | 10/1996 | Parker et al. |
| 5,578,185 A | 11/1996 | Bergeron et al. |
| 5,579,035 A | 11/1996 | Beiswenger |
| 5,579,240 A | 11/1996 | Buus |
| 5,591,049 A | 1/1997 | Dohnishi |
| 5,596,339 A | 1/1997 | Furness, III et al. |
| 5,613,751 A | 3/1997 | Parker et al. |
| 5,618,096 A | 4/1997 | Parker et al. |
| 5,619,266 A | 4/1997 | Tomita et al. |
| 5,622,612 A | 4/1997 | Mihara et al. |
| 5,629,784 A | 5/1997 | Abileah et al. |
| 5,629,787 A * | 5/1997 | Tsubota et al. ............... 349/153 |
| 5,655,832 A | 8/1997 | Pelka et al. |
| 5,659,327 A | 8/1997 | Furness, III et al. |
| 5,666,226 A | 9/1997 | Ezra et al. |
| 5,677,749 A * | 10/1997 | Tsubota et al. ............... 349/160 |
| 5,684,354 A | 11/1997 | Gleckman |
| 5,687,465 A | 11/1997 | Hinata et al. |
| 5,691,695 A | 11/1997 | Lahiff |
| 5,694,227 A | 12/1997 | Starkweather |
| 5,724,062 A | 3/1998 | Hunter |
| 5,731,802 A | 3/1998 | Aras et al. |
| 5,745,193 A | 4/1998 | Urbanus et al. |
| 5,745,203 A | 4/1998 | Valliath et al. |
| 5,745,281 A | 4/1998 | Yi et al. |
| 5,745,284 A | 4/1998 | Goldberg et al. |
| 5,771,321 A | 6/1998 | Stern |
| 5,781,331 A | 7/1998 | Carr et al. |
| 5,781,333 A | 7/1998 | Lanzillotta et al. |
| 5,784,189 A | 7/1998 | Bozler et al. |
| 5,794,761 A | 8/1998 | Renaud et al. |
| 5,801,792 A | 9/1998 | Smith et al. |
| 5,808,800 A | 9/1998 | Handschy et al. |
| 5,810,469 A | 9/1998 | Weinreich |
| 5,835,255 A | 11/1998 | Miles |
| 5,835,256 A | 11/1998 | Huibers |
| 5,854,872 A | 12/1998 | Tai |
| 5,867,302 A | 2/1999 | Fleming |
| 5,876,107 A | 3/1999 | Parker et al. |
| 5,884,872 A | 3/1999 | Greenhalgh |
| 5,889,625 A | 3/1999 | Chen et al. |
| 5,894,686 A | 4/1999 | Parker et al. |
| 5,895,115 A | 4/1999 | Parker et al. |
| 5,921,652 A | 7/1999 | Parker et al. |
| 5,936,596 A | 8/1999 | Yoshida et al. |
| 5,943,223 A | 8/1999 | Pond |
| 5,953,469 A | 9/1999 | Zhou |
| 5,975,711 A | 11/1999 | Parker et al. |
| 5,986,628 A | 11/1999 | Tuenge et al. |
| 5,986,796 A | 11/1999 | Miles |
| 5,986,828 A | 11/1999 | Wood et al. |
| 5,990,990 A | 11/1999 | Crabtree |
| 5,995,688 A | 11/1999 | Aksyuk et al. |
| 6,008,781 A | 12/1999 | Furness, III et al. |
| 6,008,929 A | 12/1999 | Akimoto et al. |
| 6,028,656 A | 2/2000 | Buhrer et al. |
| 6,030,089 A | 2/2000 | Parker et al. |
| 6,034,807 A | 3/2000 | Little et al. |
| 6,040,796 A | 3/2000 | Matsugatani et al. |
| 6,040,937 A | 3/2000 | Miles |
| 6,046,840 A | 4/2000 | Huibers |
| 6,049,317 A | 4/2000 | Thompson et al. |
| 6,055,090 A | 4/2000 | Miles |
| 6,069,676 A | 5/2000 | Yuyama |
| 6,079,838 A | 6/2000 | Parker et al. |
| 6,130,735 A | 10/2000 | Hatanaka et al. |
| 6,137,313 A | 10/2000 | Wong et al. |
| 6,154,586 A | 11/2000 | MacDonald et al. |
| 6,158,867 A | 12/2000 | Parker et al. |
| 6,162,657 A | 12/2000 | Schiele et al. |
| 6,168,395 B1 | 1/2001 | Quenzer et al. |
| 6,172,657 B1 | 1/2001 | Kamakura et al. |
| 6,172,797 B1 | 1/2001 | Huibers |
| 6,174,064 B1 | 1/2001 | Kalantar et al. |
| 6,195,196 B1 | 2/2001 | Kimura et al. |
| 6,201,633 B1 | 3/2001 | Peeters et al. |
| 6,201,664 B1 | 3/2001 | Le et al. |
| 6,206,550 B1 | 3/2001 | Fukushima et al. |
| 6,219,119 B1 | 4/2001 | Nakai |
| 6,225,991 B1 | 5/2001 | McKnight |
| 6,227,677 B1 | 5/2001 | Willis |
| 6,249,269 B1 | 6/2001 | Blalock et al. |
| 6,249,370 B1 | 6/2001 | Takeuchi et al. |
| 6,266,240 B1 | 7/2001 | Urban et al. |
| 6,282,951 B1 | 9/2001 | Loga et al. |
| 6,285,270 B1 | 9/2001 | Lane et al. |
| 6,288,824 B1 | 9/2001 | Kastalsky |
| 6,288,829 B1 | 9/2001 | Kimura |

| | | |
|---|---|---|
| 6,296,383 B1 | 10/2001 | Henningsen |
| 6,300,154 B2 | 10/2001 | Clark et al. |
| 6,300,294 B1 | 10/2001 | Robbins et al. |
| 6,317,103 B1 | 11/2001 | Furness, III et al. |
| 6,323,834 B1 | 11/2001 | Colgan et al. |
| 6,329,967 B1 | 12/2001 | Little et al. |
| 6,329,974 B1 | 12/2001 | Walker et al. |
| 6,367,940 B1 | 4/2002 | Parker et al. |
| 6,388,661 B1 | 5/2002 | Richards |
| 6,392,736 B1 | 5/2002 | Furukawa et al. |
| 6,402,335 B1 | 6/2002 | Kalantar et al. |
| 6,404,942 B1 | 6/2002 | Edwards et al. |
| 6,407,851 B1 | 6/2002 | Islam et al. |
| 6,411,423 B2 | 6/2002 | Ham |
| 6,424,329 B1 | 7/2002 | Okita |
| 6,429,625 B1 | 8/2002 | LeFevre et al. |
| 6,459,467 B1 * | 10/2002 | Hashimoto et al. ............ 349/153 |
| 6,471,879 B2 | 10/2002 | Hanson et al. |
| 6,473,220 B1 | 10/2002 | Clikeman et al. |
| 6,476,886 B2 | 11/2002 | Krusius et al. |
| 6,483,613 B1 | 11/2002 | Woodgate et al. |
| 6,498,685 B1 | 12/2002 | Johnson |
| 6,504,985 B2 | 1/2003 | Parker et al. |
| 6,507,138 B1 | 1/2003 | Rodgers et al. |
| 6,508,563 B2 | 1/2003 | Parker et al. |
| 6,514,111 B2 | 2/2003 | Ebihara et al. |
| 6,523,961 B2 | 2/2003 | Ilkov et al. |
| 6,529,250 B1 | 3/2003 | Murakami et al. |
| 6,529,265 B1 | 3/2003 | Henningsen |
| 6,531,329 B2 | 3/2003 | Asakura et al. |
| 6,531,947 B1 | 3/2003 | Weaver et al. |
| 6,532,044 B1 | 3/2003 | Conner et al. |
| 6,535,256 B1 | 3/2003 | Ishihara et al. |
| 6,535,311 B1 | 3/2003 | Lindquist |
| 6,556,258 B1 | 4/2003 | Yoshida et al. |
| 6,556,261 B1 | 4/2003 | Krusius et al. |
| 6,559,827 B1 | 5/2003 | Mangerson |
| 6,567,063 B1 | 5/2003 | Okita |
| 6,567,138 B1 | 5/2003 | Krusius et al. |
| 6,574,033 B1 | 6/2003 | Chui et al. |
| 6,576,887 B2 | 6/2003 | Whitney et al. |
| 6,582,095 B1 | 6/2003 | Toyoda et al. |
| 6,583,915 B1 | 6/2003 | Hong et al. |
| 6,589,625 B1 | 7/2003 | Kothari et al. |
| 6,591,049 B2 | 7/2003 | Williams et al. |
| 6,593,677 B2 | 7/2003 | Behin et al. |
| 6,600,474 B1 | 7/2003 | Heines et al. |
| 6,626,540 B2 | 9/2003 | Ouchi et al. |
| 6,633,301 B1 | 10/2003 | Dallas et al. |
| 6,639,570 B2 | 10/2003 | Furness, III et al. |
| 6,639,572 B1 | 10/2003 | Little et al. |
| 6,650,455 B2 | 11/2003 | Miles |
| 6,650,822 B1 | 11/2003 | Zhou |
| 6,664,779 B2 | 12/2003 | Lopes et al. |
| 6,666,561 B1 | 12/2003 | Blakley |
| 6,671,078 B2 | 12/2003 | Flanders et al. |
| 6,674,562 B1 | 1/2004 | Miles |
| 6,677,709 B1 | 1/2004 | Ma et al. |
| 6,677,936 B2 | 1/2004 | Jacobsen et al. |
| 6,678,029 B2 | 1/2004 | Suzuki |
| 6,680,792 B2 | 1/2004 | Miles |
| 6,687,896 B2 | 2/2004 | Royce et al. |
| 6,690,422 B1 | 2/2004 | Daly et al. |
| 6,697,035 B2 | 2/2004 | Sugahara et al. |
| 6,698,349 B2 | 3/2004 | Komata |
| 6,701,039 B2 | 3/2004 | Bourgeois et al. |
| 6,707,176 B1 | 3/2004 | Rodgers |
| 6,710,008 B2 | 3/2004 | Chang et al. |
| 6,710,538 B1 | 3/2004 | Ahn et al. |
| 6,710,908 B2 | 3/2004 | Miles et al. |
| 6,710,920 B1 | 3/2004 | Mashitani et al. |
| 6,712,071 B1 | 3/2004 | Parker |
| 6,712,481 B2 | 3/2004 | Parker et al. |
| 6,731,355 B2 | 5/2004 | Miyashita |
| 6,731,492 B2 | 5/2004 | Goodwin-Johansson |
| 6,733,354 B1 | 5/2004 | Cathey et al. |
| 6,738,177 B1 | 5/2004 | Gutierrez et al. |
| 6,741,377 B2 | 5/2004 | Miles |
| 6,746,886 B2 | 6/2004 | Duncan et al. |
| 6,749,312 B2 | 6/2004 | Parker et al. |
| 6,750,930 B2 | 6/2004 | Yoshii et al. |
| 6,752,505 B2 | 6/2004 | Parker et al. |
| 6,755,534 B2 | 6/2004 | Veligdan et al. |
| 6,755,547 B2 | 6/2004 | Parker |
| 6,760,505 B1 | 7/2004 | Street et al. |
| 6,762,743 B2 | 7/2004 | Yoshihara et al. |
| 6,762,868 B2 | 7/2004 | Liu et al. |
| 6,764,796 B2 | 7/2004 | Fries |
| 6,774,964 B2 | 8/2004 | Funamoto et al. |
| 6,775,048 B1 | 8/2004 | Starkweather et al. |
| 6,778,228 B2 | 8/2004 | Murakami et al. |
| 6,778,248 B1 * | 8/2004 | Ootaguro et al. ............. 349/153 |
| 6,785,454 B2 | 8/2004 | Abe |
| 6,787,969 B2 | 9/2004 | Grade et al. |
| 6,788,371 B2 | 9/2004 | Tanada et al. |
| 6,794,119 B2 | 9/2004 | Miles |
| 6,795,064 B2 | 9/2004 | Walker et al. |
| 6,796,668 B2 | 9/2004 | Parker et al. |
| 6,798,935 B2 | 9/2004 | Bourgeois et al. |
| 6,800,996 B2 | 10/2004 | Nagai et al. |
| 6,809,851 B1 | 10/2004 | Gurcan |
| 6,819,386 B2 | 11/2004 | Roosendaal et al. |
| 6,819,465 B2 | 11/2004 | Clikeman et al. |
| 6,822,734 B1 | 11/2004 | Eidelman et al. |
| 6,825,470 B1 | 11/2004 | Bawolek et al. |
| 6,825,499 B2 | 11/2004 | Nakajima et al. |
| 6,827,456 B2 | 12/2004 | Parker et al. |
| 6,831,678 B1 | 12/2004 | Travis |
| 6,835,111 B2 | 12/2004 | Ahn et al. |
| 6,844,959 B2 | 1/2005 | Huibers et al. |
| 6,846,082 B2 | 1/2005 | Glent-Madsen et al. |
| 6,846,089 B2 | 1/2005 | Stevenson et al. |
| 6,847,425 B2 | 1/2005 | Tanada et al. |
| 6,852,095 B1 | 2/2005 | Ray |
| 6,857,751 B2 | 2/2005 | Penn et al. |
| 6,859,625 B2 | 2/2005 | Sawada |
| 6,862,072 B2 | 3/2005 | Liu et al. |
| 6,863,219 B1 | 3/2005 | Jacobsen et al. |
| 6,864,618 B2 | 3/2005 | Miller et al. |
| 6,867,192 B1 | 3/2005 | Armour et al. |
| 6,867,896 B2 | 3/2005 | Miles |
| 6,873,311 B2 | 3/2005 | Yoshihara et al. |
| 6,879,307 B1 | 4/2005 | Stern |
| 6,886,956 B2 | 5/2005 | Parker et al. |
| 6,887,202 B2 | 5/2005 | Currie et al. |
| 6,888,678 B2 | 5/2005 | Nishiyama et al. |
| 6,889,565 B2 | 5/2005 | DeConde et al. |
| 6,893,677 B2 | 5/2005 | Yamada et al. |
| 6,897,164 B2 | 5/2005 | Baude et al. |
| 6,897,843 B2 | 5/2005 | Ayres et al. |
| 6,900,072 B2 | 5/2005 | Patel et al. |
| 6,906,847 B2 | 6/2005 | Huibers et al. |
| 6,911,891 B2 | 6/2005 | Qiu et al. |
| 6,911,964 B2 | 6/2005 | Lee et al. |
| 6,912,082 B1 | 6/2005 | Lu et al. |
| 6,919,981 B2 | 7/2005 | Clikeman et al. |
| 6,934,080 B2 | 8/2005 | Saccomanno et al. |
| 6,936,968 B2 | 8/2005 | Cross et al. |
| 6,939,013 B2 | 9/2005 | Asao |
| 6,940,631 B2 | 9/2005 | Ishikawa |
| 6,943,495 B2 | 9/2005 | Ma et al. |
| 6,947,107 B2 | 9/2005 | Yoshii et al. |
| 6,947,195 B2 | 9/2005 | Ohtaka et al. |
| 6,950,240 B2 | 9/2005 | Matsuo |
| 6,952,301 B2 * | 10/2005 | Huibers ....................... 359/291 |
| 6,953,375 B2 | 10/2005 | Ahn et al. |
| 6,961,167 B2 | 11/2005 | Prins et al. |
| 6,962,419 B2 | 11/2005 | Huibers |
| 6,963,330 B2 | 11/2005 | Sugahara et al. |
| 6,965,375 B1 | 11/2005 | Gettemy et al. |
| 6,967,698 B2 | 11/2005 | Tanoue et al. |
| 6,967,763 B2 | 11/2005 | Fujii et al. |
| 6,969,635 B2 | 11/2005 | Patel et al. |
| 6,970,227 B2 | 11/2005 | Kida et al. |
| 6,977,710 B2 | 12/2005 | Akiyama et al. |
| 6,980,349 B1 | 12/2005 | Huibers et al. |
| 6,985,205 B2 | 1/2006 | Chol et al. |
| 6,992,375 B2 | 1/2006 | Robbins et al. |

| | | |
|---|---|---|
| 6,996,306 B2 | 2/2006 | Chen et al. |
| 7,004,610 B2 | 2/2006 | Yamashita et al. |
| 7,004,611 B2 | 2/2006 | Parker et al. |
| 7,012,726 B1 | 3/2006 | Miles |
| 7,012,732 B2 | 3/2006 | Miles |
| 7,014,349 B2 | 3/2006 | Shinohara et al. |
| 7,019,809 B2 | 3/2006 | Sekiguchi |
| 7,038,758 B2 | 5/2006 | Suzuki |
| 7,042,618 B2 | 5/2006 | Selbrede et al. |
| 7,042,643 B2 | 5/2006 | Miles |
| 7,046,221 B1 | 5/2006 | Malzbender |
| 7,046,905 B1 | 5/2006 | Gardiner et al. |
| 7,048,905 B2 | 5/2006 | Paparatto et al. |
| 7,050,035 B2 | 5/2006 | Iisaka et al. |
| 7,050,141 B2 | 5/2006 | Yokoue |
| 7,050,219 B2 | 5/2006 | Kimura |
| 7,057,790 B2 | 6/2006 | Selbrede |
| 7,060,895 B2 | 6/2006 | Kothari et al. |
| 7,071,611 B2 | 7/2006 | Yonekubo et al. |
| 7,072,096 B2 | 7/2006 | Holman et al. |
| 7,075,702 B2 | 7/2006 | Huibers et al. |
| 7,092,142 B2 | 8/2006 | Selebrede et al. |
| 7,110,158 B2 | 9/2006 | Miles |
| 7,116,464 B2 | 10/2006 | Osawa |
| 7,119,944 B2 | 10/2006 | Patel et al. |
| 7,123,216 B1 | 10/2006 | Miles |
| 7,123,796 B2 | 10/2006 | Steckl et al. |
| 7,126,738 B2 | 10/2006 | Miles |
| 7,140,751 B2 | 11/2006 | Lin |
| 7,156,548 B2 | 1/2007 | Teng et al. |
| 7,161,094 B2 | 1/2007 | Kothari et al. |
| 7,164,250 B2 | 1/2007 | Boscolo et al. |
| 7,184,202 B2 | 2/2007 | Miles et al. |
| 7,198,982 B2 | 4/2007 | Patel et al. |
| 7,199,916 B2 | 4/2007 | Faase et al. |
| 7,215,459 B2 | 5/2007 | Huibers et al. |
| 7,217,588 B2 | 5/2007 | Hartzell et al. |
| 7,227,677 B2 | 6/2007 | Ravnkilde et al. |
| 7,271,945 B2 | 9/2007 | Hagood et al. |
| 7,274,416 B2 | 9/2007 | Feenstra et al. |
| 7,291,363 B2 | 11/2007 | Miller |
| 7,298,448 B2 | 11/2007 | Wu |
| 7,304,785 B2 | 12/2007 | Hagood et al. |
| 7,304,786 B2 | 12/2007 | Hagood et al. |
| 7,315,294 B2 | 1/2008 | Richards |
| 7,365,897 B2 | 4/2008 | Hagood et al. |
| 7,374,328 B2 | 5/2008 | Kuroda et al. |
| 7,391,493 B2 | 6/2008 | Kim |
| 7,391,552 B2 | 6/2008 | Barton et al. |
| 7,405,852 B2 | 7/2008 | Brosnihan et al. |
| 7,417,782 B2 | 8/2008 | Hagood et al. |
| 7,460,290 B2 | 12/2008 | Hagood, IV et al. |
| 7,463,227 B2 | 12/2008 | Van Gorkom |
| 7,502,159 B2 | 3/2009 | Hagood, IV et al. |
| 7,529,012 B2 | 5/2009 | Hayes et al. |
| 7,551,344 B2 | 6/2009 | Hagood et al. |
| 7,573,547 B2 * | 8/2009 | Palmateer et al. ............ 349/106 |
| 7,666,049 B2 | 2/2010 | Saito et al. |
| 7,675,665 B2 * | 3/2010 | Hagood et al. ................ 359/233 |
| 7,715,080 B2 * | 5/2010 | Natarajan et al. ............. 359/245 |
| 7,742,215 B2 * | 6/2010 | Hagood, IV .................. 359/233 |
| 7,746,529 B2 * | 6/2010 | Hagood et al. ................ 359/233 |
| 7,826,127 B2 * | 11/2010 | Khonsari et al. .............. 359/291 |
| 7,920,317 B2 | 4/2011 | Lee et al. |
| 2001/0001260 A1 | 5/2001 | Parker et al. |
| 2001/0028993 A1 | 10/2001 | Sanford |
| 2001/0040538 A1 | 11/2001 | Quanrud |
| 2001/0043177 A1 | 11/2001 | Huston et al. |
| 2001/0043208 A1 | 11/2001 | Furness et al. |
| 2001/0048265 A1 | 12/2001 | Miller et al. |
| 2001/0048431 A1 | 12/2001 | Laffargue et al. |
| 2001/0053075 A1 | 12/2001 | Parker et al. |
| 2002/0000959 A1 | 1/2002 | Colgan et al. |
| 2002/0001051 A1 | 1/2002 | Krusius et al. |
| 2002/0009275 A1 | 1/2002 | Williams et al. |
| 2002/0015215 A1 | 2/2002 | Miles |
| 2002/0024641 A1 | 2/2002 | Ilkov et al. |
| 2002/0024711 A1 | 2/2002 | Miles |
| 2002/0047172 A1 | 4/2002 | Reid |
| 2002/0054424 A1 | 5/2002 | Miles |
| 2002/0054487 A1 | 5/2002 | Parker et al. |
| 2002/0056900 A1 | 5/2002 | Liu et al. |
| 2002/0063218 A1 | 5/2002 | Maydanich et al. |
| 2002/0063661 A1 | 5/2002 | Comiskey et al. |
| 2002/0070931 A1 | 6/2002 | Ishikawa |
| 2002/0075555 A1 | 6/2002 | Miles |
| 2002/0080598 A1 | 6/2002 | Parker et al. |
| 2002/0093722 A1 | 7/2002 | Chan et al. |
| 2002/0109903 A1 | 8/2002 | Kaeriyama |
| 2002/0113281 A1 | 8/2002 | Cunningham et al. |
| 2002/0126364 A1 | 9/2002 | Miles |
| 2002/0126387 A1 | 9/2002 | Ishikawa et al. |
| 2002/0132389 A1 | 9/2002 | Patel et al. |
| 2002/0141174 A1 | 10/2002 | Parker et al. |
| 2002/0149828 A1 | 10/2002 | Miles et al. |
| 2002/0163482 A1 | 11/2002 | Sullivan |
| 2002/0163484 A1 | 11/2002 | Furness et al. |
| 2002/0163709 A1 | 11/2002 | Mirza |
| 2002/0171327 A1 | 11/2002 | Miller et al. |
| 2002/0181597 A1 | 12/2002 | Okada |
| 2002/0185699 A1 | 12/2002 | Reid |
| 2002/0191267 A1 | 12/2002 | Flanders et al. |
| 2002/0195423 A1 | 12/2002 | Patel et al. |
| 2002/0196522 A1 | 12/2002 | Little et al. |
| 2003/0001815 A1 | 1/2003 | Cui |
| 2003/0007344 A1 | 1/2003 | Parker |
| 2003/0009898 A1 | 1/2003 | Slocum et al. |
| 2003/0023110 A1 | 1/2003 | Tam et al. |
| 2003/0029705 A1 | 2/2003 | Qiu et al. |
| 2003/0036215 A1 | 2/2003 | Reid |
| 2003/0043157 A1 | 3/2003 | Miles |
| 2003/0043337 A1 | 3/2003 | Takabayashi |
| 2003/0048036 A1 | 3/2003 | Lemkin |
| 2003/0058543 A1 | 3/2003 | Sheedy et al. |
| 2003/0063233 A1 | 4/2003 | Takagi |
| 2003/0063234 A1 | 4/2003 | Oda et al. |
| 2003/0068118 A1 | 4/2003 | Bourgeois et al. |
| 2003/0071686 A1 | 4/2003 | Lemkin |
| 2003/0072070 A1 | 4/2003 | Miles |
| 2003/0076649 A1 | 4/2003 | Speakman |
| 2003/0081315 A1 | 5/2003 | Kobayashi |
| 2003/0081402 A1 | 5/2003 | Jeon et al. |
| 2003/0085650 A1 | 5/2003 | Cathey et al. |
| 2003/0085867 A1 | 5/2003 | Grabert |
| 2003/0095081 A1 | 5/2003 | Furness et al. |
| 2003/0095398 A1 | 5/2003 | Parker et al. |
| 2003/0102810 A1 | 6/2003 | Cross et al. |
| 2003/0123245 A1 | 7/2003 | Parker et al. |
| 2003/0123246 A1 | 7/2003 | Parker |
| 2003/0123247 A1 | 7/2003 | Parker et al. |
| 2003/0128218 A1 | 7/2003 | Struyk |
| 2003/0133284 A1 | 7/2003 | Chipchase et al. |
| 2003/0137499 A1 | 7/2003 | Iisaka |
| 2003/0152872 A1 | 8/2003 | Miles |
| 2003/0156422 A1 | 8/2003 | Tatewaki et al. |
| 2003/0174422 A1 | 9/2003 | Miller et al. |
| 2003/0174931 A1 | 9/2003 | Rodgers et al. |
| 2003/0183008 A1 | 10/2003 | Bang et al. |
| 2003/0184189 A1 | 10/2003 | Sinclair |
| 2003/0190535 A1 | 10/2003 | Fries |
| 2003/0190536 A1 | 10/2003 | Fries |
| 2003/0196590 A1 | 10/2003 | Hartzell |
| 2003/0202338 A1 | 10/2003 | Parker |
| 2003/0210811 A1 | 11/2003 | Dubowsky et al. |
| 2003/0231160 A1 | 12/2003 | Yoshihara et al. |
| 2004/0012946 A1 | 1/2004 | Parker et al. |
| 2004/0027636 A1 | 2/2004 | Miles |
| 2004/0051929 A1 | 3/2004 | Sampsell et al. |
| 2004/0058532 A1 | 3/2004 | Miles et al. |
| 2004/0076008 A1 | 4/2004 | Ikeda |
| 2004/0080240 A1 | 4/2004 | Miller et al. |
| 2004/0080484 A1 | 4/2004 | Heines et al. |
| 2004/0080927 A1 | 4/2004 | Parker et al. |
| 2004/0085749 A1 | 5/2004 | Parker et al. |
| 2004/0090144 A1 | 5/2004 | Miller et al. |
| 2004/0095739 A1 | 5/2004 | Parker et al. |
| 2004/0100677 A1 | 5/2004 | Huibers et al. |
| 2004/0113903 A1 | 6/2004 | Mikami et al. |

| | | | | | | |
|---|---|---|---|---|---|---|
| 2004/0114346 A1 | 6/2004 | Parker et al. | | 2005/0225519 A1 | 10/2005 | Naugler |
| 2004/0122328 A1 | 6/2004 | Wang et al. | | 2005/0225732 A1 | 10/2005 | Conner et al. |
| 2004/0125062 A1 | 7/2004 | Yamamoto et al. | | 2005/0225827 A1 | 10/2005 | Kastalsky |
| 2004/0125346 A1 | 7/2004 | Huibers | | 2005/0231790 A1 | 10/2005 | Miles |
| 2004/0135273 A1 | 7/2004 | Parker et al. | | 2005/0231791 A1 | 10/2005 | Sampsell et al. |
| 2004/0135951 A1 | 7/2004 | Stumbo et al. | | 2005/0237596 A1 | 10/2005 | Selbrede |
| 2004/0136204 A1 | 7/2004 | Asao | | 2005/0242710 A1 | 11/2005 | Yamazaki et al. |
| 2004/0136680 A1 | 7/2004 | Medina et al. | | 2005/0243023 A1 | 11/2005 | Reddy et al. |
| 2004/0145580 A1 | 7/2004 | Perlman | | 2005/0244099 A1 | 11/2005 | Pasch et al. |
| 2004/0145854 A1 | 7/2004 | Tamura | | 2005/0244949 A1 | 11/2005 | Miles |
| 2004/0157664 A1 | 8/2004 | Link | | 2005/0245313 A1 | 11/2005 | Yoshino et al. |
| 2004/0165372 A1 | 8/2004 | Parker | | 2005/0247477 A1 | 11/2005 | Kothari et al. |
| 2004/0171206 A1 | 9/2004 | Rodgers | | 2005/0249966 A1 | 11/2005 | Tung et al. |
| 2004/0173872 A1 | 9/2004 | Park et al. | | 2005/0253779 A1 | 11/2005 | Feenstra et al. |
| 2004/0179146 A1 | 9/2004 | Nilsson | | 2005/0254115 A1 | 11/2005 | Palmateer et al. |
| 2004/0196215 A1 | 10/2004 | Duthaler et al. | | 2005/0258571 A1 | 11/2005 | Dumond et al. |
| 2004/0196525 A1 | 10/2004 | Fujii et al. | | 2005/0259198 A1 | 11/2005 | Lubart et al. |
| 2004/0207768 A1 | 10/2004 | Liu | | 2005/0263866 A1 | 12/2005 | Wan |
| 2004/0207815 A1 | 10/2004 | Allen et al. | | 2005/0265029 A1 | 12/2005 | Epstein et al. |
| 2004/0218149 A1 | 11/2004 | Huibers | | 2005/0275072 A1 | 12/2005 | Haluzak et al. |
| 2004/0218154 A1 | 11/2004 | Huibers | | 2005/0285816 A1 | 12/2005 | Glass |
| 2004/0218292 A1 | 11/2004 | Huibers | | 2005/0286113 A1 | 12/2005 | Miles |
| 2004/0218293 A1 | 11/2004 | Huibers | | 2005/0286114 A1 | 12/2005 | Miles |
| 2004/0223088 A1 | 11/2004 | Huibers | | 2006/0001942 A1 | 1/2006 | Chui et al. |
| 2004/0223240 A1 | 11/2004 | Huibers | | 2006/0003676 A1 | 1/2006 | Bernard et al. |
| 2004/0227428 A1 | 11/2004 | Sinclair | | 2006/0004928 A1 | 1/2006 | Hess et al. |
| 2004/0233392 A1 | 11/2004 | Huibers | | 2006/0007514 A1 | 1/2006 | Desai |
| 2004/0240032 A1 | 12/2004 | Miles | | 2006/0007701 A1 | 1/2006 | Schoellmann et al. |
| 2004/0246275 A1 | 12/2004 | Yoshihara et al. | | 2006/0028708 A1 | 2/2006 | Miles |
| 2004/0263076 A1 | 12/2004 | De Zwart et al. | | 2006/0028811 A1 | 2/2006 | Ross et al. |
| 2004/0263502 A1 | 12/2004 | Dallas et al. | | 2006/0028817 A1 | 2/2006 | Parker |
| 2004/0263944 A1 | 12/2004 | Miles et al. | | 2006/0028840 A1 | 2/2006 | Parker |
| 2005/0002082 A1 | 1/2005 | Miles | | 2006/0028841 A1 | 2/2006 | Parker |
| 2005/0002086 A1 | 1/2005 | Starkweather et al. | | 2006/0028843 A1 | 2/2006 | Parker |
| 2005/0007759 A1 | 1/2005 | Parker | | 2006/0028844 A1 | 2/2006 | Parker |
| 2005/0012197 A1 | 1/2005 | Smith et al. | | 2006/0033676 A1 | 2/2006 | Faase et al. |
| 2005/0024849 A1 | 2/2005 | Parker et al. | | 2006/0033975 A1 | 2/2006 | Miles |
| 2005/0052681 A1 | 3/2005 | Kogi | | 2006/0038766 A1 | 2/2006 | Morita |
| 2005/0059184 A1 | 3/2005 | Sniegowski et al. | | 2006/0044246 A1 | 3/2006 | Mignard |
| 2005/0062708 A1 | 3/2005 | Yoshihara et al. | | 2006/0044298 A1 | 3/2006 | Mignard et al. |
| 2005/0063037 A1 | 3/2005 | Selebrede et al. | | 2006/0044508 A1 | 3/2006 | Mochizuki |
| 2005/0072032 A1 | 4/2005 | McCollum et al. | | 2006/0044928 A1 | 3/2006 | Chui et al. |
| 2005/0073471 A1 | 4/2005 | Selbrede | | 2006/0061559 A1 | 3/2006 | King |
| 2005/0088404 A1 | 4/2005 | Heines et al. | | 2006/0066540 A1 | 3/2006 | Hewlett et al. |
| 2005/0093465 A1 | 5/2005 | Yonekubo et al. | | 2006/0066560 A1 | 3/2006 | Gally et al. |
| 2005/0094240 A1 | 5/2005 | Huibers et al. | | 2006/0066598 A1 | 3/2006 | Floyd |
| 2005/0094418 A1 | 5/2005 | Parker | | 2006/0066934 A1 | 3/2006 | Selbrede |
| 2005/0104804 A1 | 5/2005 | Feenstra et al. | | 2006/0066937 A1 | 3/2006 | Chui |
| 2005/0111238 A1 | 5/2005 | Parker | | 2006/0077125 A1 | 4/2006 | Floyd |
| 2005/0111241 A1 | 5/2005 | Parker | | 2006/0077153 A1 | 4/2006 | Cummings et al. |
| 2005/0116798 A1 | 6/2005 | Bintoro et al. | | 2006/0077533 A1 | 4/2006 | Miles et al. |
| 2005/0122560 A1 | 6/2005 | Sampsell et al. | | 2006/0092490 A1 | 5/2006 | McCollum et al. |
| 2005/0122591 A1 | 6/2005 | Parker et al. | | 2006/0104061 A1 | 5/2006 | Lerner et al. |
| 2005/0123243 A1 | 6/2005 | Steckl et al. | | 2006/0132383 A1 | 6/2006 | Gally et al. |
| 2005/0128370 A1 | 6/2005 | Moon | | 2006/0132404 A1 | 6/2006 | Hayes et al. |
| 2005/0134805 A1 | 6/2005 | Conner et al. | | 2006/0139734 A1 | 6/2006 | Selebrede et al. |
| 2005/0141076 A1 | 6/2005 | Bausenwein et al. | | 2006/0146389 A1 | 7/2006 | Selbrede |
| 2005/0151940 A1 | 7/2005 | Asao | | 2006/0152476 A1 | 7/2006 | Van Gorkom et al. |
| 2005/0157365 A1 | 7/2005 | Ravnkilde et al. | | 2006/0154078 A1 | 7/2006 | Watanabe et al. |
| 2005/0157376 A1 | 7/2005 | Huibers et al. | | 2006/0172745 A1 | 8/2006 | Knowles |
| 2005/0168431 A1 | 8/2005 | Chui | | 2006/0187190 A1 | 8/2006 | Hagood et al. |
| 2005/0168789 A1 | 8/2005 | Glent-Madsen | | 2006/0187191 A1 | 8/2006 | Hagood et al. |
| 2005/0171408 A1 | 8/2005 | Parker | | 2006/0187528 A1 | 8/2006 | Hagood et al. |
| 2005/0172625 A1 | 8/2005 | Starkweather et al. | | 2006/0209000 A1 | 9/2006 | Sumiyoshi et al. |
| 2005/0179977 A1 | 8/2005 | Chui et al. | | 2006/0209012 A1 | 9/2006 | Hagood |
| 2005/0195467 A1 | 9/2005 | Kothari et al. | | 2006/0238443 A1 | 10/2006 | Derichs |
| 2005/0195468 A1 | 9/2005 | Sampsell | | 2006/0250325 A1 | 11/2006 | Hagood et al. |
| 2005/0206991 A1 | 9/2005 | Chui et al. | | 2006/0250676 A1 | 11/2006 | Hagood |
| 2005/0207154 A1 | 9/2005 | Parker | | 2006/0256039 A1 | 11/2006 | Hagood et al. |
| 2005/0207178 A1 | 9/2005 | Parker | | 2006/0262060 A1 | 11/2006 | Amundson |
| 2005/0212734 A1 | 9/2005 | Kimura | | 2006/0262380 A1 | 11/2006 | Miles |
| 2005/0212738 A1 | 9/2005 | Gally | | 2006/0268386 A1 | 11/2006 | Selbrede et al. |
| 2005/0213183 A9 | 9/2005 | Miles | | 2006/0268568 A1 | 11/2006 | Oku et al. |
| 2005/0213322 A1 | 9/2005 | Parker | | 2006/0270179 A1 | 11/2006 | Yang |
| 2005/0213323 A1 | 9/2005 | Parker | | 2006/0280319 A1 | 12/2006 | Wang et al. |
| 2005/0213349 A1 | 9/2005 | Parker | | 2006/0291034 A1 | 12/2006 | Patry et al. |
| 2005/0219679 A1 | 10/2005 | Ishikawa | | 2006/0291771 A1 | 12/2006 | Braunisch et al. |
| 2005/0219680 A1 | 10/2005 | Ishikawa | | 2006/0291774 A1 | 12/2006 | Schoellmann et al. |
| 2005/0225501 A1 | 10/2005 | Srinivasan et al. | | 2007/0002156 A1 | 1/2007 | Hagood et al. |

| | | | |
|---|---|---|---|
| 2007/0002413 A1 | 1/2007 | Psaltis et al. | |
| 2007/0007889 A1 | 1/2007 | Bongaerts et al. | |
| 2007/0030555 A1 | 2/2007 | Barton et al. | |
| 2007/0031097 A1 | 2/2007 | Heikenfeld et al. | |
| 2007/0035808 A1 | 2/2007 | Amundson et al. | |
| 2007/0040982 A1 | 2/2007 | Nakano et al. | |
| 2007/0047051 A1 | 3/2007 | Selbrede et al. | |
| 2007/0047887 A1 | 3/2007 | Selbrede | |
| 2007/0052660 A1 | 3/2007 | Montbach et al. | |
| 2007/0053652 A1 | 3/2007 | Mignard et al. | |
| 2007/0086078 A1 | 4/2007 | Hagood et al. | |
| 2007/0091011 A1 | 4/2007 | Selbrede | |
| 2007/0091038 A1 | 4/2007 | Hagood et al. | |
| 2007/0150813 A1 | 6/2007 | Selebrede et al. | |
| 2007/0159679 A1 | 7/2007 | Hagood et al. | |
| 2007/0172171 A1 | 7/2007 | Van Ostrand et al. | |
| 2007/0190265 A1 | 8/2007 | Aoki et al. | |
| 2007/0195026 A1 | 8/2007 | Hagood et al. | |
| 2007/0205969 A1 | 9/2007 | Hagood et al. | |
| 2007/0216987 A1 | 9/2007 | Hagood et al. | |
| 2007/0223080 A1 | 9/2007 | Hagood et al. | |
| 2007/0247401 A1 | 10/2007 | Sasagawa et al. | |
| 2007/0279727 A1 | 12/2007 | Gandhi et al. | |
| 2007/0297747 A1 | 12/2007 | Biernath et al. | |
| 2008/0026066 A1 | 1/2008 | Roser | |
| 2008/0030827 A1 | 2/2008 | Hagood et al. | |
| 2008/0037104 A1 | 2/2008 | Hagood et al. | |
| 2008/0062500 A1 | 3/2008 | Hagood | |
| 2008/0094853 A1 | 4/2008 | Kim et al. | |
| 2008/0123175 A1 | 5/2008 | Hagood et al. | |
| 2008/0129681 A1 | 6/2008 | Hagood et al. | |
| 2008/0145527 A1 | 6/2008 | Hagood et al. | |
| 2008/0158635 A1 | 7/2008 | Hagood et al. | |
| 2008/0158636 A1 | 7/2008 | Hagood et al. | |
| 2008/0165122 A1 | 7/2008 | Duthaler et al. | |
| 2008/0174532 A1 | 7/2008 | Lewis | |
| 2008/0278798 A1 | 11/2008 | Hagood et al. | |
| 2008/0279727 A1 | 11/2008 | Haushalter | |
| 2008/0283175 A1 | 11/2008 | Hagood et al. | |
| 2008/0297880 A1 | 12/2008 | Steckl et al. | |
| 2009/0034052 A1 | 2/2009 | Hagood et al. | |
| 2009/0103164 A1 | 4/2009 | Fijol et al. | |
| 2009/0141335 A1 | 6/2009 | Feenstra et al. | |
| 2009/0284824 A1 | 11/2009 | Feenstra et al. | |

FOREIGN PATENT DOCUMENTS

| | | |
|---|---|---|
| CN | 1402033 A | 3/2003 |
| CN | 1452499 A | 10/2003 |
| CN | 1555472 A | 12/2004 |
| DE | 10332647 A1 | 2/2005 |
| EP | 0359450 A2 | 3/1990 |
| EP | 0366847 A2 | 5/1990 |
| EP | 0415625 A2 | 3/1991 |
| EP | 0438614 A1 | 7/1991 |
| EP | 0495273 A1 | 7/1992 |
| EP | 0751340 A2 | 1/1997 |
| EP | 0 786 679 A2 | 7/1997 |
| EP | 0884525 A2 | 12/1998 |
| EP | 1091342 A2 | 4/2001 |
| EP | 1093142 A2 | 4/2001 |
| EP | 1202096 A2 | 5/2002 |
| EP | 1 429 310 | 6/2004 |
| EP | 1426190 A1 | 6/2004 |
| EP | 1 471 495 | 10/2004 |
| EP | 1 533 853 A2 | 5/2005 |
| EP | 1551002 A2 | 7/2005 |
| EP | 1640770 A2 | 3/2006 |
| EP | 1674893 A1 | 6/2006 |
| EP | 1734502 | 12/2006 |
| EP | 1757958 A1 | 2/2007 |
| EP | 2287110 A2 | 2/2011 |
| FR | 2726135 A1 | 4/1996 |
| GB | 2343980 A | 5/2000 |
| JP | 57062028 A | 4/1982 |
| JP | 03142409 A | 6/1991 |
| JP | 04249203 A | 9/1992 |
| JP | 09-080386 A | 3/1997 |
| JP | 09189869 A | 7/1997 |
| JP | 09198906 A | 7/1997 |
| JP | 10-282474 A | 10/1998 |
| JP | 11015393 A | 1/1999 |
| JP | 11024038 A | 1/1999 |
| JP | 2000-121970 A | 4/2000 |
| JP | 2001175216 A | 6/2001 |
| JP | 2001-201698 A | 7/2001 |
| JP | 2001-281563 A | 10/2001 |
| JP | 2002214543 A | 7/2002 |
| JP | 20025-28763 A | 9/2002 |
| JP | 2002318564 A | 10/2002 |
| JP | 2002365650 A | 12/2002 |
| JP | 2003036057 A | 2/2003 |
| JP | 2003162904 A | 6/2003 |
| JP | 2003248463 A | 9/2003 |
| JP | 2004-191736 A | 7/2004 |
| JP | 2004267215 A | 10/2004 |
| JP | 2004-317785 A | 11/2004 |
| JP | 2005512119 A | 4/2005 |
| JP | 2006522360 A | 9/2006 |
| WO | WO-9401716 A1 | 1/1994 |
| WO | WO-97/04436 | 2/1997 |
| WO | WO-9804950 A1 | 2/1998 |
| WO | WO-9901696 A1 | 1/1999 |
| WO | WO-0050807 A1 | 8/2000 |
| WO | WO-0052674 A1 | 9/2000 |
| WO | WO-0055916 A1 | 9/2000 |
| WO | WO-0169584 A1 | 9/2001 |
| WO | WO-0207482 A2 | 1/2002 |
| WO | WO-03/007049 | 1/2003 |
| WO | WO-03004836 A1 | 1/2003 |
| WO | WO-03008860 A1 | 1/2003 |
| WO | WO-03040802 A2 | 5/2003 |
| WO | WO-03048836 A2 | 6/2003 |
| WO | WO-03050448 A1 | 6/2003 |
| WO | WO-03061329 A2 | 7/2003 |
| WO | WO-03069593 A2 | 8/2003 |
| WO | WO-03081315 A1 | 10/2003 |
| WO | WO-2004008629 A1 | 1/2004 |
| WO | WO-2004019120 A1 | 3/2004 |
| WO | WO-2004034136 A1 | 4/2004 |
| WO | WO-2004/088629 | 10/2004 |
| WO | WO-2004086098 A2 | 10/2004 |
| WO | WO 2004088629 A1 | 10/2004 |
| WO | WO-2005001892 A2 | 1/2005 |
| WO | WO-2005062908 A2 | 7/2005 |
| WO | WO-2005/073950 | 8/2005 |
| WO | WO-2005082908 A1 | 9/2005 |
| WO | WO-2006017129 A2 | 2/2006 |
| WO | WO-2006023077 A2 | 3/2006 |
| WO | WO-2006039315 A2 | 4/2006 |
| WO | WO-2006052755 A2 | 5/2006 |
| WO | WO-2006091791 A2 | 8/2006 |
| WO | WO-2006091904 A2 | 8/2006 |
| WO | WO-2007075832 A2 | 7/2007 |
| WO | WO-2007123173 A1 | 11/2007 |
| WO | WO-2007145973 A2 | 12/2007 |
| WO | WO-2008026066 A1 | 3/2008 |

OTHER PUBLICATIONS

"Electronic Display Lighting Tutorials," 3M Corporation, file?//D:/Optical\Vikuiti Tutorial.htm. retrieved on Aug. 10, 2006.

"Nano™ Su-8 2000 Negative Tone Photoresist Formulations 2002-2025," Micro Chem.

"Prism Brightness Enhancement Films," 3M Corporation, http://products3.3m.com/catalog/us/en001/electronics_mfg/vikuiti/node_V6G78RBQ5Tbe/root_GST1T4S9TCgv/vroot_S6Q2FD9X0Jge/gvel_GD378D0HGJgl/theme_us_vikuiti_3_0/command_AbcPageHandler/output_html Retrieved on Aug. 3, 2006.

"Prism Sheet," Mitsubishi Rayon America Inc., http://www.mrany.com/data/HTML/29.htm Retrieved on Aug. 4, 2006.

Akimoto et al, "15.1: A 0.9-in UXGA/HDTV FLC Microdisplay," SID 00 Digest, 194-197(2000).

Alt et al, "A Gray-Scale Addressing Technique for Thin-Film-Transistor/Liquid Crystal Displays," IBM J. Res. Develop., 36(1):11-22(Jan. 1992).

Bergquist et. al. "Field Sequential Colour Display with Adaptive Gamut", Society for Information Display, Digest of Technical Papers 2006, p. 1594.

Birch et al, "31.1: SXGA Resolution FLC Microdisplays," SID 02 Digest, 954-957(2002).

Blackstone, "Making MEMS Reliable," SPIE's OEMagazine, 32-34(Sep. 2002).

Boeuf, "Plasma display panels: physics, recent developments and key issues," J. Phys. D: Appl, Phys., 36:R53-R79(2003).

Bouchina, M., et al, "Air-gam amorphous silicon thin film transistors," Applied Physics Letters, 73(4):502-4 (1998).

Bozler et al, "Arrays of gated field-emitter cones having 0.32 m tip-to-tip spacing," J. Vec. Sci. Technol. B, 12(2):629-632(Mar./Apr. 1994).

Bryan-Brown, "Ultra Low Poer Bistable LCDs," SID 00, 76-79(2000).

Chino et. al. "Development of Wide-Color-Gamut Mobile Displays with Four-Primary-Color LCDs", Society of Information Display, Digest of Technical Papers 2006, p. 1221.

Clark et al, "FLC Microdisplays," Ferroelectrics, 246:97-110(2000).

Conde, J.P., et al., "Low-temperature Thin-Film Silicon MEMS", Thin Solid Films 421:181-186 (2003).

Conde, J.P., et. al., "Amorphous and microcrystalline silicon deposited by hot-wire chemical vapor deposition at low substrate temperatures: application to devices and thin-film microelectromechanical systems," Thin Solid Films 395:105-111 (2001).

Davis, "Light Emitting Diode Source Modeling for Optical Design," Reflexite Display Optics(Oct. 2004).

den Boer, "Active Matrix Liquid Crystal Displays," Elsevier Science & Technology Books, ISBN #0750678135, Aug. 2005.

Doane, et al, "Display Technologies in Russia, Ukraine, and Belarus," World Technology Evaluation Center Panel Report (Dec. 1994).

Doherty, D. et. al. "Pulse Width Modulation Control of DLP Projectors", TI Technical Journal 1998, No. 3, p. 115.

Feenstra et al, "Electrowetting Displays," Liquavista BV, http://www.liquavista.com/documents/electrowetting_displays_whitepaper.pdf, Retrieved on Aug. 17, 2006.

Feenstra et. al. "A Reflective Display Based on Electrowetting: Principle and Properties", International Display Research Conference Proceedings 2003, p. 322.

Feng et al, "Novel integrated light-guide plates for liquid crystal display backlight," J. Opt. A: Pure Appl. Opt., 7:111-117(2005).

Feng, "High Quality Light Guide Plates that Can Control the Illumination Angle Based on Microprism Structures," Applied Physics Letters, 85(24):6016-6018(Dec. 2004).

Final Office Action dated May 18, 2007, U.S. Appl. No. 11/218,690.
Final Office Action dated Sep. 21, 2007, U.S. Appl. No. 11/546,937.
Final Office ActionDated Oct. 3, 2007, U.S. Appl. No. 11/218,690.

Foley, "NE04-21: Microstructured Plastic Optics for Display, Lighting, and Telecommunications Applications," Fresnel Optics(2001).

Funamoto et al, "Diffusive-sheetless Backlight System for Mobile Phone," IDW/AD, 1277-1280(2005).

Funamoto et. al. "LED Backlight System with Double-Prism Pattern", Journal of the Society for Information Display v. 14, p. 1045 (2006).

Goddhue et al, "Bright-field analysis of field-emission cones using high-resolution tranmission electron microscopy and the effect of structural properties on current stability," J. Vac. Sci. Technol. B, 12(2):693-696(Mar.Apr. 1994).

Hartman, "4.1: Invited paper: Two-Terminal Devices Technologies for AMLCDs," SID 95 Digest, 7-10(1995).

Heikenfeld et al., "Contrast Enhancement in Black Dielectric Electroluminescent Devices", IEEE Transactions on Electron Devices, v. 49, p. 1348 (2002).

Hewlett et al, "DLP Cinema™ projection: A hybrid frame-rate technique for flicker-free performance," Journ of the SID 9/3, 221-226(2001).

International Preliminary Report on Patentability dated Aug. 26, 2010, in International Application No. PCT/US2009/000922.
International Preliminary Report on Patentability dated Oct. 28, 2010 in International Application No. PCT/US2009/002288.
International Search Report (Partial) dated May 11, 2011 in International Application No. PCT/US2011/023387.
International Search Report and Written Opinion dated Jul. 21, 2009 in International Application No. PCT/US2009/002288.
International Search Report and Written Opinion dated Jun. 29, 2009 in International Application No. PCT/US2009/000922.

Johnstone et al, "Theoretical limits on the freestanding length of cantilevers produced by surface micromachining technology," J. Micromech. Microeng. 12:855-861 (2002).

Jones et al, "29-1: Addressing Vmin Ferroelectric Liquid Crystal Displays," (1998).

Judy, et al, "Self-Adjusting Microstructures(SAMS)," Proceedings of the Workshop on Micro Electro Mechanical Systems, New York, Jan. 30, 1991, vol. Workshop 4, pp. 51-56.

Judy, M. W. "Micromechanisms Using Sidewall Beams" (1994).

Kalantar et al, "Optical Micro Deflector Based Functional Light-Guide Plate for Backlight Unit," SID 00 Digest, 1029-1031(2000).

Kalantar, "Modulation of viewing angle on an LCD surface through backlight optics," Journal of the SID, 11(4):647-652(2003).

Kalantar, K., et al., "Backlight Unit with Dboule Surface Light Emission Using a Single Micro-structured Light-Guide Plate," p. 1182, Society for Information Display Digest (2004).

Kim et al. "Manufacturing Technologies for the Next Generation a-Si TFT-LCD," Proceedings of the Int'l. Display Mfg. Cnf. Seoul, Korea. (2000).

Koden et al, "Ferroelectric Liquid Crystal Display," (Sep. 17, 1997).

Kuang et al, "Dynamic Characteristics of shaped micro-actuators solved using the differential quadrature method," J. Micromech. Microeng. 14:647-655(2004).

Kunzman and G. Pettitt, "White Enhancement for Color Sequential DLP" Society for Information Display, Digest of Technical Papers 1998.

Lee et al, "P-25: A LCOS Microdisplay Driver with Frame Buffering Pixels," SID 02 Digest, 292-295(2002).

Lee et. al. "Integrated Amorphous Silicon Color Sensor on LCD Panel for LED Backlight Feedback Control System", Society for Information Display, Digest of Technical Papers 2005, p. 1376.

Legtenberg et al, "Electrostatic Curved Electrode Actuators," Journal of Microelectromechanical Systems, 6:3(257-265)(Sep. 1997).

Li et al, "Drie-Fabricated Curved-Electrode Zipping Actuators with Low Pull-In Voltage," IEE, 480-483 (2003).

Liang et al, "Observation of electric field gradients near field-emission cathode arrays," Appl Phys. Lett., 66(9):1147-1149(Feb. 1995).

Liu et al, "Scaling Laws of Microactuators and Potential Applications of Electroactive Polymers in MEMS," SPIE, 3669:345-354(Mar. 1999).

Maboudian et al, "Stiction reduction processes for surface micromachines," Tribology Letters, 3:215-221(1997).

Mastrangelo et al, "Mechanical Stability and Adhesion of Microstructures Under Capillary Forces—Part I: Basic Theory," Journal of Microelectromechanical Systems, 2(1):33-43(Mar. 1993).

Mastrangelo et al, "Mechanical Stability and Adhesion of Microstructures Under Capillary Forces—Part II: Experiments," Journal of Microelectromechanical Systems, 2(1):44-55(Mar. 1993).

McLaughlin, "Progress in Projection and Large-Area Displays," Proceedings of the IEEE, 90(4):521-532(Apr. 2002).

Non Final Office Action Dated Mar. 22, 2007, U.S. Appl. No. 11/546,937.
Non Final Office Action dated Nov. 1, 2006, U.S. Appl. No. 11/218,690.

Okumura et al, "Highly-efficient backlight for liquid crystal display having no optical films," Applied Physics Letters, 83(13):2515-2517(Sep. 2003).

Park et al. P-70: Active Matrix OLED Displays Using Simple Poly-Si TFT Process. Society of Information Display, Digest. pp. 487-489 (2003).

Pasricha et. al. "Dynamic Backlight Adaptation for Low Power Handheld Devices" IEEE Design and Test v. 21, p. 398 (2004).

Perregaux et al, "Arrays of Addressable High-Speed Optical Microshutters," IEEE, 232-235, (2001).

Qiu et al, "A Curved-Beam Bistable Mechanism," Journal of Microelectromechanical Systems, 13(2):137-145(Apr. 2004).

Ravnkilde et al, "Fabrication of Nickel Microshutter Arrays for Spatial Light Modulation," Meso 2002, also on their website: http://www2.mic.dtu.dk/research/mems/publications/Papers/Dicon_Meso2002.pdf.

Roosendaal et al, "25.2: A Wide Gamut, High Aperture Mobile Spectrum Sequential Liquid Crystal Display," SID 05 Digest, 1116-1119(2005).

Saeedi, et. al. "Molten-Alloy Driven Self-Assembly for Nano and Micro Scale System Integration" Fluid Dynamics and Materials Processing v. 2, p. 221 (2006).

Sato, "Research on Flexible Display Systems," Broadcast Technology, 21:10-15(2005).

Sharp Specification No. LCP-03015 for Mobile Liquid Crystal Display Group, Sharp Corporation, Jun. 13, 2003.

Shikida et al, "Fabrication fo an S-shaped Microactuator," Journal of Microelectromechanical Systems, 6(1):18-24(Mar. 1997).

Steyn, Lodewyck, "Electroquasistatic Zipper Actuators: A Technology Review", Dec. 2004.

Tagaya et al, "Thin Liquid-Crystal Display Backlight System with Highly Scattering Optical Transmission Polymers," Applied Optics, 40(34):6274-6280(Dec. 2001).

Takatori et al, "6.3: Field-Sequential Smectic LCD with TFT Pixel Amplifier," SID 01 Digest, 48-51(2001).

Tan and Y.C. Lee, "Soldering Technology for Optoelectronics Packaging", 1996 Electronic Components and Technology Conference, p. 26.

Teijido, J.M., "Conception and Design of Illumination Light Pipes," Thesis No. 1498 for University of Neuchatel, http://www.unige.ch/cyberdocuments/unine/theses2000/TeijidoJM/these_front.html:1-99 Retrieved on Aug. 3, 2006.

Tien et al, "MEMS Actuators for Silicon Micro-Optical Elements," Proc. of SPIE, 4178:256-269, (2000).

Underwood, "A review of microdisplay technologies," SID@EID, (Nov. 21 to 23, 2000).

Underwood, "LCoS through the looking glass," SID(2001).

van de Biggelaar, T. et. al. "Passive and Active Matrix Addressed Polymer Light-emitting Diode Displays", Proc. SPIE vol. 4295, p. 134 (2001).

Vangbo et al, "A lateral symmetrically bistable buckled beam," J. Micromech. Microeng., 8:29-32(1998).

Yamada et al, "52.2: Invited Paper:Color Sequential LCD Based on OCB with an LED Backlight," SID 00 Digest, 1180-1183(2000).

Yasumura et al, "Fluid Damping of an Electrostatic Actuator for Optical Switching Applications," Transducers Research Foundation (2002).

"Microprism Technology for Luminaires," Reflexite Display Optics (2003).

"Optical Design Tools for Backlight Displays," Optical Research Associates, 1-8 (Jun. 2003).

AZ Displays, Inc. Complete LCD Solutions, ATM3224C-NC-FTH (Oct. 2, 2003).

Davis, "Microstructured Optics for LED Applications," Reflexite Display Optics (2002).

Hornbeck, "Digital Light Processing™: A New MEMS-Based Display Technology," Texas Instruments (Jun. 4-5, 1996).

Jepsen et al, "4.11: 0.9" SXGA Liquid Crystal on Silicon Panel with 450 Hz. Field Rate, MicroDisplay Coropration, 106-109 (Sep. 2001).

Qui et al, "A High-Current Electrothermal Bistable MEMS Relay," (Jan. 19-23, 2003).

Wang et al, "Highly Space-Efficient Electrostatic Zigzag Transmissive Micro-Optic Switches for an Integrated MEMS Optical Display System" (Jun. 8-12, 2003).

* cited by examiner

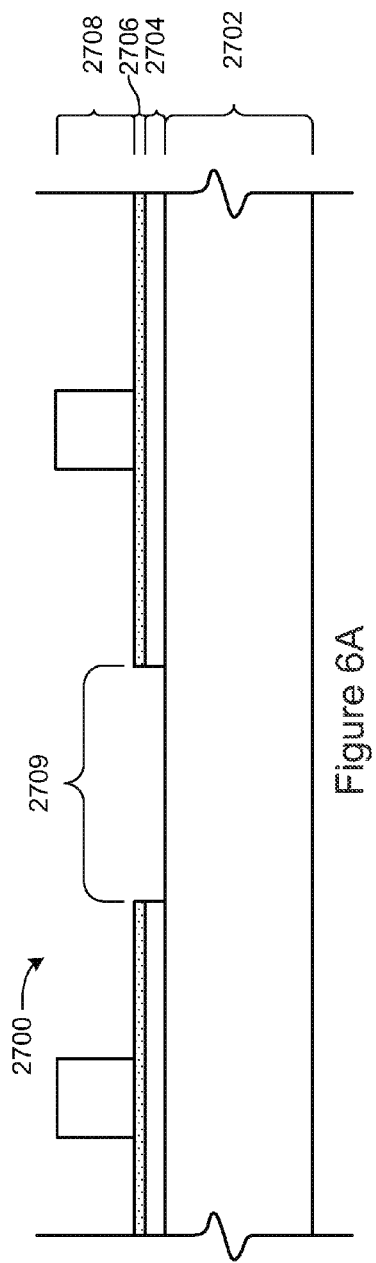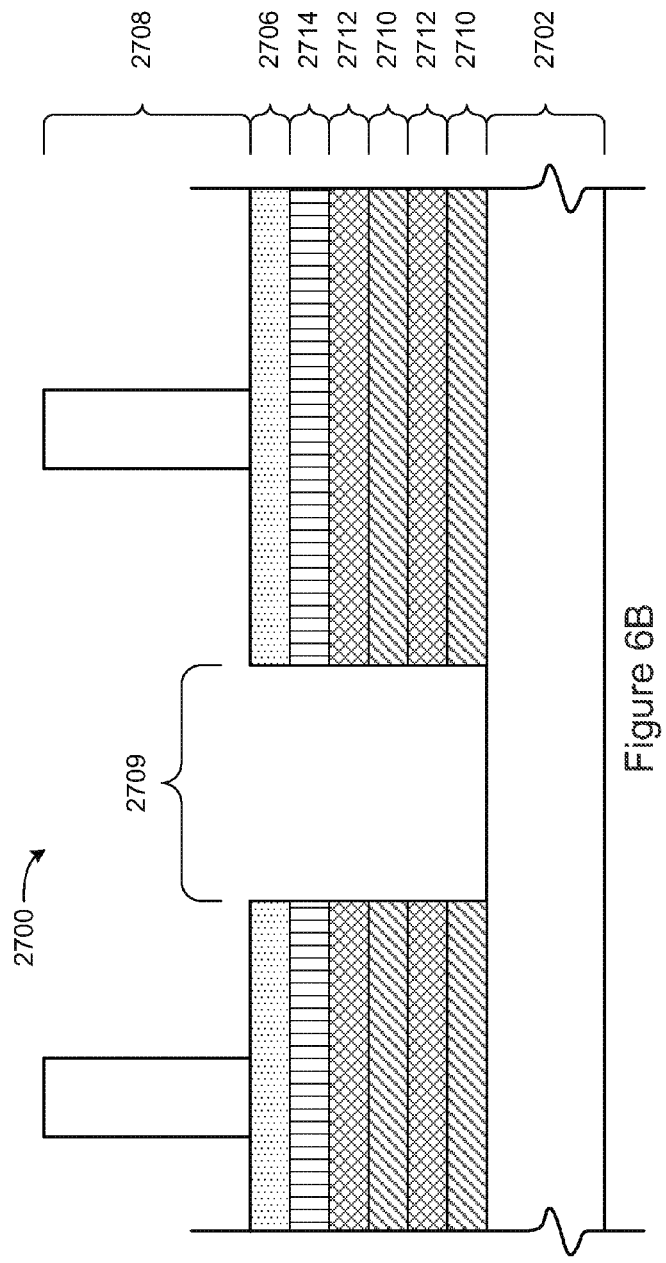

METHODS FOR MANUFACTURING COLD SEAL FLUID-FILLED DISPLAY APPARATUS

CROSS-REFERENCE TO RELATED APPLICATIONS

This application is a continuation-in-part of U.S. patent application Ser. No. 12/221,606, filed Aug. 4, 2008, which issued as U.S. Pat. No. 7,920,317, and claims the benefit of U.S. Provisional Patent Application Nos. 61/300,731 and 61/301,015, filed Feb. 2, 2010 and Feb. 3, 2010, respectively. The contents of each of these applications are incorporated by reference herein in their entirety.

FIELD OF THE INVENTION

The invention generally relates to the field of displays, such as imaging and projection displays. In particular, the invention relates to the assembly and operation of fluid filled display apparatus.

BACKGROUND OF THE INVENTION

Displays that incorporate mechanical light modulators can include hundreds, thousands, or in some cases, millions of moving elements. In some devices, every movement of an element provides an opportunity for static friction to disable one or more of the elements. This movement is facilitated by immersing all the parts in a working fluid (also referred to as fluid) and sealing the fluid (e.g., with an adhesive) within a fluid space or gap in a MEMS display cell. The fluid is usually one with a low coefficient of friction, low viscosity, and minimal degradation effects over the long term.

Because the fluid may possess a thermal expansion coefficient which is different from that of the substrates which contain the fluid, variations in operating temperature can lead to strong variations in the fluid pressure within the display. These internal pressure variations can lead to bulging or warping of the display surface and in some cases to the formation of vapor bubbles within the display. For example, the CTE of the glass that may be used for a MEMS substrate may be about 3.5 ppm/K and the volumetric CTE for a suitable working fluid may be about 1200 ppm/K. Additionally, the CTE of the adhesive used to seal the fluid in the display can govern the expansion of the cell gap. In some embodiments, the CTE of the adhesive may be about 80 ppm/K. Thus, the working fluid in the gap in the MEMs display expands and contracts roughly 400 times more than that of the glass and 15 times more than that of the adhesive. For an approximately 50 degree Celsius temperature difference, the volume difference between the substrate and that of the fluid is about 5.5%. Thus, if the display is sealed at about 20° C. and is later heated to about 80° C., the fluid will expand about 5.5% more than the glass MEMS substrate, which is in turn dominated by the adhesive swelling or expanding. The differences in expansion cause a force to be exerted on the glass, resulting in a swelling of a portion of the display. This swelling amount is difficult to estimate accurately around the edges of the MEMs display because the glass MEMS substrate is confined around the edges by the adhesive and is generally free to deform in the center. In some embodiments, this swelling may in the center of the gap in the MEMS display may be as large as about 1.5 microns. A similar effect may occur as the MEMS display is cooled. If the display is cooled about 50° C., then the same fluid volume difference of about 5.5% will result.

SUMMARY OF THE INVENTION

The methods and apparatus described herein allow for the manufacture of imaging displays in which the formation of vapor bubbles is substantially prevented.

When the display cell's internal pressure reduces below that of the seal pressure, and no prior vapor bubbles are present in the display, a vapor bubble forms. That is, one or more vapor bubbles nucleate suddenly in multiple locations of the display. If the display is sealed at room temperature, a vapor bubble may form at temperatures far below room temperature. In practice, vapor bubbles do not appear until the display reaches about 15° C. to 20° C. below the seal temperature. The actual temperature at which a bubble forms is hard to predict as it depends on the internal pressure and the ability of the spacers to absorb some of the contraction and/or expansion.

Conditions for vapor bubble formation generally exist when the cell is restrained from contracting along with the reduced volume of fluid in the gap of the display cell. When the ambient temperature of the display cell is lowered, the substrate begins to contract. However, when opposing spacers come into contact, i.e., the spacers on a first substrate of the cell contact adjacent spacers on the second substrate (e.g., aperture plate) of the cell, the display cell becomes constrained and cannot contract much further, while the fluid continues to contract. This constraint in turn reduces the pressure inside the display cell. If the temperature continues to drop, then the pressure inside the cell may be such that a vapor bubble forms. When vapor bubbles form within the optical portion that the user looks at, they become an annoyance, usually leading to the replacement of the display.

The apparatuses and methods described herein relate to solutions that, inter alia, help prevent vapor bubble formation at low temperature. In particular, the methods and apparatuses described herein relate to the assembly of mechanically actuated display apparatus that include a fluid-filling and a sealing process that occurs at lower temperatures. A method for sealing a MEMS display cell at a lower temperature, e.g., below 0° C., and preferably between about −10° C. to about −25° C., is described. This method takes into account the knowledge that a vapor bubble does not form immediately when the ambient temperature drops below the seal temperature, but instead forms about 15° C. to about 20° C. below the seal temperature. In this manner, the temperature at which a vapor bubble may form is lowered to lower than about −25° C.

Those skilled in the art will realize that standard sealing techniques are performed at room temperature, while the sealing process described herein is performed at a temperature substantially below room temperature (i.e., a cold temperature), and thus is a "cold seal" process for the manufacturing of a display apparatus is described herein.

In one aspect, the invention relates to a method for manufacturing a display assembly including a first transparent substrate and a second transparent substrate. The method includes providing at least a portion of an array of light modulators on the second transparent substrate. The method further includes providing a plurality of spacers connected to the first and second substrates to establish a gap between the two substrates. The method also includes providing an adhesive edge seal for bonding the perimeter of the first and second substrates, and filling the display assembly with a fluid at a first temperature. The method further includes cooling the display assembly to a second temperature substantially below the first temperature, and compressing the display assembly thereby pushing the first and second substrates at least partially together. The method also includes curing a seal material to seal the fluid between the first and second substrates.

In some embodiments, the compressing step is performed at the second temperature. In some embodiments, the plurality of spacers maintains at least a first gap between the two substrates. In some embodiments, the adhesive edge seal maintains the edges of the first and second substrates separated by a second gap. In some embodiments, the adhesive edge seal includes at least one edge spacer.

In some embodiments, the method further includes applying the seal material to a fill hole located along an edge of the display assembly after the display assembly is filled and before the display assembly is returned to room temperature. In some embodiments, the fill hole comprises an opening in the adhesive edge seal. In some embodiments, filling the display via the fill hole is performed such that the fluid substantially surrounds the movable portions of the light modulators at the first temperature.

In some embodiments, the first temperature is substantially room temperature. In some embodiments, the first temperature is between about 18° C. and about 30° C. In some embodiments, the second temperature is below about 0° C. In some embodiments, the curing the seal material occurs at a temperature below about 0° C. In some embodiments, the second temperature is between about −10° C. and −25° C.

In some embodiments, the fluid is one of a liquid, a gas, and a lubricant. In some embodiments, the fluid comprises a hydrofluoroether liquid. In some embodiments, the fluid comprises a liquid blend of at least one perfluorocarbon and at least one hydrofluoroether.

In some embodiments, the light modulators are MEMS light modulators. In some embodiments, the method further includes providing at least one additional array of MEMS light modulators on the first transparent substrate.

In some embodiments, the method further includes fabricating a plurality of spacers on at least one of the first and second transparent substrates to maintain a gap between the two substrates. In some embodiments, the plurality of spacers maintain at least a first gap between the two substrates, wherein the adhesive edge seal maintains the edges of the first and second substrates separated by a second gap, and wherein the height of the second gap is greater than the height of the first gap. In some embodiments, the height of the second gap is larger than the height of the first gap by between about 0.5 micron and about 4 microns. In some embodiments, the height of the second gap is between about 8 microns and about 14 microns.

In another aspect, the invention relates to a method for manufacturing a display assembly including a first transparent substrate and a second transparent substrate. The method includes providing at least a portion of an array of light modulators on the second transparent substrate. The method further includes providing a plurality of spacers connected to the first and second substrates to establish a gap between the two substrates. The method also includes providing an adhesive edge seal for bonding the perimeter of the first and second substrates. The method further includes compressing the display assembly thereby pushing the first and second substrates at least partially together, wherein the compressing occurs at a temperature substantially below room temperature. The method also includes curing a seal material to seal a fluid between the first and second substrates.

In some embodiments, room temperature is between about 18° C. and about 30° C. In some embodiments, substantially below room temperature is below about 0° C. In some embodiments, substantially below room temperature is between about −10° C. and about −25° C. In some embodiments, the curing of the seal material at least partially occurs at a temperature substantially below room temperature.

In some embodiments, the plurality of spacers maintain at least a first gap between the two substrates. In some embodiments, the adhesive edge seal maintains the edges of the first and second substrates separated by a second gap. In some embodiments, the adhesive edge seal includes at least one edge spacer.

In some embodiments, the method further includes applying the seal material to a fill hole located along an edge of the display assembly before the display assembly is returned to room temperature. In some embodiments, the fill hole comprises an opening in the adhesive edge seal.

In a third aspect, the invention relates to a display apparatus. The display apparatus includes a first substrate, and a second substrate including at least a portion of an array of light modulators that is separated from the first substrate by at least a first gap. The display apparatus also includes a plurality of spacers connected to the first and second substrates to maintain the first gap, and an adhesive edge seal to maintain the edges of the display apparatus separated by at least a second gap. The height of the second gap is greater than the height of the first gap. The display apparatus further includes a fluid contained within the first gap and a cured seal material to seal the fluid in the first gap. In some embodiments, the apparatus further includes a fill hole, and the fill-hole comprises an opening in the adhesive edge seal.

In some embodiments, the fluid is one of a liquid, a gas, and a lubricant. In some embodiments, the fluid comprises a hydrofluoroether liquid. In some embodiments, the fluid comprises a liquid blend of at least one perfluorocarbon and at least one hydrofluoroether.

In some embodiments, the light modulators are MEMS light modulators. In some embodiments, the MEMS light modulators comprise shutter-based light modulators. In some embodiments, the MEMS light modulators comprise electrowetting light modulators. In some embodiments, the light modulators comprise liquid crystal modulators. In some embodiments, the first transparent substrate includes an additional portion of an array of light modulators.

In some embodiments, the plurality of spacers are fabricated on one of the first and second transparent substrates. In some embodiments, the first substrate comprises one of a color filter array or an aperture layer formed thereon. In some embodiments, the upper and lower substrates are electrically isolated. In some embodiments, the height of the second gap is larger than the height of the first gap by between about 0.5 micron and 4 microns. In some embodiments, the height of the second gap is between about 8 microns and 14 microns. In some embodiments, the adhesive edge seal is an epoxy seal. In some embodiments, the epoxy seal is curable using an ultraviolet light source. In some embodiments, the adhesive edge seal includes at least one edge spacer.

The illustrative descriptions herein include methods that can be used to constrain the contraction of the MEMS substrate such that bubble formation at lower temperatures is further reduced. For instance, by utilizing spacers such that opposing spacers do not completely contact until very low temperatures are reached, vapor bubble formation within the display apparatus temperature may be further reduced. In some embodiments, the display cell may be sealed with an adhesive material with a height substantially larger than that of each of the spacers inside the display cell. The adhesive may be an epoxy material. The seal may be located at an edge of the display cell. In some embodiments, the seal material may include spacers made of plastic, glass, ceramic or other material. The spacers may be incompressible. In some embodiments, the spacer may be any suitable microstructure. Suitable microstructures include a bead or a sphere. The bead or sphere may be formed from glass or silica.

In some embodiments, the seal material maintains the minimum separation or the cell gap between the substrates in the region of the substrates near the seal, even under compression. In some embodiments, the microstructure included with the seal material maintains the minimum separation or a cell gap between the substrates in the region of the substrates near the seal material, even under compression.

When the cell of the display apparatus is compressed (e.g., by a cell press), the majority of the spacers come into contact with their respective opposing spacers. However, if the cell press pressure is not too high and the seal material is larger than the total height of the opposing spacers on the substrates, then some of the spacers will not contact the substrate along the extreme edges of the display cell, possibly due to the location of the seal material incompressible spacers at the extreme edges of the display cell. This in turn allows for further cell volume reduction as the fluid volume decreases. Nevertheless, as the temperature drops even further, eventually all or almost all of the spacers will come into contact with the substrate and/or the cell will contract to its minimum allowable state.

In some embodiments, the displays are assembled using manufacturing equipment that includes a cassette that will perform the cooling of the display cells. In some embodiments, the manufacturing equipment has built-in cell presses for compressing each display cell. In some embodiments, the display cell gap is filled with fluid at room temperature and only the pressing and sealing of the display is carried out at cold temperatures.

In this application, implementations will primarily be described with respect to displays built from MEMS light modulators. However, the systems, methods, and methods and devices disclosed herein are applicable to other types of displays, including electrowetting and liquid crystal displays, and more generally to apparatuses which include a fluid disposed therein. Examples of alternate MEMS-based light modulators include digital mirror devices (DMDs), interference modulation displays (IMODs), and light tap displays or frustrated internal reflection displays.

BRIEF DESCRIPTION OF THE DRAWINGS

The foregoing discussion will be understood more readily from the following detailed description of the invention with reference to the following drawings:

FIGS. 6A and 6B illustrate the structure of an aperture plate for use in a MEMS-down configuration, according to an illustrative embodiment of the invention;

FIGS. 16-19 show display cells under compression, according to illustrative embodiments of the invention;

FIG. 17 shows a display cell in a condition after it has been further compressed at temperatures below the sealing temperature, according to an illustrative embodiment of the invention;

FIG. 18 shows a display cell in which the cell is under further compression from the cell pressure or from a colder temperature, according to an illustrative embodiment of the invention;

DETAILED DESCRIPTION OF THE DRAWINGS

To provide an overall understanding of the invention, certain illustrative embodiments will now be described, including apparatus and methods for displaying images. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1A:
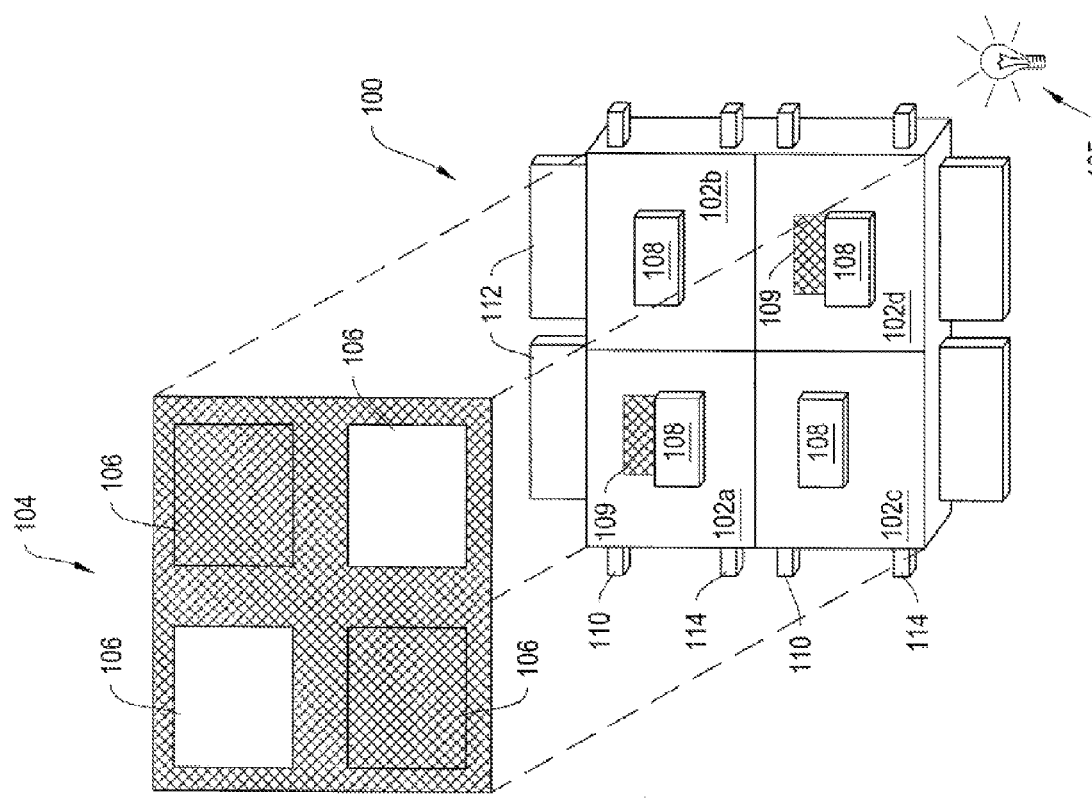
FIG. 1A is an isometric view of display apparatus, according to an illustrative embodiment of the invention.

FIG. 1A is a schematic diagram of a direct-view MEMS-based display apparatus 100, according to an illustrative embodiment of the invention. The display apparatus 100 includes a plurality of light modulators 102a-102d (generally "light modulators 102") arranged in rows and columns. In the display apparatus 100, light modulators 102a and 102d are in the open state, allowing light to pass. Light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e. by use of a frontlight. In one of the closed or open states, the light modulators 102 interfere with light in an optical path by, for example, and without limitation, blocking, reflecting, absorbing, filtering, polarizing, diffracting, or otherwise altering a property or path of the light.

In the display apparatus 100, each light modulator 102 corresponds to a pixel 106 in the image 104. In other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide grayscale in an image 104. With respect to an image, a "pixel" corresponds to the smallest picture element defined by the resolution of the image. With respect to structural components of the display apparatus 100, the term "pixel" refers to the combined mechanical and electrical components utilized to modulate the light that forms a single pixel of the image.

Display apparatus 100 is a direct-view display in that it does not require imaging optics. The user sees an image by looking directly at the display apparatus 100. In alternate embodiments the display apparatus 100 is incorporated into a projection display. In such embodiments, the display forms an image by projecting light onto a screen or onto a wall. In projection applications the display apparatus 100 is substantially smaller than the projected image 104.

Direct-view displays may operate in either a transmissive or reflective mode. In a transmissive display, the light modulators filter or selectively block light which originates from a lamp or lamps positioned behind the display. The light from the lamps is optionally injected into a light guide or "backlight". Transmissive direct-view display embodiments are often built onto transparent or glass substrates to facilitate a sandwich assembly arrangement where one substrate, containing the light modulators, is positioned directly on top of the backlight. In some transmissive display embodiments, a color-specific light modulator is created by associating a color filter material with each modulator 102. In other transmissive display embodiments colors can be generated, as described below, using a field sequential color method by alternating illumination of lamps with different primary colors.

Each light modulator 102 includes a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material.

The display apparatus also includes a control matrix connected to the substrate and to the light modulators for controlling the movement of the shutters. The control matrix includes a series of electrical interconnects (e.g., interconnects 110, 112, and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{we}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In other implementations, the data voltage pulses control switches, e.g., transistors or other non-linear circuit elements that control the application of separate actuation voltages, which are typically higher in magnitude than the data voltages, to the light modulators 102. The application of these actuation voltages then results in the electrostatic driven movement of the shutters 108.

Figure 1B:
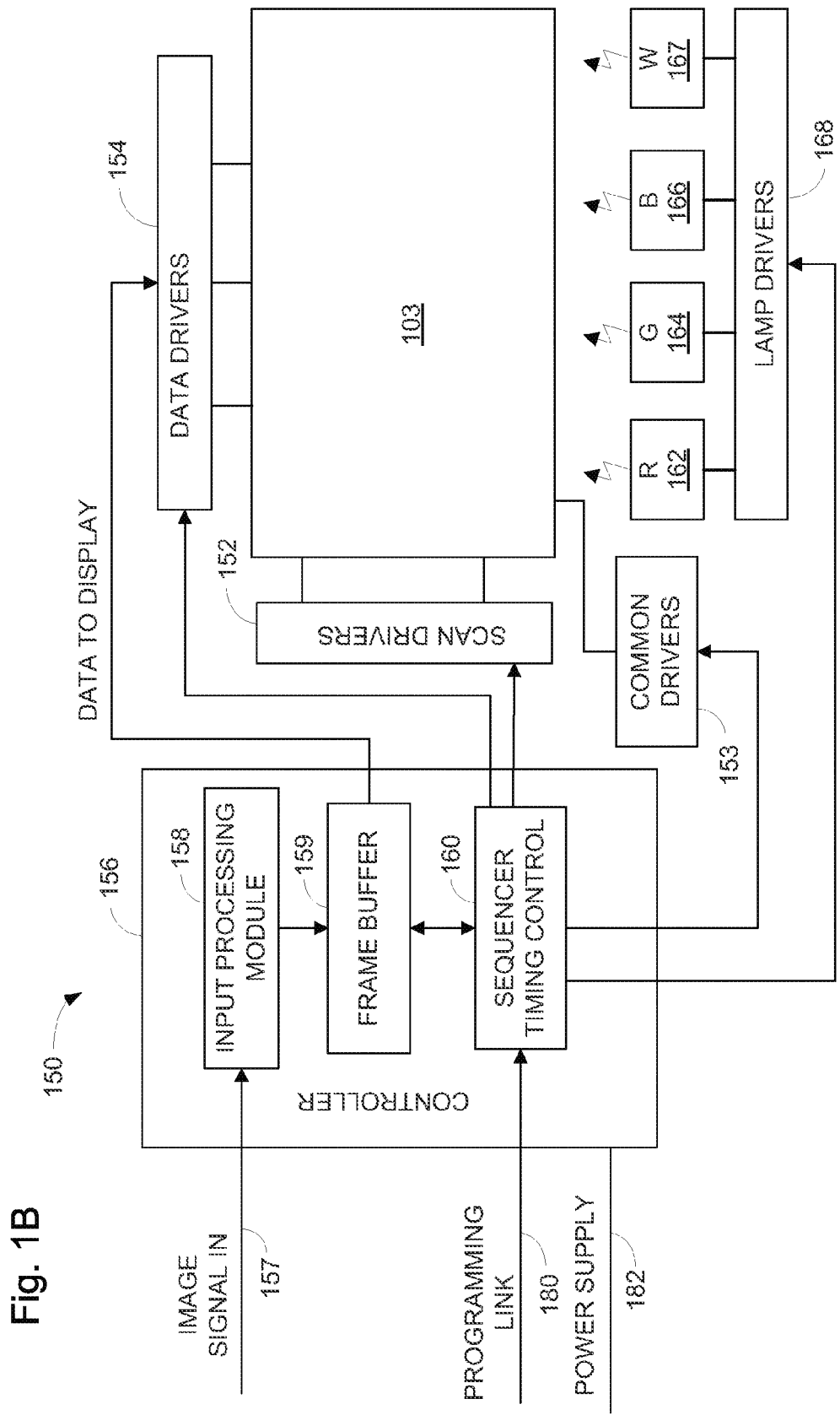
FIG. 1B is a block diagram of the display apparatus of FIG. 1A, according to an illustrative embodiment of the invention.

FIG. 1B is a block diagram 150 of the display apparatus 100. Referring to FIGS. 1A and 1B, in addition to the elements of the display apparatus 100 described above, as depicted in the block diagram 150, the display apparatus 100 includes a plurality of scan drivers 152 (also referred to as "write enabling voltage sources") and a plurality of data drivers 154 (also referred to as "data voltage sources"). The scan drivers 152 apply write enabling voltages to scan-line interconnects 110. The data drivers 154 apply data voltages to the data interconnects 112. In some embodiments of the display apparatus, the data drivers 154 are configured to provide analog data voltages to the light modulators, especially where the gray scale of the image 104 is to be derived in analog fashion. In analog operation the light modulators 102 are designed such that when a range of intermediate voltages is applied through the data interconnects 112 there results a range of intermediate open states in the shutters 108 and therefore a range of intermediate illumination states or gray scales in the image 104.

In other cases the data drivers 154 are configured to apply only a reduced set of 2, 3, or 4 digital voltage levels to the control matrix. These voltage levels are designed to set, in digital fashion, either an open state or a closed state to each of the shutters 108.

The scan drivers 152 and the data drivers 154 are connected to digital controller circuit 156 (also referred to as the "controller 156"). The controller 156 includes an input processing module 158, which processes an incoming image signal 157 into a digital image format appropriate to the spatial addressing and the gray scale capabilities of the display 100. The pixel location and gray scale data of each image is stored in a frame buffer 159 so that the data can be fed out as needed to the data drivers 154. The data is sent to the data drivers 154 in mostly serial fashion, organized in predetermined sequences grouped by rows and by image frames. The data drivers 154 can include series to parallel data converters, level shifting, and for some applications digital to analog voltage converters.

The display 100 apparatus optionally includes a set of common drivers 153, also referred to as common voltage sources. In some embodiments the common drivers 153 provide a DC common potential to all light modulators within the array of light modulators 103, for instance by supplying voltage to a series of common interconnects 114. In other embodiments the common drivers 153, following commands from the controller 156, issue voltage pulses or signals to the array of light modulators 103, for instance global actuation pulses which are capable of driving and/or initiating simultaneous actuation of all light modulators in multiple rows and columns of the array 103.

All of the drivers (e.g., scan drivers 152, data drivers 154, and common drivers 153) for different display functions are time-synchronized by a timing-control module 160 in the controller 156. Timing commands from the module 160 coordinate the illumination of red, green and blue and white lamps (162, 164, 166, and 167 respectively) via lamp drivers 168, the write-enabling and sequencing of specific rows within the array of pixels 103, the output of voltages from the data drivers 154, and the output of voltages that provide for light modulator actuation.

The controller 156 determines the sequencing or addressing scheme by which each of the shutters 108 in the array 103 can be re-set to the illumination levels appropriate to a new image 104. Details of suitable addressing, image formation, and gray scale techniques can be found in U.S. patent application Ser. Nos. 11/326,696 and 11/643,042, the entireties of which are incorporated herein by reference. New images 104 can be set at periodic intervals. For instance, for video displays, the color images 104 or frames of video are refreshed at frequencies ranging from 10 to 300 Hertz. In some embodiments the setting of an image frame to the array 103 is synchronized with the illumination of the lamps 162, 164, and 166 such that alternate image frames are illuminated with an alternating series of colors, such as red, green, and blue. The image frame for each respective color is referred to as a color sub-frame. In this method, referred to as the field sequential color method, if the color sub-frames are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green, and blue.

In some implementations, where the display apparatus 100 is designed for the digital switching of shutters 108 between open and closed states, the controller 156 determines the addressing sequence and/or the time intervals between image frames to produce images 104 with appropriate gray scale. The process of generating varying levels of grayscale by controlling the amount of time a shutter 108 is open in a particular frame is referred to as time division gray scale. In some embodiments of time division gray scale, the controller 156 determines the time period or the fraction of time within each frame that a shutter 108 is allowed to remain in the open state, according to the illumination level or gray scale desired of that pixel. In other implementations, for each image frame, the controller 156 sets a plurality of sub-frame images in multiple rows and columns of the array 103, and the controller alters the duration over which each sub-frame image is illuminated in proportion to a gray scale value or significance value employed within a coded word for gray scale. For instance, the illumination times for a series of sub-frame images can be varied in proportion to the binary coding series 1, 2, 4, 8 . . . . The shutters 108 for each pixel in the array 103 are then set to either the open or closed state within a sub-frame image according to the value at a corresponding position within the pixel's binary coded word for gray level.

In other implementations, the controller alters the intensity of light from the lamps 162, 164, and 166 in proportion to the gray scale value desired for a particular sub-frame image. A number of hybrid techniques are also available for forming colors and gray scale from an array of shutters 108. For instance, the time division techniques described above can be combined with the use of multiple shutters 108 per pixel, or the gray scale value for a particular sub-frame image can be established through a combination of both sub-frame timing and lamp intensity. Details of these and other embodiments can be found in U.S. patent application Ser. No. 11/643,042, referenced above.

In some implementations the data for an image state 104 is loaded by the controller 156 to the modulator array 103 by a sequential addressing of individual rows, also referred to as scan lines. For each row or scan line in the sequence, the scan driver 152 applies a write-enable voltage to the write enable interconnect 110 for that row of the array 103, and subsequently the data driver 154 supplies data voltages, corresponding to desired shutter states, for each column in the selected row. This process repeats until data has been loaded for all rows in the array. In some implementations the sequence of selected rows for data loading is linear, proceeding from top to bottom in the array. In other implementations the sequence of selected rows is pseudo-randomized, in order to minimize visual artifacts. And in other implementations the sequencing is organized by blocks, where, for a block, the data for only a certain fraction of the image state 104 is loaded to the array, for instance by addressing only every $5^{th}$ row of the array in sequence.

In some implementations, the process for loading image data to the array 103 is separated in time from the process of actuating the shutters 108. In these implementations, the modulator array 103 may include data memory elements for each pixel in the array 103 and the control matrix may include a global actuation interconnect for carrying trigger signals, from common driver 153, to initiate simultaneous actuation of shutters 108 according to data stored in the memory elements. Various addressing sequences, many of which are described in U.S. patent application Ser. No. 11/643,042, can be coordinated by means of the timing control module 160.

In alternative embodiments, the array of pixels 103 and the control matrix that controls the pixels may be arranged in configurations other than rectangular rows and columns. For example, the pixels can be arranged in hexagonal arrays or curvilinear rows and columns. In general, as used herein, the term scan-line shall refer to any plurality of pixels that share a write-enabling interconnect.

The display 100 is comprised of a plurality of functional blocks including the timing control module 160, the frame buffer 159, scan drivers 152, data drivers 154, and drivers 153 and 168. Each block can be understood to represent either a distinguishable hardware circuit and/or a module of executable code. In some implementations the functional blocks are provided as distinct chips or circuits connected together by means of circuit boards and/or cables. Alternately, many of these circuits can be fabricated along with the pixel array 103 on the same substrate of glass or plastic. In other implementations, multiple circuits, drivers, processors, and/or control functions from block diagram 150 may be integrated together within a single silicon chip, which is then bonded directly to the transparent substrate holding pixel array 103.

The controller 156 includes a programming link 180 by which the addressing, color, and/or gray scale algorithms, which are implemented within controller 156, can be altered according to the needs of particular applications. In some embodiments, the programming link 180 conveys information from environmental sensors, such as ambient light or temperature sensors, so that the controller 156 can adjust imaging modes or backlight power in correspondence with environmental conditions. The controller 156 also comprises a power supply input 182 which provides the power needed for lamps as well as light modulator actuation. Where necessary, the drivers 152, 153, 154, and/or 168 may include or be associated with DC-DC converters for transforming an input voltage at 182 into various voltages sufficient for the actuation of shutters 108 or illumination of the lamps, such as lamps 162, 164, 166, and 167.

MEMS Light Modulators

Figure 2A:
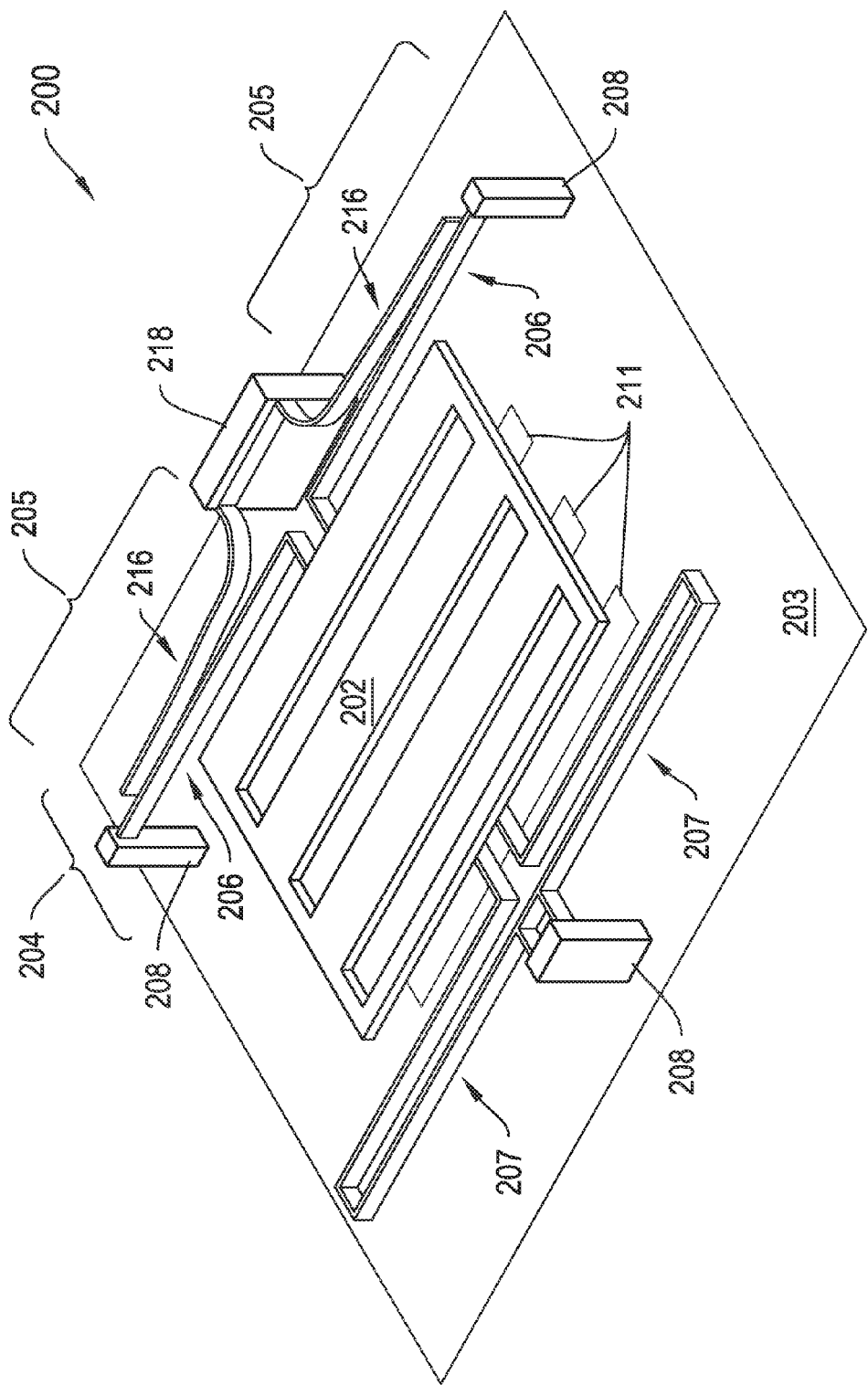
FIG. 2A is a perspective view of an illustrative shutter-based light modulator suitable for incorporation into the MEMS-based display of FIG. 1A, according to an illustrative embodiment of the invention.

FIG. 2A is a perspective view of an illustrative shutter-based light modulator 200 suitable for incorporation into the MEMS-based display apparatus 100 of FIG. 1A, according to an illustrative embodiment of the invention. The shutter-based light modulator 200 (also referred to as shutter assembly 200) includes a shutter 202 coupled to an actuator 204. The actuator 204 is formed from two separate compliant electrode beam actuators 205 (the "actuators 205"), as described in U.S. patent application Ser. No. 11/251,035, filed on Oct. 14, 2005, which issued as U.S. Pat. No. 7,271,945. The shutter 202 couples on one side to the actuators 205. The actuators 205 move the shutter 202 transversely over a surface 203 in a plane of motion which is substantially parallel to the surface 203. The opposite side of the shutter 202 couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the surface 203. The load anchors 208 physically connect the compliant load beams 206 and the shutter 202 to the surface 203 and electrically connect the load beams 206 to a bias voltage, in some instances, ground.

Each actuator 205 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

The surface 203 includes one or more apertures 211 for admitting the passage of light. If the shutter assembly 200 is formed on an opaque substrate, made for example from silicon, then the surface 203 is a surface of the substrate, and the apertures 211 are formed by etching an array of holes through the substrate. If the shutter assembly 200 is formed on a transparent substrate, made for example of glass or plastic, then the surface 203 is a surface of a light blocking layer deposited on the substrate, and the apertures are formed by etching the surface 203 into an array of holes 211. The apertures 211 can be generally circular, elliptical, polygonal, serpentine, or irregular in shape.

In operation, a display apparatus incorporating the light modulator 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely towards the drive anchor 218. The compliant members 206 act as springs, such that when the voltage across the beams 206 and 216 is removed, the load beams 206 push the shutter 202 back into its initial position, releasing the stress stored in the load beams 206.

The shutter assembly 200, also referred to as an elastic shutter assembly, incorporates a passive restoring force, such as a spring, for returning a shutter to its rest or relaxed position after voltages have been removed. A number of elastic restore mechanisms and various electrostatic couplings can be designed into or in conjunction with electrostatic actuators, the compliant beams illustrated in shutter assembly 200 being just one example. Other examples are described in U.S. patent application Ser. Nos. 11/251,035 (which issued as U.S. Pat. No. 7,271,945) and 11/326,696, the entireties of which are incorporated herein by reference. For instance, a highly non-linear voltage-displacement response can be provided which favors an abrupt transition between "open" vs. "closed" states of operation, and which, in many cases, provides a bi-stable or hysteretic operating characteristic for the shutter assembly. Other electrostatic actuators can be designed with more incremental voltage-displacement responses and with considerably reduced hysteresis, as may be preferred for analog gray scale operation.

The actuator 205 within the elastic shutter assembly is said to operate between a closed or actuated position and a relaxed position. The designer, however, can choose to place apertures 211 such that shutter assembly 200 is in either the "open" state, i.e. passing light, or in the "closed" state, i.e. blocking light, whenever actuator 205 is in its relaxed position. For illustrative purposes, it is assumed below that elastic shutter assemblies described herein are designed to be open in their relaxed state.

In many cases it is preferable to provide a dual set of "open" and "closed" actuators as part of a shutter assembly so that the control electronics are capable of electrostatically driving the shutters into each of the open and closed states.

Figure 2B:
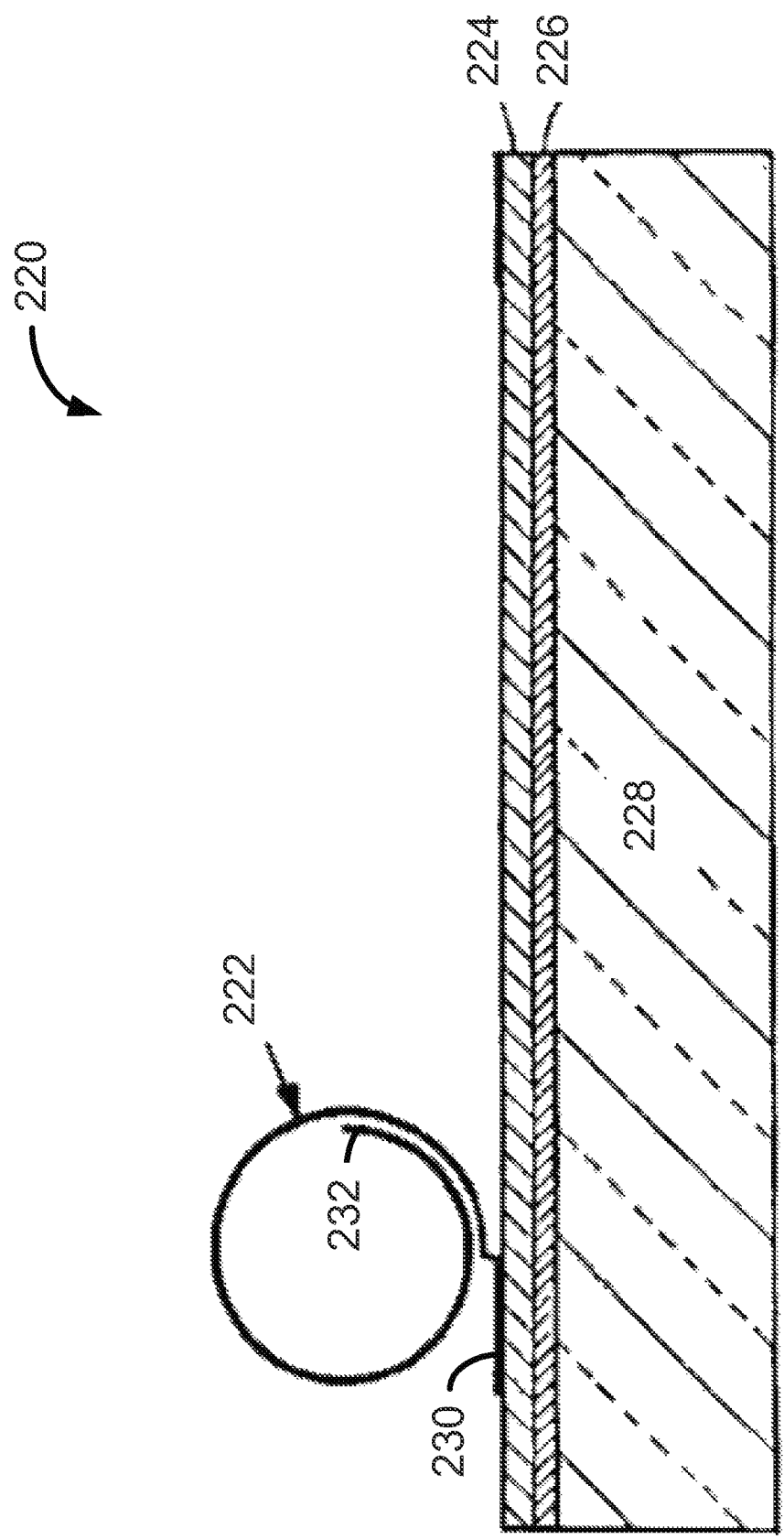
FIG. 2B is a cross-sectional view of a rollershade-based light modulator suitable for incorporation into the MEMS-based display of FIG. 1A, according to an illustrative embodiment of the invention.

Display apparatus 100, in alternative embodiments, includes light modulators other than transverse shutter-based light modulators, such as the shutter assembly 200 described above. For example, FIG. 2B is a cross-sectional view of a rolling actuator shutter-based light modulator 220 suitable for incorporation into an alternative embodiment of the MEMS-based display apparatus 100 of FIG. 1A, according to an illustrative embodiment of the invention. As described further in U.S. Pat. No. 5,233,459, entitled "Electric Display Device," and U.S. Pat. No. 5,784,189, entitled "Spatial Light Modulator," the entireties of which are incorporated herein by reference, a rolling actuator-based light modulator includes a moveable electrode disposed opposite a fixed electrode and biased to move in a preferred direction to produce a shutter upon application of an electric field. In some embodiments, the light modulator 220 includes a planar electrode 226 disposed between a substrate 228 and an insulating layer 224 and a moveable electrode 222 having a fixed end 230 attached to the insulating layer 224. In the absence of any applied voltage, a moveable end 232 of the moveable electrode 222 is free to roll towards the fixed end 230 to produce a rolled state. Application of a voltage between the electrodes 222 and 226 causes the moveable electrode 222 to unroll and lie flat against the insulating layer 224, whereby it acts as a shutter that blocks light traveling through the substrate 228. The moveable electrode 222 returns to the rolled state by means of an elastic restoring force after the voltage is removed. The bias towards a rolled state may be achieved by manufacturing the moveable electrode 222 to include an anisotropic stress state.

Figure 2C:
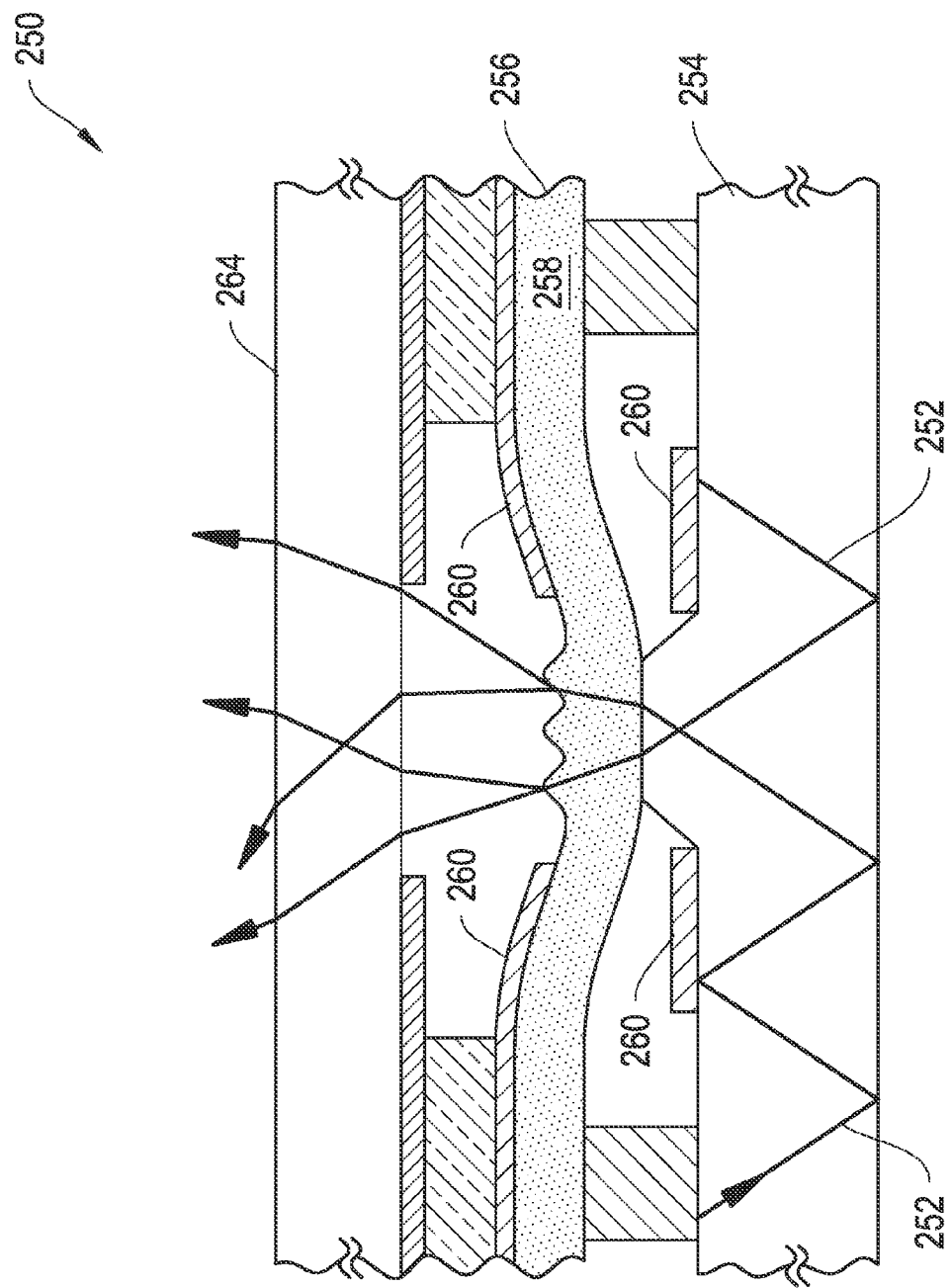
FIG. 2C is a cross sectional view of a light-tap-based light modulator suitable for incorporation into an alternative embodiment of the MEMS-based display of FIG. 1A, according to an illustrative embodiment of the invention.

FIG. 2C is a cross-sectional view of an illustrative non shutter-based MEMS light modulator 250. The light tap modulator 250 is suitable for incorporation into an alternative embodiment of the MEMS-based display apparatus 100 of FIG. 1A, according to an illustrative embodiment of the invention. As described further in U.S. Pat. No. 5,771,321, entitled "Micromechanical Optical Switch and Flat Panel Display," the entirety of which is incorporated herein by reference, a light tap works according to a principle of frustrated total internal reflection. That is, light 252 is introduced into a light guide 254, in which, without interference, light 252 is for the most part unable to escape the light guide 254 through its front or rear surfaces due to total internal reflection. The light tap 250 includes a tap element 256 that has a sufficiently high index of refraction that, in response to the tap element 256 contacting the light guide 254, light 252 impinging on the surface of the light guide 254 adjacent the tap element 256 escapes the light guide 254 through the tap element 256 towards a viewer, thereby contributing to the formation of an image.

In some embodiments, the tap element 256 is formed as part of beam 258 of flexible, transparent material. Electrodes 260 coat portions of one side of the beam 258. Opposing electrodes 260 are disposed on the light guide 254. By applying a voltage across the electrodes 260, the position of the tap element 256 relative to the light guide 254 can be controlled to selectively extract light 252 from the light guide 254.

Figure 2D:
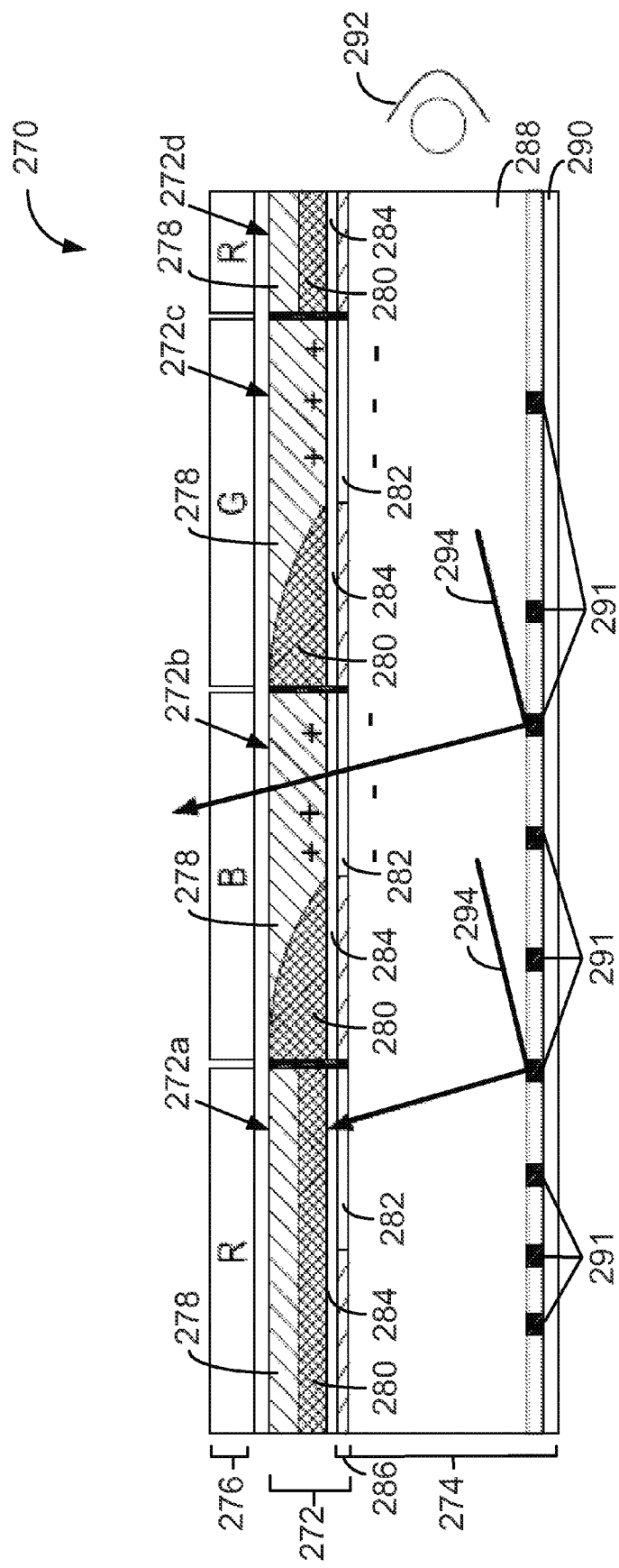
FIG. 2D is a cross sectional view of an electrowetting-based light modulator suitable for incorporation into an alternative embodiment of the MEMS-based display of FIG. 1A, according to an illustrative embodiment of the invention.

FIG. 2D is a cross sectional view of a second illustrative non-shutter-based MEMS light modulator suitable for inclusion in various embodiments of the invention. Specifically, FIG. 2D is a cross sectional view of an electrowetting-based light modulation array 270. The electrowetting-based light modulator array 270 is suitable for incorporation into an alternative embodiment of the MEMS-based display apparatus 100 of FIG. 1A, according to an illustrative embodiment of the invention. The light modulation array 270 includes a plurality of electrowetting-based light modulation cells 272a-272d (generally "cells 272") formed on an optical cavity 274. The light modulation array 270 also includes a set of color filters 276 corresponding to the cells 272.

Each cell 272 includes a layer of water (or other transparent conductive or polar fluid) 278, a layer of light absorbing oil 280, a transparent electrode 282 (made, for example, from indium-tin oxide) and an insulating layer 284 positioned between the layer of light absorbing oil 280 and the transparent electrode 282. Illustrative implementations of such cells are described further in U.S. Patent Application Publication No. 2005/0104804, published May 19, 2005 and entitled "Display Device," which issued as U.S. Pat. No. 7,463,398, the entirety of which is incorporated herein by reference. In the embodiment described herein, the electrode takes up a portion of a rear surface of a cell 272.

In order to increase switching speed, at least one of the two liquid components 278 and 280 in the electrowetting display should have a low viscosity, preferably less than 70 centipoise and more preferably less than 10 centipoise. Lower viscosities can be facilitated if at least one of the two liquid components includes materials having molecular weights less than 4000 grams/mole, preferably less than 400 grams/mole. Suitable low viscosity fluids include water, alcohols, fluorinated silicone oils, polydimethylsiloxane, hexamethyldisiloxane, octamethyltrisiloxane, octane, and diethylbenzene.

Suitable low viscosity non-polar oils include, without limitation, paraffins, olefins, ethers, silicone oils, fluorinated silicone oils, or other natural or synthetic solvents or lubricants. Useful oils can be polydimethylsiloxanes, such as hexamethyldisiloxane and octamethyltrisiloxane, or alkyl methyl siloxanes such as hexylpentamethyldisiloxane. Useful oils can be alkanes, such as octane or decane. Useful oils can be nitroalkanes, such as nitromethane. Useful oils can be aromatic compounds, such as toluene or diethylbenzene. Useful oils can be ketones, such as butanone or methyl isobutyl ketone. Useful oils can be chlorocarbons, such as chlorobenzene. And useful oils can be chlorofluorocarbons, such as dichlorofluoroethane or chlorotrifluoroethylene. The oils can be mixed with dyes to increase light absorption, either at specific colors such as cyan, magenta, and yellow, or over a broader spectrum to create a black ink.

For many embodiments it is useful to incorporate mixtures of the above oils. For instance mixtures of alkanes or mixtures of polydimethylsiloxanes can be useful where the mixture includes molecules with a range of molecular weights. One can also optimize properties by mixing fluids from different families or fluids with different properties. For instance, the surface wetting properties of a hexamethyldisiloxane and be combined with the low viscosity of butanone to create an improved fluid.

The light modulation array 270 also includes a light guide 288 and one or more light sources 292 which inject light 294 into the light guide 288. A series of light redirectors 291 are formed on the rear surface of the light guide, proximate a front facing reflective layer 290. The light redirectors 291 may be either diffuse or specular reflectors. The modulation array 270 includes an aperture layer 286 which is patterned into a series of apertures, one aperture for each of the cells 272, to allow light rays 294 to pass through the cells 272 and toward the viewer.

In some embodiments the aperture layer 286 is comprised of a light absorbing material to block the passage of light except through the patterned apertures. In another embodiment the aperture layer 286 is comprised of a reflective material which reflects light not passing through the surface apertures back towards the rear of the light guide 288. After returning to the light guide, the reflected light can be further recycled by the front facing reflective layer 290.

In operation, application of a voltage to the electrode 282 of a cell causes the light absorbing oil 280 in the cell to move into or collect in one portion of the cell 272. As a result, the light absorbing oil 280 no longer obstructs the passage of light through the aperture formed in the reflective aperture layer 286 (see, for example, cells 272b and 272c). Light escaping the light guide 288 at the aperture is then able to escape through the cell and through a corresponding color (for example, red, green, or blue) filter in the set of color filters 276 to form a color pixel in an image. When the electrode 282 is grounded, the light absorbing oil 280 returns to its previous position (as in cell 272a) and covers the aperture in the reflective aperture layer 286, absorbing any light 294 attempting to pass through it.

The roller-based light modulator 220, light tap 250, and electrowetting-based light modulation array 270 are not the only examples of MEMS light modulators suitable for inclusion in various embodiments of the invention. It will be understood that other MEMS light modulators can exist and can be usefully incorporated into the invention.

U.S. patent application Ser. Nos. 11/251,035 (which issued as U.S. Pat. No. 7,271,945) and 11/326,696 have described a variety of methods by which an array of shutters can be controlled via a control matrix to produce images, in many cases moving images, with appropriate gray scale. In some cases, control is accomplished by means of a passive matrix array of row and column interconnects connected to driver circuits on the periphery of the display. In other cases it is appropriate to include switching and/or data storage elements within each pixel of the array (the so-called active matrix) to improve either the speed, the gray scale and/or the power dissipation performance of the display.

Figure 3A:
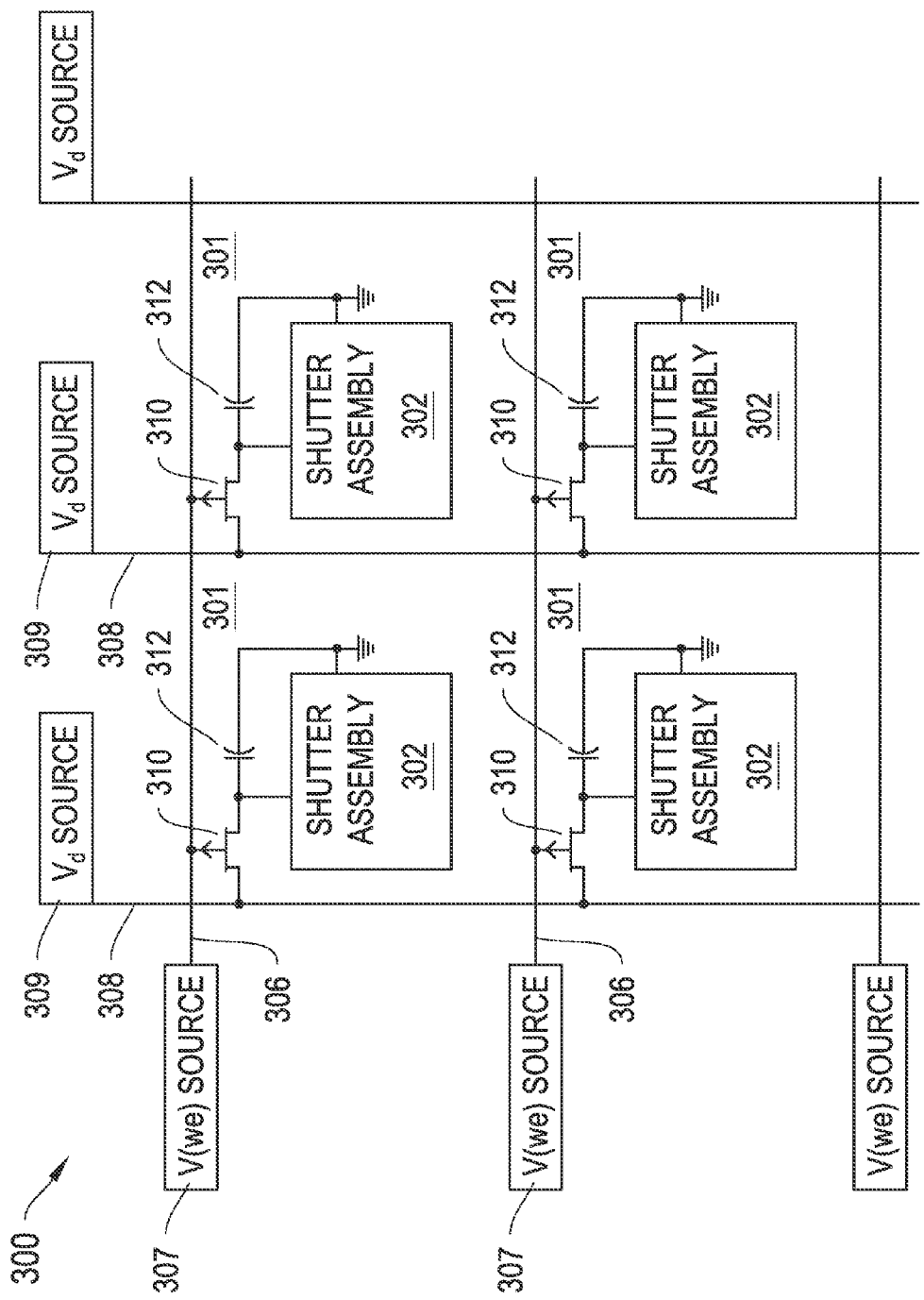
FIG. 3A is a schematic diagram of a control matrix suitable for controlling the light modulators incorporated into the MEMS-based display of FIG. 1A, according to an illustrative embodiment of the invention.
Figure 3B:
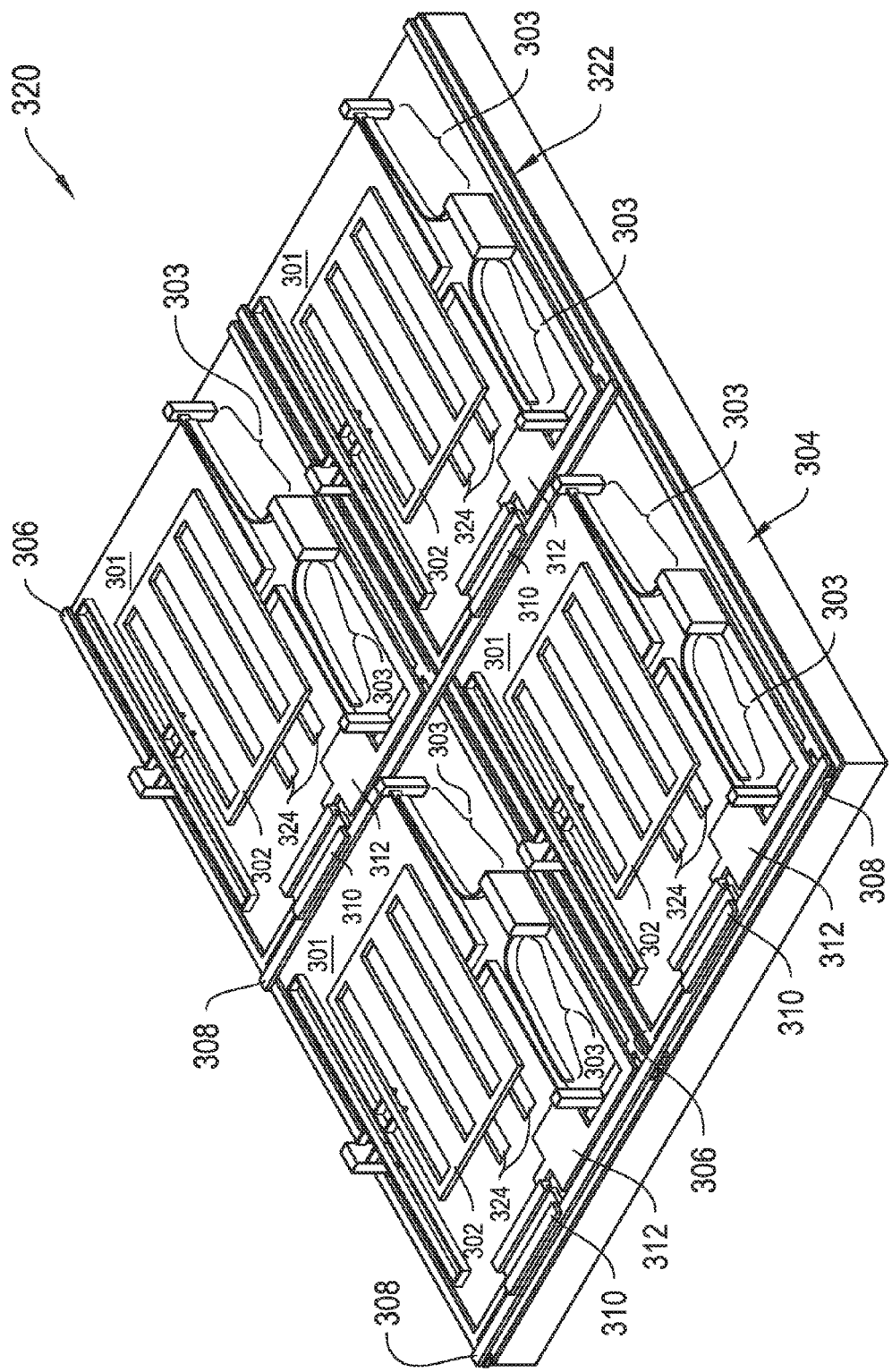
FIG. 3B is a perspective view of an array of shutter-based light modulators connected to the control matrix of FIG. 3A, according to an illustrative embodiment of the invention.

FIG. 3A is a schematic diagram of a control matrix 300 suitable for controlling the light modulators incorporated into the MEMS-based display apparatus 100 of FIG. 1A, according to an illustrative embodiment of the invention. FIG. 3B is a perspective view of an array 320 of shutter-based light modulators connected to the control matrix 300 of FIG. 3A, according to an illustrative embodiment of the invention. The control matrix 300 may address an array of pixels 320 (the "array 320"). Each pixel 301 includes an elastic shutter assembly 302, such as the shutter assembly 200 of FIG. 2A, controlled by an actuator 303. Each pixel also includes an aperture layer 322 that includes apertures 324. Further electrical and mechanical descriptions of shutter assemblies such as shutter assembly 302, and variations thereon, can be found in U.S. patent application Ser. Nos. 11/251,035 (which issued as U.S. Pat. No. 7,271,945) and 11/326,696. Descriptions of alternate control matrices can also be found in U.S. patent application Ser. No. 11/607,715 (which issued as U.S. Pat. No. 8,310,442) the entirety of which is incorporated herein by reference.

The control matrix 300 is fabricated as a diffused or thin-film-deposited electrical circuit on the surface of a substrate 304 on which the shutter assemblies 302 are formed. The control matrix 300 includes a scan-line interconnect 306 for each row of pixels 301 in the control matrix 300 and a data-interconnect 308 for each column of pixels 301 in the control matrix 300. Each scan-line interconnect 306 electrically connects a write-enabling voltage source 307 to the pixels 301 in a corresponding row of pixels 301. Each data interconnect 308 electrically connects a data voltage source, ("Vd source") 309 to the pixels 301 in a corresponding column of pixels 301. In control matrix 300, the data voltage $V_d$ provides the majority of the energy necessary for actuation of the shutter assemblies 302. Thus, the data voltage source 309 also serves as an actuation voltage source.

Referring to FIGS. 3A and 3B, for each pixel 301 or for each shutter assembly 302 in the array of pixels 320, the control matrix 300 includes a transistor 310 and a capacitor 312. The gate of each transistor 310 is electrically connected to the scan-line interconnect 306 of the row in the array 320 in which the pixel 301 is located. The source of each transistor 310 is electrically connected to its corresponding data interconnect 308. The actuators 303 of each shutter assembly 302 include two electrodes. The drain of each transistor 310 is electrically connected in parallel to one electrode of the corresponding capacitor 312 and to one of the electrodes of the corresponding actuator 303. The other electrode of the capacitor 312 and the other electrode of the actuator 303 in shutter assembly 302 are connected to a common or ground potential. In alternate implementations, the transistors 310 can be replaced with semiconductor diodes and or metal-insulator-metal sandwich type switching elements.

In operation, to form an image, the control matrix 300 write-enables each row in the array 320 in a sequence by applying $V_{we}$ to each scan-line interconnect 306 in turn. For a write-enabled row, the application of $V_{we}$ to the gates of the transistors 310 of the pixels 301 in the row allows the flow of current through the data interconnects 308 through the transistors 310 to apply a potential to the actuator 303 of the shutter assembly 302. While the row is write-enabled, data voltages $V_d$ are selectively applied to the data interconnects 308. In implementations providing analog gray scale, the data voltage applied to each data interconnect 308 is varied in relation to the desired brightness of the pixel 301 located at the intersection of the write-enabled scan-line interconnect 306 and the data interconnect 308. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 308, the actuator 303 in the corresponding shutter assembly 302 actuates, opening the shutter in that shutter assembly 302. The voltage applied to the data interconnect 308 remains stored in the capacitor 312 of the pixel 301 even after the control matrix 300 ceases to apply $V_{we}$ to a row. It is not necessary, therefore, to wait and hold the voltage $V_{we}$ on a row for times long enough for the shutter assembly 302 to actuate; such actuation can proceed after the write-enabling voltage has been removed from the row. The capacitors 312 also function as memory elements within the array 320, storing actuation instructions for periods as long as is necessary for the illumination of an image frame.

The pixels 301 as well as the control matrix 300 of the array 320 are formed on a substrate 304. The array includes an aperture layer 322, disposed on the substrate 304, which includes a set of apertures 324 for respective pixels 301 in the array 320. The apertures 324 are aligned with the shutter assemblies 302 in each pixel. In one implementation the substrate 304 is made of a transparent material, such as glass or plastic. In another implementation the substrate 304 is made of an opaque material, but in which holes are etched to form the apertures 324.

Components of shutter assemblies 302 are processed either at the same time as the control matrix 300 or in subsequent processing steps on the same substrate. The electrical components in control matrix 300 are fabricated using many thin film techniques in common with the manufacture of thin film transistor arrays for liquid crystal displays. Available techniques are described in Den Boer, Active Matrix Liquid Crystal Displays (Elsevier, Amsterdam, 2005), the entirety of which is incorporated herein by reference. The shutter assemblies are fabricated using techniques similar to the art of micromachining or from the manufacture of micromechanical (i.e., MEMS) devices. Many applicable thin film MEMS techniques are described in Rai-Choudhury, ed., Handbook of Microlithography, Micromachining & Microfabrication (SPIE Optical Engineering Press, Bellingham, Wash. 1997), the entirety of which is incorporated herein by reference. Fabrication techniques specific to MEMS light modulators formed on glass substrates can be found in U.S. patent application Ser. Nos. 11/361,785 (which issued as U.S. Pat. No. 7,405,852) and 11/731,628 (which issued as U.S. Pat. No. 7,675,665), the entireties of which are incorporated herein by reference. For instance, as described in those applications, the shutter assembly 302 can be formed from thin films of amorphous silicon, deposited by a chemical vapor deposition process.

The shutter assembly 302 together with the actuator 303 can be made bi-stable. That is, the shutters can exist in at least two equilibrium positions (e.g. open or closed) with little or no power required to hold them in either position. More particularly, the shutter assembly 302 can be mechanically bi-stable. Once the shutter of the shutter assembly 302 is set in position, no electrical energy or holding voltage is required to maintain that position. The mechanical stresses on the physical elements of the shutter assembly 302 can hold the shutter in place.

The shutter assembly 302 together with the actuator 303 can also be made electrically bi-stable. In an electrically bi-stable shutter assembly, there exists a range of voltages below the actuation voltage of the shutter assembly, which if applied to a closed actuator (with the shutter being either open or closed), holds the actuator closed and the shutter in position, even if an opposing force is exerted on the shutter. The opposing force may be exerted by a spring such as spring 207 in shutter-based light modulator 200, or the opposing force may be exerted by an opposing actuator, such as an "open" or "closed" actuator.

The light modulator array 320 is depicted as having a single MEMS light modulator per pixel. Other embodiments are possible in which multiple MEMS light modulators are provided in each pixel, thereby providing the possibility of more than just binary 'on' or "off" optical states in each pixel. Certain forms of coded area division gray scale are possible where multiple MEMS light modulators in the pixel are provided, and where apertures 324, which are associated with each of the light modulators, have unequal areas.

In other embodiments the roller-based light modulator 220, the light tap 250, or the electrowetting-based light modulation array 270, as well as other MEMS-based light modulators, can be substituted for the shutter assembly 302 within the light modulator array 320.

Figure 4B:
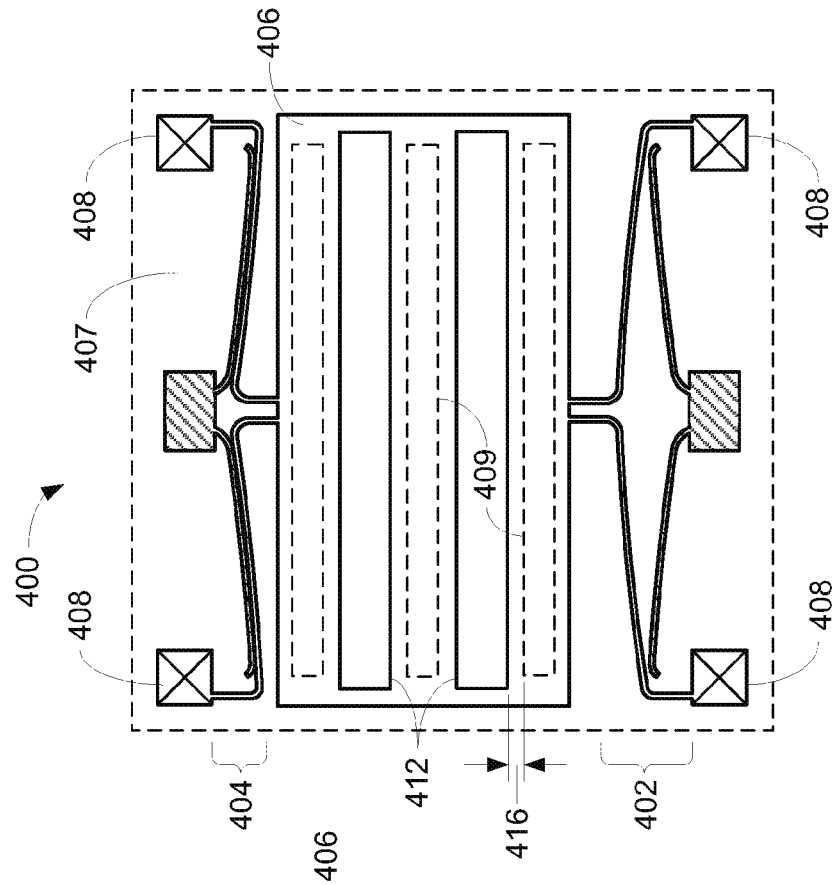
FIGS. 4A and 4B are plan views of a dual-actuated shutter assembly in the open and closed states respectively, according to an illustrative embodiment of the invention.
Figure 4A:
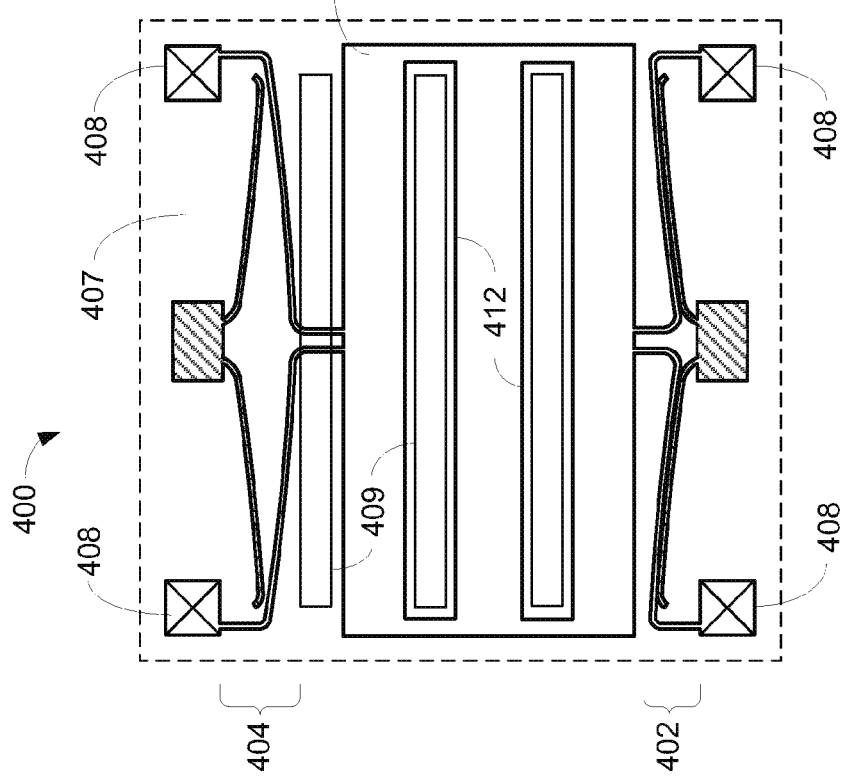

FIGS. 4A and 4B illustrate an alternative shutter-based light modulator (shutter assembly) 400 suitable for inclusion in various embodiments of the invention. The light modulator 400 is an example of a dual actuator shutter assembly, and is shown in FIG. 4A in an open state. FIG. 4B is a view of the dual actuator shutter assembly 400 in a closed state. Shutter assembly 400 is described in further detail in U.S. patent application Ser. No. 11/251,035, referenced above. In contrast to the shutter assembly 200, shutter assembly 400 includes actuators 402 and 404 on either side of a shutter 406. Each actuator 402 and 404 is independently controlled. A first actuator, a shutter-open actuator 402, serves to open the shutter 406. A second opposing actuator, the shutter-close actuator 404, serves to close the shutter 406. Both actuators 402 and 404 are compliant beam electrode actuators. The actuators 402 and 404 open and close the shutter 406 by driving the shutter 406 substantially in a plane parallel to an aperture layer 407 over which the shutter is suspended. The shutter 406 is suspended a short distance over the aperture layer 407 by anchors 408 attached to the actuators 402 and 404. The inclusion of supports attached to both ends of the shutter 406 along its axis of movement reduces out of plane motion of the shutter 406 and confines the motion substantially to a plane parallel to the substrate. By analogy to the control matrix 300 of FIG. 3A, a control matrix suitable for use with shutter assembly 400 might include one transistor and one capacitor for each of the opposing shutter-open and shutter-close actuators 402 and 404.

The shutter 406 includes two shutter apertures 412 through which light can pass. The aperture layer 407 includes a set of three apertures 409. In FIG. 4A, the shutter assembly 400 is in the open state and, as such, the shutter-open actuator 402 has been actuated, the shutter-close actuator 404 is in its relaxed position, and the centerlines of apertures 412 and 409 coincide. In FIG. 4B the shutter assembly 400 has been moved to the closed state and, as such, the shutter-open actuator 402 is in its relaxed position, the shutter-close actuator 404 has been actuated, and the light blocking portions of shutter 406 are now in position to block transmission of light through the apertures 409 (shown as dotted lines).

Each aperture has at least one edge around its periphery. For example, the rectangular apertures 409 have four edges. In alternative implementations in which circular, elliptical, oval, or other curved apertures are formed in the aperture layer 407, each aperture may have only a single edge. In other implementations the apertures need not be separated or disjoint in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through apertures 412 and 409 in the open state, it is advantageous to provide a width or size for shutter apertures 412 which is larger than a corresponding width or size of apertures 409 in the aperture layer 407. In order to effectively block light from escaping in the closed state, it is preferable that the light blocking portions of the shutter 406 overlap the apertures 409. FIG. 4B shows a predefined overlap 416 between the edge of light blocking portions in the shutter 406 and one edge of the aperture 409 formed in aperture layer 407.

The electrostatic actuators 402 and 404 are designed so that their voltage-displacement behavior provides a bi-stable characteristic to the shutter assembly 400. For each of the shutter-open and shutter-close actuators there exists a range of voltages below the actuation voltage, which if applied while that actuator is in the closed state (with the shutter being either open or closed), will hold the actuator closed and the shutter in position, even after an actuation voltage is applied to the opposing actuator. The minimum voltage needed to maintain a shutter's position against such an opposing force is referred to as a maintenance voltage $V_m$. A number of control matrices which take advantage of the bi-stable operation characteristic are described in U.S. patent application Ser. No. 11/607,715 (which issued as U.S. Pat. No. 8,310,442), referenced above.

Figure 5:
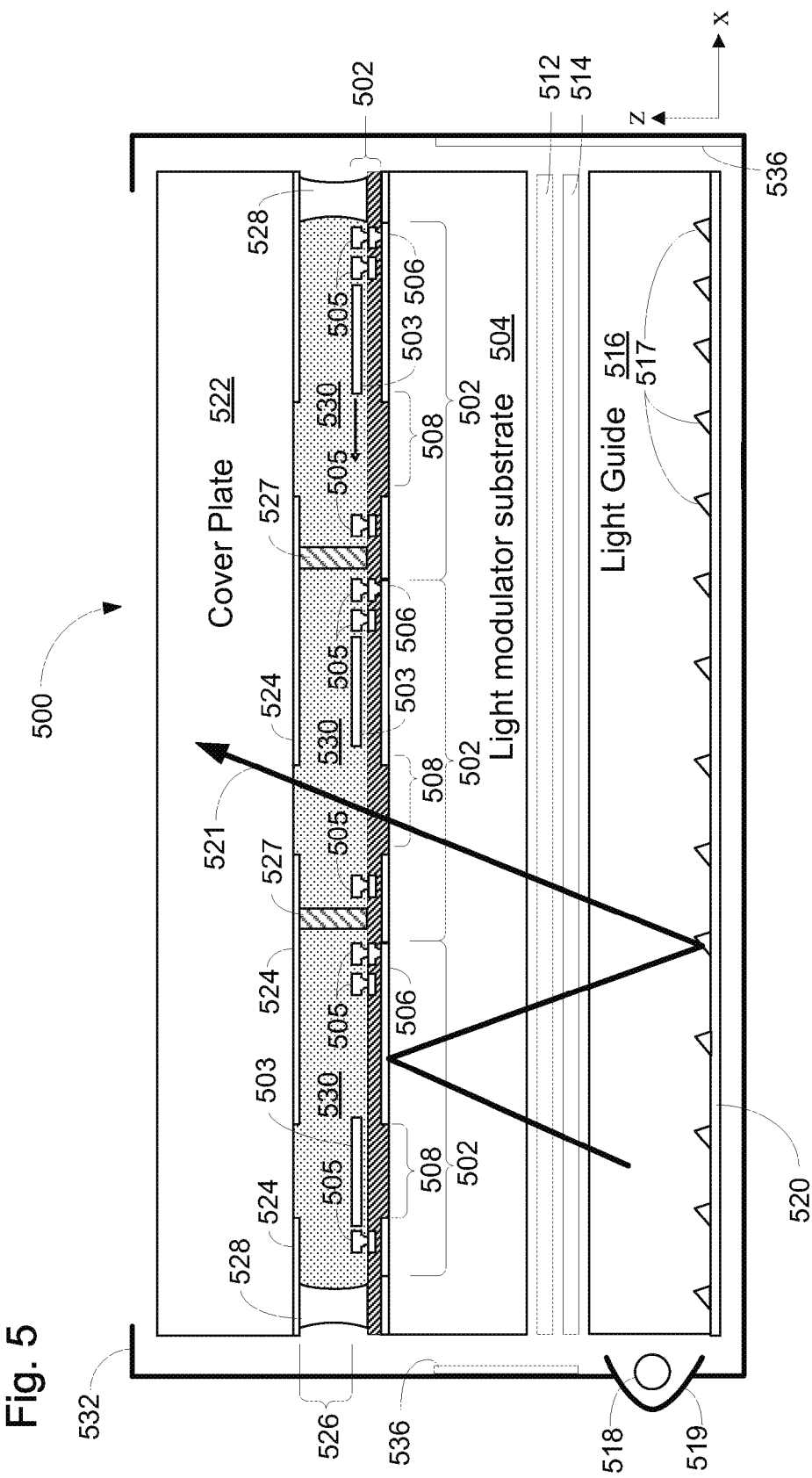
FIG. 5 is a cross-sectional view of a shutter-based display apparatus, according to an illustrative embodiment of the invention.

FIG. 5 is a cross sectional view of a display apparatus 500 incorporating shutter-based light modulators (shutter assemblies) 502, according to an illustrative embodiment of the invention. Each shutter assembly incorporates a shutter 503 and an anchor 505. Not shown are the compliant beam actuators which, when connected between the anchors 505 and the shutters 503, help to suspend the shutters a short distance above the surface. The shutter assemblies 502 are disposed on a transparent substrate 504, preferably made of plastic or glass. A rear-facing reflective layer, reflective film 506, disposed on the substrate 504 defines a plurality of surface apertures 508 located beneath the closed positions of the shutters 503 of the shutter assemblies 502. The reflective film 506 reflects light not passing through the surface apertures 508 back towards the rear of the display apparatus 500. The reflective aperture layer 506 can be a fine-grained metal film without inclusions formed in thin film fashion by a number of vapor deposition techniques including sputtering, evaporation, ion plating, laser ablation, or chemical vapor deposition. In another implementation, the rear-facing reflective layer 506 can be formed from a mirror, such as a dielectric mirror. A dielectric mirror is fabricated as a stack of dielectric thin films which alternate between materials of high and low refractive index. The vertical gap which separates the shutters 503 from the reflective film 506, within which the shutter is free to move, is in the range of 0.5 to 10 microns. The magnitude of the vertical gap is preferably less than the lateral overlap between the edge of shutters 503 and the edge of apertures 508 in the closed state, such as the overlap 416 shown in FIG. 4B.

The display apparatus 500 includes an optional diffuser 512 and/or an optional brightness enhancing film 514 which separate the substrate 504 from a planar light guide 516. The light guide is comprised of a transparent, i.e. glass or plastic material. The light guide 516 is illuminated by one or more light sources 518, forming a backlight. The light sources 518 can be, for example, and without limitation, incandescent lamps, fluorescent lamps, lasers, or light emitting diodes (LEDs). A reflector 519 helps direct light from lamp 518 towards the light guide 516. A front-facing reflective film 520 is disposed behind the backlight 516, reflecting light towards the shutter assemblies 502. Light rays such as ray 521 from the backlight that do not pass through one of the shutter assemblies 502 will be returned to the backlight and reflected again from the film 520. In this fashion light that fails to leave the display to form an image on the first pass can be recycled and made available for transmission through other open apertures in the array of shutter assemblies 502. Such light recycling has been shown to increase the illumination efficiency of the display.

The light guide 516 includes a set of geometric light redirectors or prisms 517 which re-direct light from the lamps 518 towards the apertures 508 and hence toward the front of the display. The light re-directors can be molded into the plastic body of light guide 516 with shapes that can be alternately triangular, trapezoidal, or curved in cross section. The density of the prisms 517 generally increases with distance from the lamp 518.

In alternate embodiments the aperture layer 506 can be made of a light absorbing material, and in alternate embodiments the surfaces of shutter 503 can be coated with either a light absorbing or a light reflecting material. In alternate embodiments the aperture layer 506 can be deposited directly on the surface of the light guide 516. In alternate embodiments the aperture layer 506 need not be disposed on the same substrate as the shutters 503 and anchors 505 (see the MEMS-down configuration described below). These and other embodiments for a display illumination system are described in detail in the U.S. patent application Ser. Nos. 11/218,690 (which issued as U.S. Pat. No. 7,417,782) and 11/528,191 (which issued as U.S. Pat. No. 7,876,489), the entireties of which are incorporated herein by reference.

In one implementation the light sources 518 can include lamps of different colors, for instance, the colors red, green, and blue. A color image can be formed by sequentially illuminating images with lamps of different colors at a rate sufficient for the human brain to average the different colored images into a single multi-color image. The various color-specific images are formed using the array of shutter assemblies 502. In another implementation, the light source 518 includes lamps having more than three different colors. For example, the light source 518 may have red, green, blue and white lamps or red, green, blue, and yellow lamps.

A cover plate 522 forms the front of the display apparatus 500. The rear side of the cover plate 522 can be covered with a black matrix 524 to increase contrast. In alternate implementations the cover plate includes color filters, for instance distinct red, green, and blue filters corresponding to different ones of the shutter assemblies 502. The cover plate 522 is supported a predetermined distance away from the shutter assemblies 502 forming a gap 526. The gap 526 is maintained by mechanical supports or spacers 527 and/or by an adhesive seal 528 attaching the cover plate 522 to the substrate 504.

The adhesive seal 528 seals in a working fluid 530. The working fluid 530 is engineered with viscosities preferably below about 10 centipoise and with relative dielectric constant preferably above about 2.0, and dielectric breakdown strengths above about $10^4$ V/cm. The working fluid 530 can also serve as a lubricant. In one implementation, the working fluid 530 is a hydrophobic liquid with a high surface wetting capability. In alternate implementations the working fluid 530 has a refractive index that is either greater than or less than that of the substrate 504.

When the MEMS-based display assembly includes a liquid for the working fluid 530, the liquid at least partially surrounds the moving parts of the MEMS-based light modulator. In order to reduce the actuation voltages, the liquid has a viscosity preferably below 70 centipoise, more preferably below 10 centipoise. Liquids with viscosities below 70 centipoise can include materials with low molecular weights: below 4000 grams/mole, or in some cases below 400 grams/mole. Suitable working fluids 530 include, without limitation, de-ionized water, methanol, ethanol and other alcohols, paraffins, olefins, ethers, silicone oils, fluorinated silicone oils, or other natural or synthetic solvents or lubricants. Useful working fluids can be polydimethylsiloxanes, such as hexamethyldisiloxane and octamethyltrisiloxane, or alkyl methyl siloxanes such as hexylpentamethyldisiloxane. Useful working fluids can be alkanes, such as octane or decane. Useful fluids can be nitroalkanes, such as nitromethane. Useful fluids can be aromatic compounds, such as toluene or diethylbenzene. Useful fluids can be ketones, such as butanone or methyl isobutyl ketone. Useful fluids can be chlorocarbons, such as chlorobenzene. Useful fluids can be chlorofluorocarbons, such as dichlorofluoroethane or chlorotrifluoroethylene. And other fluids considered for these display assemblies include butyl acetate, dimethylformamide.

For many embodiments it is advantageous to incorporate a mixture of the above fluids. For instance mixtures of alkanes or mixtures of polydimethylsiloxanes can be useful where the mixture includes molecules with a range of molecular weights. It is also possible to optimize properties by mixing fluids from different families or fluids with different properties. For instance, the surface wetting properties of a hexamethyldisiloxane and be combined with the low viscosity of butanone to create an improved fluid.

A sheet metal or molded plastic assembly bracket 532 holds the cover plate 522, the substrate 504, the backlight 516 and the other component parts together around the edges. The assembly bracket 532 is fastened with screws or indent tabs to add rigidity to the combined display apparatus 500. In some implementations, the light source 518 is molded in place by an epoxy potting compound. Reflectors 536 help return light escaping from the edges of light guide 516 back into the light guide. Not shown in FIG. 5 are electrical interconnects which provide control signals as well as power to the shutter assemblies 502 and the lamps 518.

Further details and alternate configurations for the display apparatus 500, including manufacturing methods therefore, can be found in the U.S. patent application Ser. Nos. 11/361,785 (which issued as U.S. Pat. No. 7,405,852) and 11/731, 628 (which issued as U.S. Pat. No. 7,675,665), the entireties of which are incorporated herein by reference.

In other embodiments, the roller-based light modulator 220, the light tap 250, or the electrowetting-based light modulation array 270, as well as other MEMS-based light modulators, can be substituted for the shutter assemblies 502 within the display assembly 500.

Display apparatus 500 is referred to as the MEMS-up configuration, wherein the MEMS based light modulators are formed on a front surface of substrate 504, i.e. the surface that faces toward the viewer. The shutter assemblies 502 are built directly on top of the reflective aperture layer 506. In an alternate embodiment of the invention, referred to as the MEMS-down configuration, the shutter assemblies are disposed on a substrate separate from the substrate on which the reflective aperture layer is formed. The substrate on which the reflective aperture layer is formed, defining a plurality of apertures, is referred to herein as the aperture plate. In the MEMS-down configuration, the substrate that carries the MEMS-based light modulators takes the place of the cover plate 522 in display apparatus 500 and is oriented such that the MEMS-based light modulators are positioned on the rear surface of the top substrate, i.e. the surface that faces away from the viewer and toward the back light 516. The MEMS-based light modulators are thereby positioned directly opposite to and across a gap from the reflective aperture layer. The gap can be maintained by a series of spacer posts connecting the aperture plate and the substrate on which the MEMS modulators are formed. In some implementations the spacers are disposed within or between each pixel in the array. The gap or distance that separates the MEMS light modulators from their corresponding apertures is preferably less than 10 microns, or a distance that is less than the overlap between shutters and apertures, such as overlap 416. Further details and alternate embodiments for the MEMS-down display configuration can be found in the U.S. patent application Ser. Nos. 11/361,785 (which issued as U.S. Pat. No. 7,405,852), 11/528,191 (which issued as U.S. Pat. No. 7,876,489), and 11/731,628 (which issued as U.S. Pat. No. 7,675,665) referenced above.

The aperture plate 2700 of FIG. 6 illustrates the detailed structures within one implementation of an aperture plate, for use in a MEMS-down configuration. The aperture plate 2700 includes a substrate 2702, a dielectrically enhanced metal mirror 2704, a light absorbing layer 2706, and a spacer post 2708. The dielectrically enhanced metal mirror and the light absorbing layer have been patterned into apertures 2709.

The substrate 2702 is preferably a transparent material, for example glass or plastic. The dielectrically enhanced metal mirror 2704 is comprised of a 5-layer stack of materials including, in order from the substrate up, a thin film of Si3N4 2710, a thin film of SiO2 2712, another thin film of Si3N4 2710, another thin film of SiO2, 2712, and a thin film of aluminum 2714. The relative thicknesses and preferred refractive indices of these layers are given in Table 1.

TABLE 1

Film Thicknesses and Refractive Indices for a Dielectrically Enhanced Metal Mirror.

| Thin film material | Thickness | Refractive index |
|---|---|---|
| 5. Aluminum | 200 nm or less | NA |
| 4. SiO2 | 88 nm | 1.46 |
| 3. Si3N4 | 64 nm | 2.0 |
| 2. SiO2 | 88 nm | 1.46 |
| 1. Si3N4 | 64 nm | 2.0 |

The light absorbing layer 2706 can be formed from a thin film of black chrome, which is a composite of chromium metal particles suspended in an oxide or nitride matrix. Examples include Cr particles in a Cr2O3 matrix or Cr particles in an SiO2 matrix. In other implementations black chrome can be formed from a thin metal film of chromium upon which a thin film of CrOx (a sub-oxide of chromium) has been either grown or deposited. A preferred thickness for the black chrome is 150 nm.

The aperture windows 2709 can be patterned from the thin film stack of materials 2704 and 2706 by processes known in the art such as photolithography and etch or by photolithography and lift-off. In the etch process a layer of photoresist is added to the top of the thin film stack and then exposed to UV light through a mask. After developing the aperture pattern in the exposed layer of photoresist, the whole stack is etched in the region of apertures 2709 down to the substrate 2702. Such etching may be accomplished by immersion in wet chemicals, by a dry plasma or ion beam etch, or any combination of the above. In the lift-off process the layer of photoresist is added to the glass before deposition of the thin film stack, the resist being developed into a pattern that is a reverse of the etch mask pattern. The thin film stack is then deposited over the top of the photoresist, such that the thin film stack makes contact to the glass everywhere except in the regions of the apertures 2709. After deposition of the thin film stack is complete, the substrate is dipped into a bath of chemicals that dissolves or lifts-off the photoresist as well as any thin film materials that were deposited on top of the photoresist.

The spacer post 2708 is formed from a photo-imageable polymer such as such as a photo-imageable epoxy (in particular a novolac epoxy) or a photo-imageable polyimide material. Other polymer families that can be prepared in photo-imageable form and are useful for this application include polyarylene, parylene, benzocyclobutane, perfluorocyclobutane, silsesquioxane, and silicone polymers. A particular photo-imageable resist useful for the spacer application is the Nano SU-8 material available from Microchem Corporation, headquartered in Newton, Mass.

The polymer spacer material is initially deposited as a thick film on top of the thin film stack 2704 and 2706 after the apertures 2709 have been patterned. The photo-imageable polymer is then exposed to UV light through a mask. Alignment marks help to ensure that the resultant spacers 2708 are located correctly with respect to apertures 2709. For instance, alignment fiducials can be formed on the periphery of the display during the process of etching the apertures 2709. These fiducials are then aligned to a corresponding set of fiducials on the exposure mask to ensure a correct location of spacers 2708. A developing process is then effective at removing all of the polymer except where it was exposed to the UV light. In an alternate method, the features on the exposure mask may be aligned directly to display features on the substrate 2702, such as the apertures 2709.

In one implementation the spacer posts can be 8 microns tall. In other implementations spacer heights may range from about 2 microns to about 50 microns, e.g., 4 microns. When cross sectioned in the plane of the substrate 2702, the spacers may take regular shapes such as a cylinder or a rectangle with widths in the range of 2 to 50 microns, e.g., 4 microns. Alternately, they can have complex irregular cross sections which are designed to maximize the contact area of the spacer while fitting between other structures on the substrate, such as apertures 2709. In a preferred implementation the spacer size, shape and placement is determined so that the spacers do not interfere with the movement of the shutters, such as shutters 406 or other MEMS components, such as actuators 404 in display apparatus 400.

In another embodiment, the spacer post 2708 is not provided as a polymer material but is instead composed of a heat re-flowable joining material, such as a solder alloy. The solder alloy can pass through a melting or re-flow step which allows the solder alloy to wet or bond to a mating surface on the opposing substrate. The solder alloy therefore performs an additional function as a joining material between an aperture plate and a modulator substrate. Because of the reflow process, the solder alloy typically relaxes to an oblate shape referred to as the solder bump. A predetermined spacing between substrates can be maintained through control over the average volume of material in the solder bump. Solder bumps can be applied to aperture plate 2700 by means of thin film deposition, by thick film deposition through a stencil mask, or by electroplating.

In another embodiment, the aperture plate 2700 can be subjected to a sandblasting treatment after the steps of forming the optical layers 2704 and 2708. The sandblasting has the effect of roughening the substrate surface selectively in the regions of the aperture 2709. A roughened surface at aperture 2709 behaves as an optical diffuser which can provide the benefits of a wider viewing angle for the display. In another embodiment, a diffusing surface at aperture 2709 is provided by means of an etching process, where the etch is selectively applied in the regions of apertures 2709 after exposure of photoresist to a photomask. Etch pits or trenches can be created through proper design of the photomask, and the sidewall angles or depths of the pits or trenches can be controlled by means of either a wet or dry etch process. In this fashion optical structures with controlled degrees of diffusive broadening can be created. In this fashion anisotropic diffusers can be created at the substrate surface which deflect light along a preferred optical axis, creating elliptical and/or multi-directional cones of emitted light.

In another embodiment, an etched trench can be provided in substrate 2702 that substantially surrounds the display along the periphery of the array of apertures 2709 (i.e. around the periphery of the active display region). The etched trench performs as a mechanical locating structure for restricting the motion or flowing of an adhesive, such as adhesive 528, used to seal aperture plate 2700 to an opposing substrate.

Further details regarding the materials and processes described above can be found in U.S. patent application Ser. No. 11/361,785, filed Feb. 23, 2006, which issued as U.S. Pat. No. 7,405,852, incorporated herein by reference. For example, that application includes additional materials and processing methodologies regarding the formation of dielectrically enhanced metal mirrors with apertures, light absorbing layers, and spacer posts. Although dielectric mirrors and spacers are described in that application in the context of an integrated (for example MEMS-up) display design, it will be understood that similar processes can be adapted to the fabrication of an aperture plate, such as aperture plate 2700.

In some implementations of the aperture plate 2700, it is desirable to employ a transparent plastic material for the substrate 2702. Applicable plastics include, without limitation, polymethylmethacrylate (PMMA) and polycarbonate. When plastic materials are used, it also becomes possible to utilize an injection molding or stamping process for the formation of spacer posts 2708. In such a process the spacer posts are formed in a mold or a stamper first, before the application of the dielectrically enhanced metal mirror 2704. All of the layers of the dielectrically enhanced metal mirror 2704 would be then be deposited in sequence on top of the substrate which already includes spacer posts 2708. The light absorbing layer 2706 is deposited on top of the dielectric mirror 2704. In order to pattern the aperture window 2709 a special photoresist is applied that uniformly coats the surfaces of the thin films without being disrupted by the presence of spacer posts 2708. Suitable photoresists include spray-on photoresists and electroplated photoresists. Alternately, a spin-on resist is applied followed by a reflow step that provides an even resist thickness across the thin film surfaces in the areas of apertures 2709. The exposure of the resist, developing, and etching of the thin film layers then proceeds as described above. After the removal of the photoresist, the process is complete. A liftoff process can also be employed to pattern the dielectrically enhanced mirror as described above. The use of a molding or stamping process for the formation of spacer posts 2708 helps to reduce the material costs required in the fabrication of aperture plate 2700.

In some display implementations, the aperture plate, for instance aperture plate 2804 is combined with a light guide, such as light guide 516 into one solid body, referred to herein as a unitary or composite backlight, described further in U.S. patent application Ser. Nos. 11/218,690 (which issued as U.S. Pat. No. 7,417,782) and 11/528,191 (which issued as U.S. Pat. No. 7,876,489), respectively. Both applications are incorporated herein by reference. All of the processes described above for the formation of the dielectrically enhanced metal mirror 2704, for the light absorbing layer 2706, and/or for the spacer posts 2708 can be similarly applied to a substrate which is bonded to or otherwise indistinguishable from the light guide. The surface of the unitary backlight onto which the thin films are applied can be glass, or it could be plastic, including a plastic which has been molded to form spacer posts, such as spacers 527.

In one implementation, the spacer posts 2708 are formed or attached to aperture plate 2700 before the aperture plate is aligned to a modulator substrate. In an alternative implementation of display apparatus 500, the spacer posts 527 are fabricated on top of and as a part of the modulator substrate 504, before the modulator substrate is aligned to an aperture plate. Such an implementation was described with respect to FIG. 20 within the aforementioned U.S. patent application Ser. No. 11/361,785 (which issued as U.S. Pat. No. 7,405,852).

Figure 7:
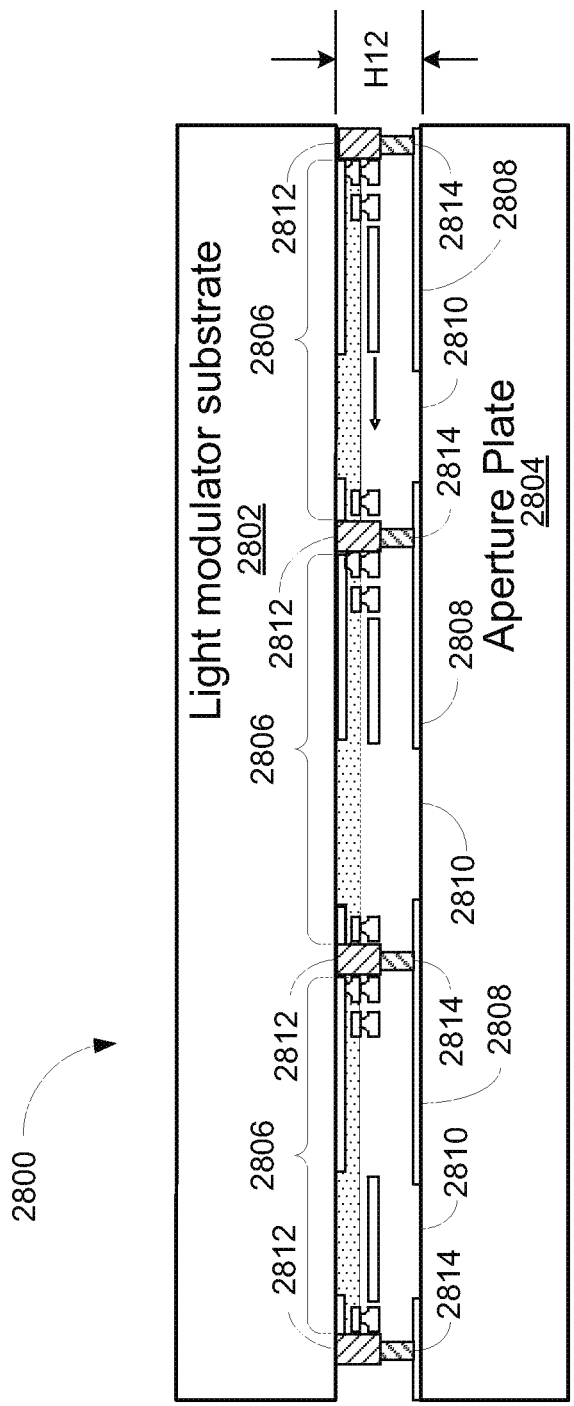
FIG. 7 is a cross sectional view of a display, according to an illustrative embodiment of the invention.

FIG. 7 is a cross sectional view of a display according to an illustrative embodiment of the invention. The display assembly 2800 comprises a modulator substrate 2802 and an aperture plate 2804. The display assembly 2800 also includes a set of shutter assemblies 2806 and a reflective aperture layer 2808. The reflective aperture layer 2805 includes apertures 2810. A predetermined gap or separation between the substrate 2802 and 2804 is maintained by the opposing set of spacers 2812 and 2814. The spacers 2812 are formed on or as part of the modulator substrate 2802. The spacers 2814 are formed on or as part of the aperture plate 2804. During assembly, the two substrates 2802 and 2804 are aligned so that spacers 2812 on the modulator substrate 2802 make contact with their respective spacers 2814.

The separation or distance of this illustrative example is 8 microns. To establish this separation, the spacers 2812 are 2 microns tall and the spacers 2814 are 6 microns tall. Alternately, both spacers 2812 and 2814 can be 4 microns tall, or the spacers 2812 can be 6 microns tall while the spacers 2814 are 2 microns tall. In fact, any combination of spacer heights can be employed as long as their total height establishes the desired separation H12.

Providing spacers on both of the substrates 2802 and 2804, which are then aligned or mated during assembly, has advantages with respect to materials and processing costs. The provision of a very tall (e.g. 8 micron) spacer, such as spacer 2708, can be costly as it can require relatively long times for the cure, exposure, and development of a photo-imageable polymer. The use of mating spacers as in display assembly 2800 allows for the use of thinner coatings of the polymer on each of the substrates.

In another implementation, the spacers 2812 which are formed on the modulator substrate 2802 can be formed from the same materials and patterning steps that were used to form the shutter assemblies 2806. For instance, the anchors employed for shutter assemblies 2806 can also perform a function similar to spacer 2812. In this implementation a separate application of a polymer material to form a spacer would not be required and a separate exposure mask for the spacers would not be required.

Cell Assembly Methods

Figure 8:
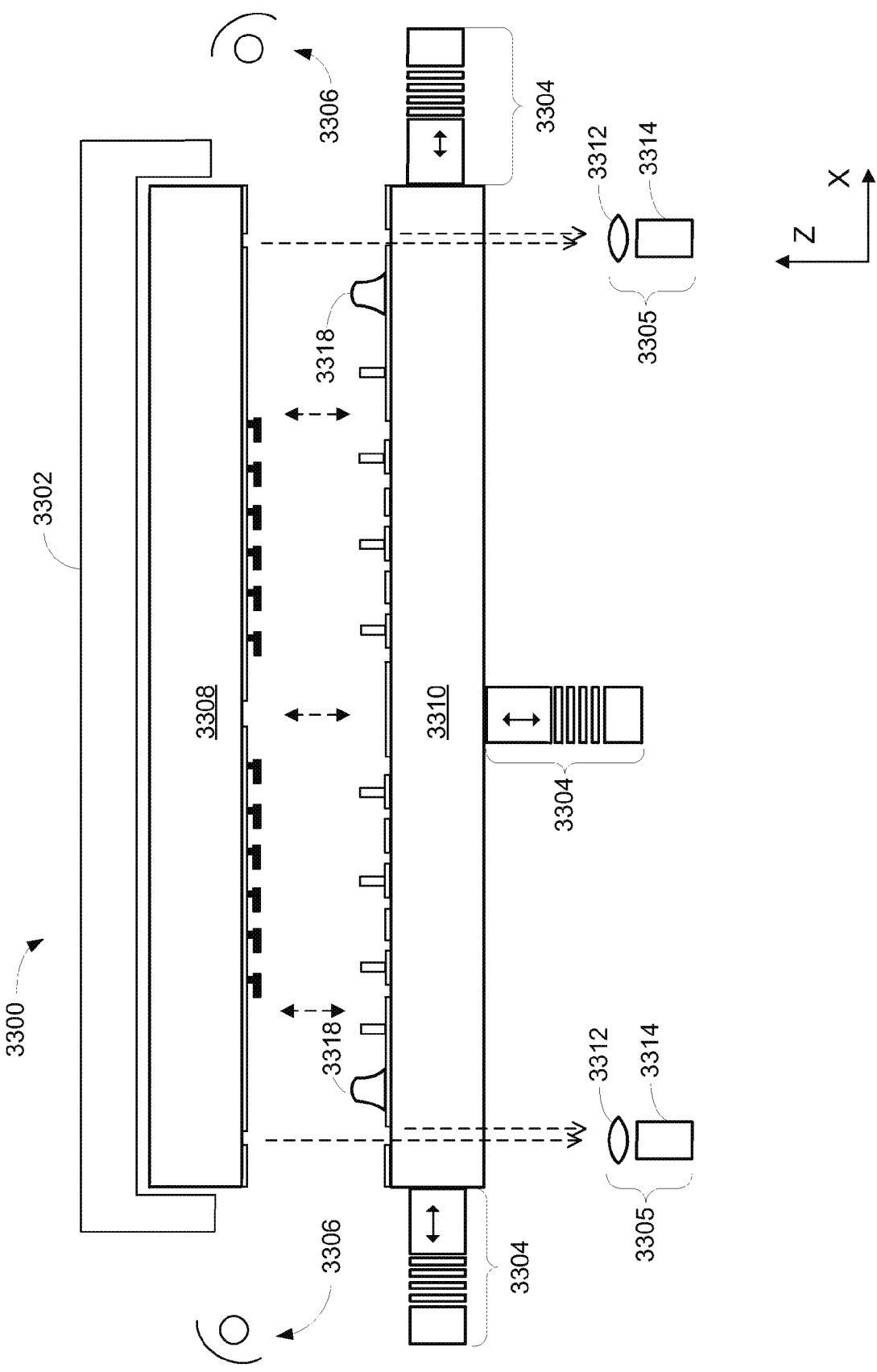
FIG. 8 is a conceptual view of a precision substrate alignment apparatus, according to an illustrative embodiment of the invention.

The assembly of a display module can comprise the alignment and bonding of two substrates. For instance, it is desirable to align a light modulator substrate, such as substrate 504 to a cover plate, such as cover plate 522. Alternatively, it is desirable to align a light modulator substrate, such as substrate 2806 to an aperture plate, such as aperture plate 2804. FIG. 8 illustrates an alignment apparatus 3300 for accomplishing the alignment process, according to an illustrative embodiment of the invention. The alignment apparatus 3300 comprises a stationary chuck 3302, a set of translational drives or motors 3304, a vision system 3305, and a set of UV exposure lamps 3306. A modulator substrate 3308 is rigidly attached to the chuck 3302. An aperture plate 3310 is held in place and guided by the motors 3304. The motors 3304 provide the ability to translate the substrate 3310 in three translational directions, for instance along x and y coordinates within the plane of substrate 3310 and additionally along the z coordinate establishing and varying the distance between the two substrates 3308 and 3310. Additionally, not shown in FIG. 8, an additional and optional set of three rotational motors can be provided, which ensure both the co-planarity of the substrates 3308 and 3310 and also their proper rotational relationship in the x-y plane. Although all translational motors 3304 are shown attached to the aperture plate 3310, in other embodiments the motors can be arranged differently between the two substrates. For instance the x-y translation motors can be attached to the aperture plate 3310 while the z-axis translation motor and theta rotation motor (about the z-axis) can be attached to the chuck 3302.

A variety of motor types are available for the motors 3304. In some embodiments these motors can be digitally controlled stepper motors, in some cases they can be linear screw drives, and in other cases they can be magnetically-driven solenoid drives. The motors need not be arranged to directly move a substrate, such as substrate 3310. They can instead be designed to move a stage or platter onto which the working piece or substrate 3310 is rigidly attached. The use of a moving stage is advantageous, since an additional optical measuring system (in some cases a laser interference system) can be provided for the stage which is capable of continuously measuring its translational position to a precision of better than 1 microns. Feedback electronics can then be employed between the motors 3304 and the optical measurement system to improve both the accuracy and stability of the stage position.

In some embodiments of apparatus 3300 both the chuck 3302 and the optional moving stage can be equipped with heaters and/or temperature control devices, to ensure uniform temperature across the substrates 3308 and 3310. Uniform temperatures help to ensure proper alignment between patterns on the two substrates, particularly for substrates whose diagonals exceed about 20 centimeters.

The alignment apparatus 3300 incorporates a vision system 3305 for detecting the relative positions of the two substrates 3308 and 3310. In a preferred embodiment, alignment marks are patterned into thin films on each of the substrates 3308 and 3310 (see, for example, the alignment marks 3408 and 3412 in FIG. 9. The vision system is capable of simultaneously imaging alignment marks on each of the two substrates, despite the fact that the marks are located on different surfaces, i.e. at different positions on the z axis.

For the illustrated embodiment, the vision system 3305 incorporates two imaging lenses 3312 and 3313 and either a microscope capable of split-field imaging or two cameras 3314 and 3315. The vision system 3305 is therefore capable of imaging, substantially simultaneously, two separated sets of alignment marks. The two sets of alignment marks are preferably located at the far sides or corners of the modulation array or panel.

In operation, an operator uses the vision system 3305 to view the relative positions of alignment marks, such as marks 3408 and 3412, and thereby judge the direction and degree of misalignment between the two substrates. The operator can then adjust the alignment between substrates 3308 and 3310, using drive motors 3304, until the alignment marks on the two substrates indicate misalignment below an acceptable degree of error. After sufficiently reducing the misalignment, the operator drives the z-axis motor until the spacers, such as any of the spacers 1010, on one of the substrates, 3308 or 3310, contact the opposing substrate, 3308 or 3310, or opposing spacers. In many instances, due to mis-orientation or non-planarity of the substrates, the operator will need to continually refine the x-y alignment between the substrates as the z-axis distance between the two substrates is decreased. In some embodiments, a final x, y, and theta correction can be made even after contact is established between the substrates.

After contact is made, an adhesive 3318 will also make contact between the two substrates. In some embodiments, as the last step in the method 3301, the adhesive is at least partially cured while the alignment apparatus 3300 holds the two substrates in position. The UV exposure lamps 3306 can be used to initiate or accelerate the curing of the adhesive, thereby bonding the two substrates together. In some embodiments the substrate stage or the chuck 3302 is equipped with heaters to affect a thermal curing of adhesive 3318. The alignment marks, e.g. marks 3408 and 3412, are usually patterned and etched at the same time and are printed from the same photomask as the masks used to pattern the apertures. The alignment marks are therefore designed for a fiduciary marker function, i.e. the operator who achieves sufficient alignment between the alignment marks has confidence that the shutters and apertures in the neighboring array will also be in properly aligned.

According to the discussion of display apparatus, the overlap is preferably greater than or equal to 2 microns. In practice an overlap W2, which is reliably achieved during manufacture, is determined by a safety margin, designed into the masks, and by an alignment precision or tolerance. The precision or achievable tolerance is based on the design of alignment apparatus 3300, the design of the alignment marks, and process variables such as temperature, pressure, and the viscosity or plasticity of seal materials. Two examples are provided below for acceptable tolerance design: In the first example, which is tolerant of relatively wide variations in alignment during manufacture, an array of shutters and apertures is designed with a nominal overlap of 22 microns, i.e., if perfectly aligned, the shutters are designed to overlap the apertures by 22 microns. If the apparatus 3300 then enables an alignment repeatability of .+-.20 microns, the designer can be assured that all (or 99.99% depending on how reliability is specified) of the shutters will have an overlap of at least 2 microns. However, for a dense array of pixels, i.e., for a high resolution display, there is not usually room available in an array design for 22 microns of overlap. Therefore a more precise alignment capability is desired.

In the second example, a nominal overlap of only 1 microns is provided for in the masks, and the apparatus 3300 is designed to provide an alignment precision within .+-.1 microns between patterns on the first and second substrates. To achieve this precision a) the vision system 3305 a resolution smaller than 1 micron, b) the motors 3304 (or associated translation stages) stably drive to and resolve position differences with a resolution smaller than 1 microns, and c) the alignment marks are patterned and etched with edges, dimensions, and/or placements that are precise to a resolution of better than 1 microns. Automated alignment systems with sub-micron precision are available today for purposes of semiconductor mask alignment, optoelectronic component assembly, and micro-medical devices. Representative suppliers of these systems include the Automation Tooling Systems Corp, of Cambridge, Ontario, Canada and the Physik Instrumente LP of Karlsruhe, Germany.

Generally, if attention is paid to the design of the vision system, the drive motors, and the design of the alignment marks, then it possible to provide an alignment apparatus 3300 and an alignment method which is capable of ensuring an overlap between shutters and apertures that is greater than 0 micron and less than 20 microns. In a preferred design, the alignment method is capable of ensuring and overlap that is greater than 0 micron and less than 4 microns.

The alignment method described above was provided as one example of an alignment method that assigns active control of the motors 3304 to a human operator. In other methods the intervention of an operator is not required to achieve alignment. Intelligent vision (machine vision) systems are available, for example, from the vendors identified above, for the apparatus 3300 (i.e. systems which include digital cameras and computer image processing) that can measure the direction as well-as the amount of misalignment between fiducials on two substrates and then can automatically drive the motors 3304 until the measured misalignment becomes less than a pre-specified level.

Figure 9:
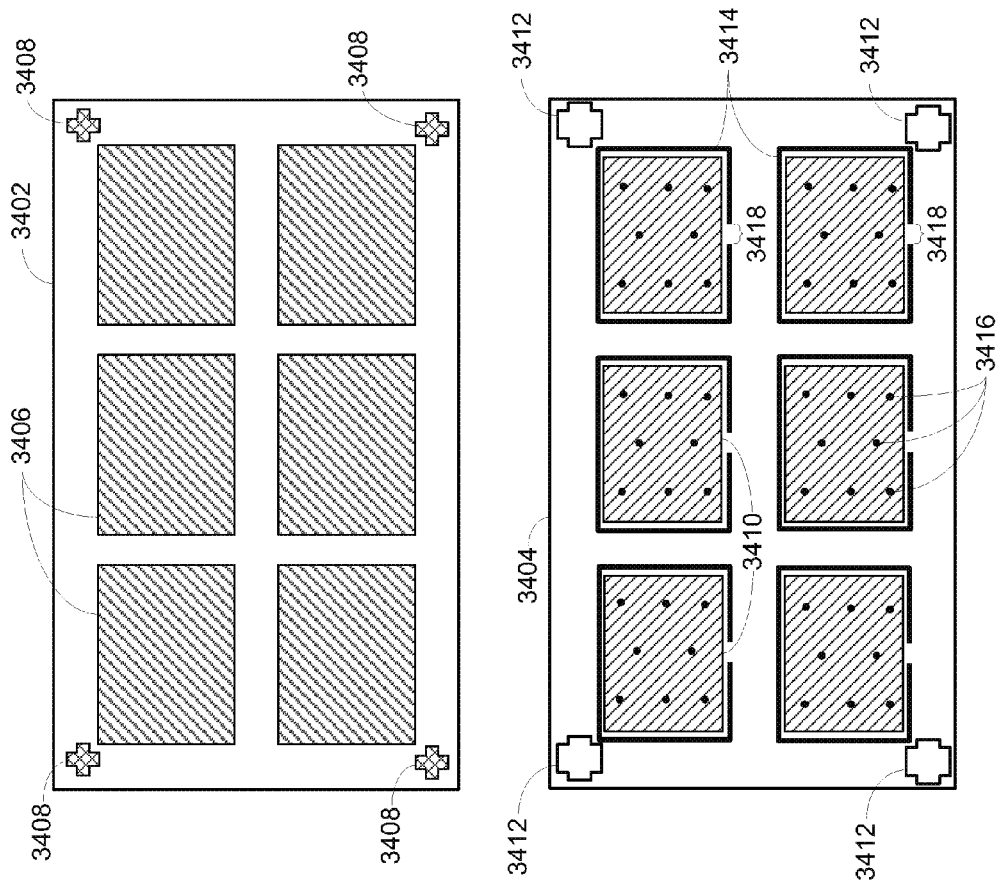
FIG. 9 is a plan view of a modulator substrate and an aperture plate comprising multiple modulator and aperture arrays respectively, according to an illustrative embodiment of the invention.

The alignment marks or fiducials employed by apparatus 3300 can take many forms, other than those shown or discussed with respect to FIG. 9 below. In some embodiments the operator or the machine vision system is capable of recognizing specific functional patterns on the substrates, such as the shapes of shutter assemblies or apertures. The vision system thereby measures and minimizes directly the misalignment between shutters and apertures. In another embodiment, the display edges are cut or diced to a precise position with respect to the positions of the shutters and apertures. The vision system thereby measures and minimizes the misalignment between the edges of the two substrates.

After either a human operator or the automatic alignment system brings the substrates into alignment and establishes contact between the two substrates, the UV exposure lamps 3306 can be employed to at least partially cure the adhesive 3318. The adhesive bonding material 3318 prevents the subsequent relative movement between substrates 3308 and 3310 after alignment has been achieved in apparatus 3300. Alternate means are available for maintaining alignment between the two substrates after alignment. These alternate means include the use of alignment guides, such as alignment guides, and heat reflowable spacer materials such as spacer.

Although the functioning of alignment apparatus 3300 was with the example of display 500 in the MEMS-down configuration, similar alignment techniques can be useful when applied to the MEMS-up configuration, as illustrated by display apparatus 500. In display assembly 500 the shutter assemblies 502 are formed on substrate 504 while the black matrix and associated apertures 524 are formed on substrate 522. The two substrates 504 and 522 can be aligned using alignment apparatus 3300 such that an overlap exists between at least one edge of the shutters 503 and the edge of a corresponding aperture in black matrix 524. The alignment apparatus 3300 ensures an overlap between edges of between 0 and 20 microns. In a preferred design, the alignment method ensures an overlap that is greater than 0 microns and less than 5 microns, or in some cases, less than 4 microns.

Although the functioning of alignment apparatus 3300 was described for a display incorporating transverse-shutter-based light modulators, such as a shutter assembly, it will be understood that the alignment apparatus 3300 and alignment method described above can be usefully applied to alternate MEMS light modulator technologies. For instance, the electrowetting modulator array benefits when the aperture plate is aligned to the modulator substrate such that an overlap is established between the edge of the oil and the edge of apertures in the light-obstructing, filtered, or dark state. Similarly rolling actuator light modulators, such as light modulator 220 can be fabricated and aligned in similar fashion, wherein an overlap is provided between the light obstructing edge of the roller-actuator-modulator on a first substrate and the edge of a corresponding aperture which has been patterned on a second substrate.

Other non-shutter-based modulators can benefit from the alignment apparatus 3300 and method described above. For instance, a MEMS interference modulator or a MEMS light tap modulator, such as light modulator 250, fabricated on a first substrate can be aligned to the edge of a black matrix fabricated on a second substrate. Details of these light modulators can be found in U.S. Pat. Nos. 6,674,562 and 5,771,321, incorporated herein by reference.

Panel Fabrication Processes

Manufacturing productivity is increased whenever the modulator arrays for multiple displays can be built in parallel fashion on the same glass or plastic substrate. Large glass substrates, referred to as panels, and associated fabrication equipment, are now available in sizes up to 2 meters square. FIG. 9 illustrates how multiple arrays of MEMS light modulators can be formed onto one large modulator substrate 3402 while multiple arrays of aperture holes can be formed on a large aperture plate 3404, according to an illustrative embodiment of the invention. The panel 3402 includes a set of 6 modulator arrays 3406 plus a set of four modulator alignment marks 3408. The panel 3404 includes a set of six aperture arrays 3410 plus a set of four aperture alignment marks 3412. Each of the modulator arrays 3406 is designed to correspond to one of the aperture arrays 3410, such that when the panels 3402 and 3404 are aligned and sealed together, the corresponding modulator array-aperture array pairs will each form a display assembly, also referred to as a cell assembly. A single alignment and sealing operation between substrates 3402 and 3404, then, suffices to simultaneously align and seal 6 cell assemblies. For the example shown in FIG. 9, the glass panels 3402 and 3704 are 30 cm in diagonal while each of the cell assemblies or display areas would be 10 cm in diagonal. In other embodiments, panels as large as or larger than 50 cm in diagonal may be employed to fabricate up twenty five 10 cm diagonal displays per panel.

Also shown are the epoxy adhesive lines (one type of seal material) 3414, and spacer posts 3416 added to each of the arrays on the aperture plate 3404. A variety of spacers are applied to the interior of each array on aperture plate 3404, as described with respect to display assemblies. The process for applying the adhesive will be described below with respect to the cell assembly step 3614.

Figure 10:
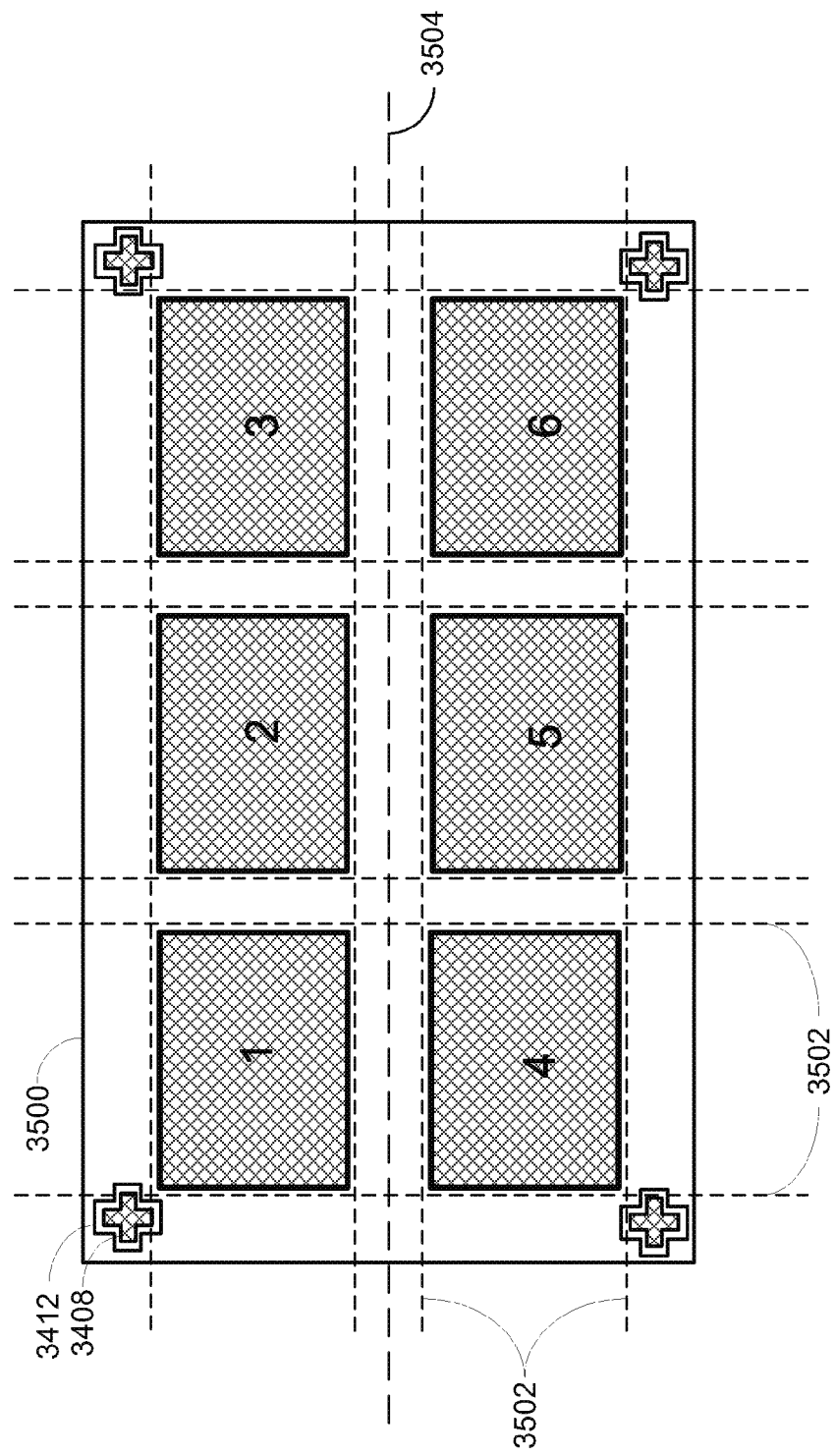
FIG. 10 is a plan view of a panel assembly after alignment, according to an illustrative embodiment of the invention.

A panel assembly 3500, after completion of alignment and seal of panels 3402 and 3404, is illustrated in the FIG. 10, according to an illustrative embodiment of the invention. Successful alignment of the two substrates is indicated by the nesting of the modulator alignment marks 3408 within the aperture alignment marks 3412. The alignment marks can be designed such that a nominal 1 microns gap is allowed between the inner edge of the mark 3412 with the outer edge of the mark 3408 (the magnitude of these gaps is exaggerated in FIG. 10 for purposes of illustration). In this alignment design, the operator and/or automatic alignment system adjusts the relative position of the substrates in the tool 3300 until appropriate gaps are visible in both the x and y directions for the nested alignment marks, e.g., until none of the lines are crossed or touching. When the appropriate gaps are visible the alignment is considered successful, i.e. misalignment has been reduced to within an acceptable error and the expected overlap between modulators and apertures in each of the arrays 3406 and 3410 has been achieved.

The nominal gap between alignment marks can be designed to match the anticipated precision of the alignment process, e.g. the gap can be 10 microns, 4 microns, 2 microns, or 1 micron depending on the alignment precision desired. In an alternate design, one alignment mark is a circular dot while the other mark is shaped as a ring. A gap can be designed between the dot and the ring corresponding to the desired alignment precision. In some alignment machine designs, a gap between alignment marks is not required; instead the machine uses a digital camera to estimate the center points of both dot and ring. The alignment software then seeks to align the center-points of dot and ring. The two panels 3402 and 3404 are bonded in place by an adhesive. The curing of this adhesive is described below with respect to the cell assembly step 3620.

FIG. 10 also illustrates a set of dicing lines 3502 superimposed upon the panel assembly 3500. The dicing lines 3502 mark the lines along which the panel will be cut so that individual arrays, also referred to as displays or cell assemblies, can be separated from panel. The separation process, also referred to as singulation, can be accomplished by means of a scribe and break method. In this process a diamond or carbide tip is used to scratch a line along the surface of the glass panels at lines 3502. A simple bending process can then be used to break the panels along the scribe lines. In another embodiment the separation or singulation process is accomplished by means of a dicing saw. It is not necessary that both substrates 3402 and 3408 be cut along the same dicing lines. It is often advantageous that the modulator substrate be diced to a perimeter width that is wider than that prescribed for the aperture substrate. This allows room for the bonding of driver chips, after cell assembly is complete, on the edge of the modulator substrate. At times, such as when dual fill holes are used, the panel is separated into strips by cutting it along the axis 3504.

Figure 11:
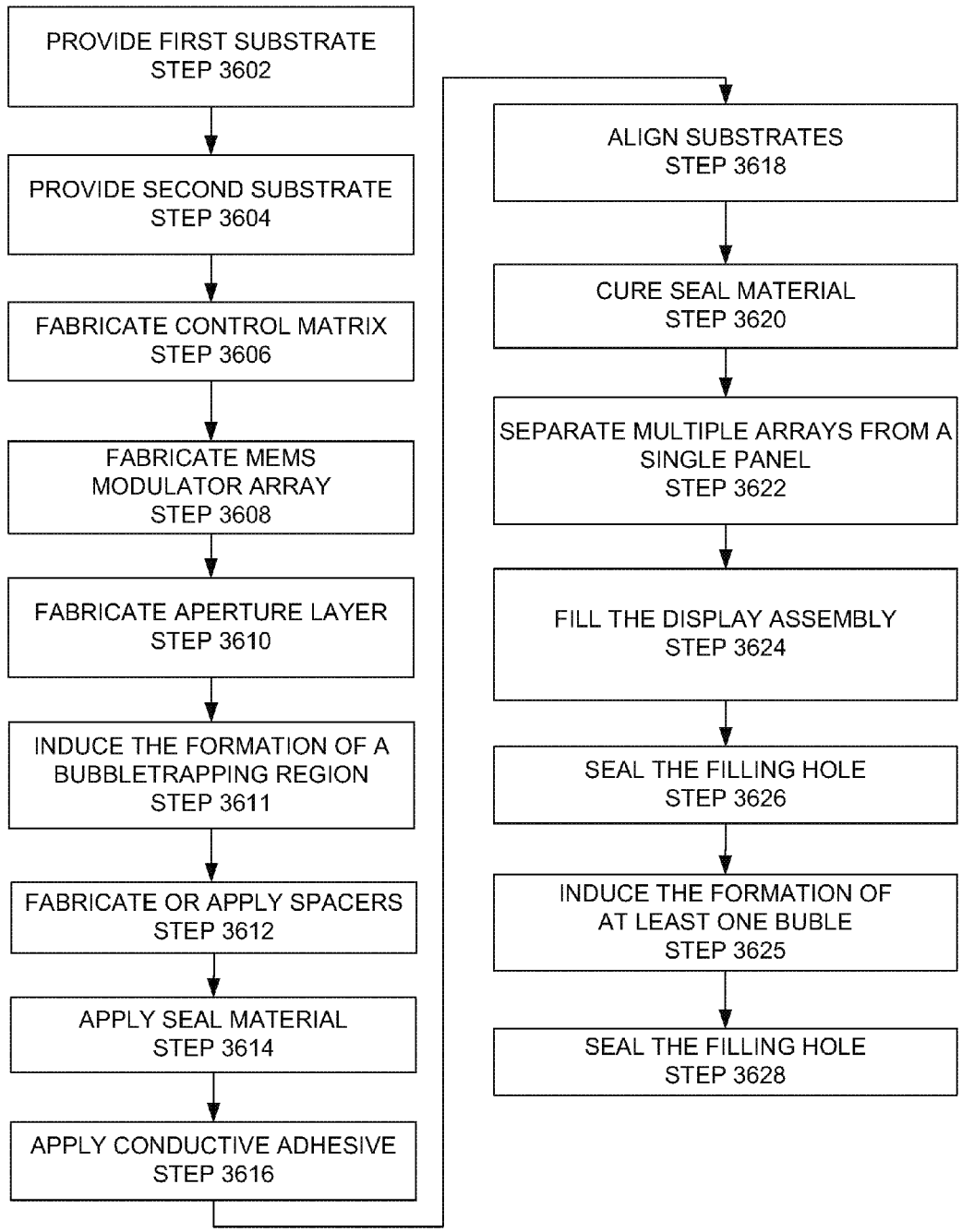
FIG. 11 is a flow chart of a fluid-filled cell assembly method, according to an illustrative embodiment of the invention.

FIG. 11 illustrates a first method 3600 for assembling a display apparatus (also referred to as cell assembly method 3600) incorporating MEMS light modulators, according to an illustrative embodiment of the invention. A first embodiment of method 3600 will be described with respect to a MEMS-down display assembly. A second embodiment, for assembly of displays in the MEMS-up configuration, will be described thereafter.

The cell assembly method 3600 for MEMS-down displays begins with provision of two substrates at steps 3602 and 3604. Both of these substrates are transparent, made from glass or plastic. The assembly method continues with the fabrication of a control matrix, at step 3606, and the fabrication of the MEMS modulator array, at step 3608. In one embodiment both the control matrix and the modulator array are fabricated onto the first substrate, referred to as the modulator substrate. In one embodiment, a trench, also known as a bubble trapping region is provided in the modulator substrate. As discussed with respect to display assembly 3100, however, there are embodiments where the control matrix can be fabricated on a substrate distinct from the modulator substrate and be electrically connected to it by means of electrically conductive spacers. Further detail on the fabrication of the modulator substrate can be found in the U.S. patent application Ser. No. 11/361,785 (which issued as U.S. Pat. No. 7,405,852), referenced above.

The MEMS-down assembly method 3600 proceeds at step 3610 with the fabrication of an aperture layer. The aperture layer is fabricated onto the second substrate, which is preferably made of a transparent material, e.g. plastic or glass. In the MEMS-down configuration the second substrate is referred to as the aperture plate. In one embodiment, a trench, also known as a bubble trapping region is provided in the surface of the aperture plate at step 3611. In other MEMS-down embodiments the second substrate, on which the aperture layer is fabricated, is also utilized as a light guide. In some embodiments, the aperture layer is composed of a light absorbing material which is patterned into a series of apertures. In one embodiment, the aperture layer is designed to reflect light incident from the substrate back toward the substrate.

The method continues with the application of spacers (step 3612) and sealing materials (step 3614) to one or the other of the two substrates; the substrates are then aligned and bonded together. The method 3600 continues at step 3612 with the application of spacers. Any of the spacers illustrated by the spacers 2708, 2812, or 2814 including the fabrication methods described therefore can be incorporated at step 3612. The spacers may be formed onto either or both of the first and second substrates.

The method 3600 continues at step 3614 with the application of a seal material, such as the epoxy seal material 528. The seal material can be applied to either or both of the first and second substrates employed by the method 3600. The seal material is an adhesive bonding material, which will maintain the position of the first and second substrates after the alignment step. The seal material is also used to contain the fluid, to be added at step 3624, within the gap between the two substrates. Applicable seal materials can be a polymer material such as an epoxy, an acrylate, or a silicone material or the seal material can be formed from a heat-reflowable solder metal such as solder bump.

In some embodiments the seal material can be a composite material, such as the anisotropic conductive adhesive 3214. The seal material can be dispensed from a nozzle, which moves along the periphery of each of the modulator or aperture arrays, as shown for display panel 3404 in FIG. 9.

The seal material 3414 does not completely encircle the periphery of each display area on display panel 3404. One or more gaps 3418, referred to as the filling holes, are intentionally left in the peripheral seal to accommodate the filling of the cell with fluid at step 3624. In one embodiment, these may be on opposite sides, along the same side, or in any side. In some embodiments, this gap is left open next to a bubble trapping region, so that a bubble can be intentionally introduced into a space enclosed by the seal.

The method 3600 continues at step 3616 with the optional dispense of a conductive adhesive. If the spacers or the seal material added at steps 3612 and 3614 do not have a conducting property, then it is often advantageous to add an additional adhesive with this property. The conductive adhesive added at step 3616 allows for an electrical connection between the control matrix on the first substrate and the aperture layer on the second substrate. The adhesive added at step 3616 is usually located at some point along the periphery of the display area.

After dispense, a seal material undergoes a cure step to become relatively hard and rigid. Although seal material may be partially cured as part of the step 3614, in many embodiments a final cure does not occur until one of the later steps 3618 or 3620. The seal material may be formulated to allow for many alternate types of curing, including desiccation curing, UV or ultraviolet curing, thermal curing, or microwave curing. When employing an alignment tool, such as the apparatus 3300, a UV-cured epoxy can be preferred.

As indicated in FIG. 11, the steps for fabrication of the control matrix 3606, fabrication of MEMS modulators 3608, fabrication of the aperture layer 3610, application of spacers 3612, and application of seal material 3614 can all be performed at the panel level where multiple displays are fabricated simultaneously on a large glass or plastic panel. Alternately, these steps may be performed for individual displays on smaller substrates. Further fabrication details for assembly steps 3606, 3608, 3610, and 3612 can be found in the U.S. patent application Ser. No. 11/361,785 (which issued as U.S. Pat. No. 7,405,852), referenced above.

The method 3600 continues at step 3618 with the alignment of the first and second substrates, as was described with respect to the alignment apparatus 3300 in FIG. 8. The alignment apparatus 3300 includes a camera and/or microscope system for confirming that the alignment is accurate to within an acceptable degree of error. The first and second substrates are brought into contact by means of the spacers as part of the alignment step 3618.

As part of the alignment step 3618 the adhesive bonding material is at least partially cured to bond or maintain the relative positions of the two substrates. The alignment apparatus 3300 includes heaters and/or UV exposure lamps to affect cure of the adhesive. In some embodiments the whole perimeter seal, such as seal 3414, is at least partially cured as part of step 3618. In other embodiments a plurality of uv-curable adhesive dots is provided on the substrates prior to alignment, in addition to a thermally-curable seal material 3414. For this embodiment only the epoxy dots are cured as part of the alignment step 3618, while the remainder of the seal material is cured later, at step 3620.

The method 3600 continues at step 3620 with the cure of the seal material. In many embodiments the proper alignment between first and second substrates can only be maintained when the seal material behaves as a relatively rigid adhesive. The adhesive cure at step 3620 ensures the rigidity of the seal. The cure at step 3620 can be carried out by either a thermal, UV, or a microwave cure. In some embodiments the seal is cured at step 3620 by placing the assembly into an oven, or UV or microwave exposure system, under pressure or between the plates of a press. The press helps to minimize bending or warping in the substrates while the adhesive is being cured. The press helps to ensure that the gap are maintained by ensuring a rigid contact of each substrate to the spacers.

The method 3600 continues at step 3622 with the optional separation of individual display arrays from a large panel containing multiple arrays. Such separation is only required if the cell assembly steps, up until this point, have proceeded according a large panel process, as described in FIG. 9. If the modulation substrate and aperture plates are fabricated as individual displays at steps 3606 to 3614, then no singulation or separation step is necessary. The separation may be accomplished by either a scribe and break process or by a dicing saw.

The method includes the separation or singulation of individual displays from a larger panel assembly (step 3622) and the filling of the gap between the two substrates with a fluid or lubricant (step 3624), filling the display assembly with fluid. As indicated in the discussions of display apparatus 500, the two substrates of a display apparatus are preferably separated by a gap, such as the gap 526, and the gap is filled by a fluid, such as working fluid 530. For many displays the fluid acts as a lubricant which substantially surrounds the MEMS light modulators. The fluid also has defined electrical and optical properties as discussed above. In one embodiment, one or more of the filling holes will be sealed at step 3626. Subsequently, a bubble is intentionally introduced within a bubble trapping region at step 3625. In another embodiment, any and all filling holes are sealed after the bubble is induced into the bubble trapping region at step 3628.

The cell assembly method 3600 will now be reviewed for its application to the MEMS-up display configuration, examples for which are given by display assembly 500 of FIG. 5. For the MEMS-up display configuration both the control matrix and the MEMS modulator array are fabricated on the first substrate at steps 3606 and 3608. Examples are given as modulator substrates. An aperture layer is deposited on the second substrate at step 3610.

As discussed with respect to display assembly 3100 there are embodiments where the MEMS modulator array is fabricated on the first substrate while the control matrix can be fabricated on the second substrate. The two substrates are in electrical communication by means of conductive spacers.

For the MEMS-up display configuration the second substrate is referred to as a cover plate, such as cover plate 522. The aperture layer, fabricated at step 3610, is referred to as a black matrix layer, such as black matrix 524, and is patterned into an array of apertures. The black matrix layer is preferably comprised of a light absorbing material to improve the ambient contrast of the display. After assembly, the black matrix apertures preferably overlap the MEMS light modulators which are located on the modulator substrate.

For the MEMS-up display assembly method 3600 the cover plate, i.e. the second substrate provided at step 3604, is preferably made of a transparent material, i.e. plastic or glass. For the MEMS-up assembly method, however, the modulator substrate provided at step 3602 can be made from an opaque material, such as silicon. For instance, for a reflective MEMS-up display, the first substrate, e.g. silicon, can be coated with a reflective layer at one of steps 3606 or 3608. For a transmissive MEMS-up display, an opaque material employed for the first substrate can be etched with an array of through-holes at the positions of apertures, such as apertures 508.

For the MEMS-up display assembly 3600, spacers are applied at step 3612, and seal material is applied at step 3614 to either of the first or second substrates, i.e. either the modulator substrate or the cover plate. As with the case of the MEMS-down, the seal material is applied completely around the periphery of the space enclosed by the seal, leaving one or more openings that will be later sealed in a fashion similar to that described above for MEMS-down.

The subsequent steps in a MEMS-up display assembly method 3600 are similar to the MEMS-down display assembly method 3600, including the alignment step 3618, the cure of seal material, step 3620, the separation of multiple displays from the panel, step 3622, fluid filling at step 3624, as well as final sealing step 3626 and 3628.

As described with respect to the alignment apparatus 3600, the assembly method 3600 in either the MEMS-up or the MEMS-down configuration is applicable to a number of alternate MEMS light modulator technologies, including electrowetting displays and rolling-actuator displays. The MEMS-up display assembly method 3600 is particularly applicable to interference modulator displays and MEMS light tap modulator displays.

Figure 12:
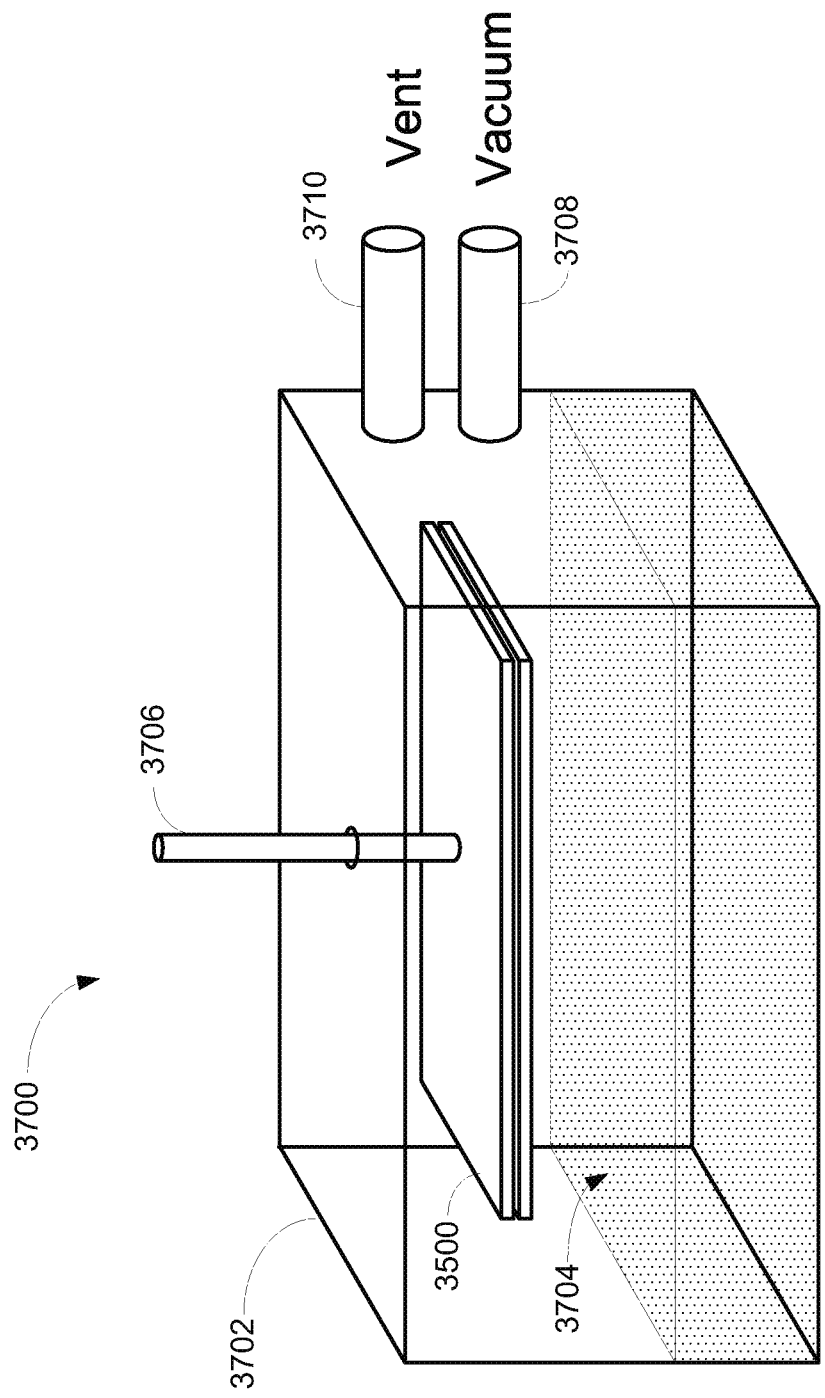
FIG. 12 is a view of a fluid filling apparatus, according to illustrative embodiments of the invention.

The details of the fluid filling process (step 3624) will be described with respect to the fluid filling apparatus 3700 which is illustrated in FIG. 12, according to an illustrative embodiment of the invention. The fluid fill apparatus is formed from a vacuum chamber 3702 which is partially filled with a reservoir of the working fluid 3704. An aligned and partially sealed cell assembly or panel assembly, such as panel assembly 3500, is suspended above the fluid reservoir by a wand 3706, or alternately by a moveable platter. Attached to the vacuum chamber is a port 3708 leading to a vacuum pump and a port 3710 used to vent the interior of the vacuum chamber to atmospheric pressure. Valves are associated with each of the ports 3708 and 3710, although not shown in FIG. 12.

In operation, the process for filling the gap between the substrates in a panel assembly, such as assembly 3500, is a two-step process. First the air or other gas is removed from between the two plates and, second, the gap is filled by the fluid. Air is removed from between the plates when the valve to the vacuum pump is opened and the whole chamber 3702 is reduced to a pressure substantially below 1 torr. Next the vacuum valve is closed and the wand 3706 is used to immerse the panel assembly 3500 into the reservoir 3704 of the working fluid. Once immersed, the vent valve is opened to the air, or to clean nitrogen or argon gas from a bottle. The returning air brings the pressure on all fluids back to atmospheric pressure (or pressures greater than 600 torr). Under pressure, the working fluid is then forced into the gap between the substrates of cell assembly 3500. When the cell assembly is removed from the chamber 3702 the cell assembly is filled by the fluid, thus completing the assembly step 3624.

In an alternate design, the panel assembly 3500 need not be suspended by a moveable wand, such as wand 3706. Instead the panel assembly can be fixed in place and the lubricant 3705 can be moved into or out of the vacuum chamber 3702 by means of a series of valves. The chamber is evacuated while fluid is largely absent from the chamber. After evacuation, the fluid level in the chamber is increased by flowing additional fluid into the chamber. Fluid is added until the assembly 3500 is immersed in fluid. After immersing the panel in fluid the system is vented to atmospheric pressure to fill the gap with fluid.

In another embodiment the chamber 3702 is not filled with a liquid, as in liquid 3704, but is instead backfilled with a gas after evacuating the chamber. Examples of backfill gases include inert gases (argon, nitrogen), vapor phase lubricants, certain reactive gases, or any combination of the above. The reactive gases are those that can react with or be deposited onto the moving surface of the MEMS modulators. They can chemically pacify or reduce the stickiness of moving surfaces by reducing its surface energy. Examples include, without limitation, dimethyldichlorosilane (DDMS), tridecafluoro-1,1,2,2-tetrahydrooctyltrichlorosilane (FOTS), and heptadecafluoro-1,1,2,2-tetrahydrodecyltrichlorosilane (FDTS). Vapor phase lubricants are gases that remain in the vapor phase substantially throughout the operation of the device, and are similarly capable of pacifying surfaces. Examples include, without limitation, sulphur hexafluoride, and the vapor phase forms of methanol, ethanol, acetone, ethylene glycol, glycerol, silicone oils, fluorinated silicone oils, dimethylsiloxane, polydimethylsiloxane, hexamethyldisiloxane, and diethylbenzene, or any mixture of the above.

The fluid filling process within chamber 3702 can be executed on either the cell level or the panel level. In assembly process 3600 the singulation step 3622 precedes the fluid filling step 3624, meaning that the cell assemblies for individual displays are loaded into vacuum chamber 3702 for fluid filling. The vacuum fill chamber 3702 can include a platter capable of holding and immersing multiple individual displays in a single pump-down operation—so that multiple displays can be filled with fluid at the same time. Alternately it is possible to reverse the orders of these steps and load a complete panel assembly, such as assembly 3500, into the vacuum chamber. The gaps within each of the displays on the panel are then evacuated and filled at the same time. The dicing or singulation process 3622 then occurs after the fluid filling step 3624 is complete.

A cell assembly is completed in the method 3600 with the sealing of the filling hole, at step 3626. The fluid was allowed or forced into the space between substrates at step 3624 through the filling hole 3418 that was left in the perimeter seal at step 3614. This hole is filled with an adhesive at the end of the assembly process to prevent leakage of the fluid out of the display assembly. As part of step 3626 and prior to sealing the fill hole, pressure can be applied to the cell via a press. The press compresses the two substrates, forcing the spacers fabricated on one substrate, into intimate contact with the other substrate. This establishes a uniform gap or spacing between the two substrates. The fill hole 3418 is then sealed with adhesive prior to removal of pressure from the display. Once sealed, the closed and fluid-filled chamber within the cell prevents the substrates from separating under ambient conditions. The adhesive employed at step 3626 may be a polymer adhesive that is cured using either thermal curing, UV curing, or microwave curing.

The cell assembly method 3600 will now be reviewed for its application to the MEMS-up display configuration, an example of which is given by display assembly 500. For the MEMS-up display configuration both the control matrix and the MEMS modulator array are fabricated on the first substrate at steps 3606 and 3608. Examples are given as modulator substrates 504 or 2418. An aperture layer is deposited on the second substrate at step 3610.

As discussed with respect to display assembly 3100 there are embodiments where the MEMS modulator array is fabricated on the first substrate while the control matrix can be fabricated on the second substrate. The two substrates are in electrical communication by means of conductive spacers.

For the MEMS-up display configuration the second substrate is referred to as a cover plate, such as cover plate 522. The aperture layer, fabricated at step 3610, is referred to as a black matrix layer, such as black matrix 524, and is patterned into an array of apertures. The black matrix layer is preferably comprised of a light absorbing material to improve the ambient contrast of the display. After assembly, the black matrix apertures preferably overlap the MEMS light modulators which are located on the modulator substrate.

For the MEMS-up display assembly method 3600 the cover plate, i.e. the second substrate provided at step 3604, is preferably made of a transparent material, i.e. plastic or glass. For the MEMS-up assembly method, however, the modulator substrate provided at step 3602 can be made from an opaque material, such as silicon. For instance, for a reflective MEMS-up display, the first substrate, e.g. silicon, can be coated with a reflective layer at one of steps 3606 or 3608. For a transmissive MEMS-up display, an opaque material employed for the first substrate can be etched with an array of through-holes at the positions of apertures, such as apertures 508.

For the MEMS-up display assembly 3600, spacers are applied at step 3612, and seal material is applied at step 3614 to either of the first or second substrates, i.e. either the modulator substrate or the cover plate.

The subsequent steps in a MEMS-up display assembly method 3600 are similar to the MEMS-down display assembly method 3600, including the alignment step 3618, the cure of seal material, step 3620, the separation of individual displays from the panel, step 3622, and fluid filling at step 3624.

As described with respect to the alignment apparatus 3600, the assembly method 3600 in either the MEMS-up or the MEMS-down configuration is applicable to a number of alternate MEMS light modulator technologies, including electrowetting displays and rolling-actuator displays. The MEMS-up display assembly method 3600 is particularly applicable to interference modulator displays and MEMS light tap modulator displays.

Figure 13:
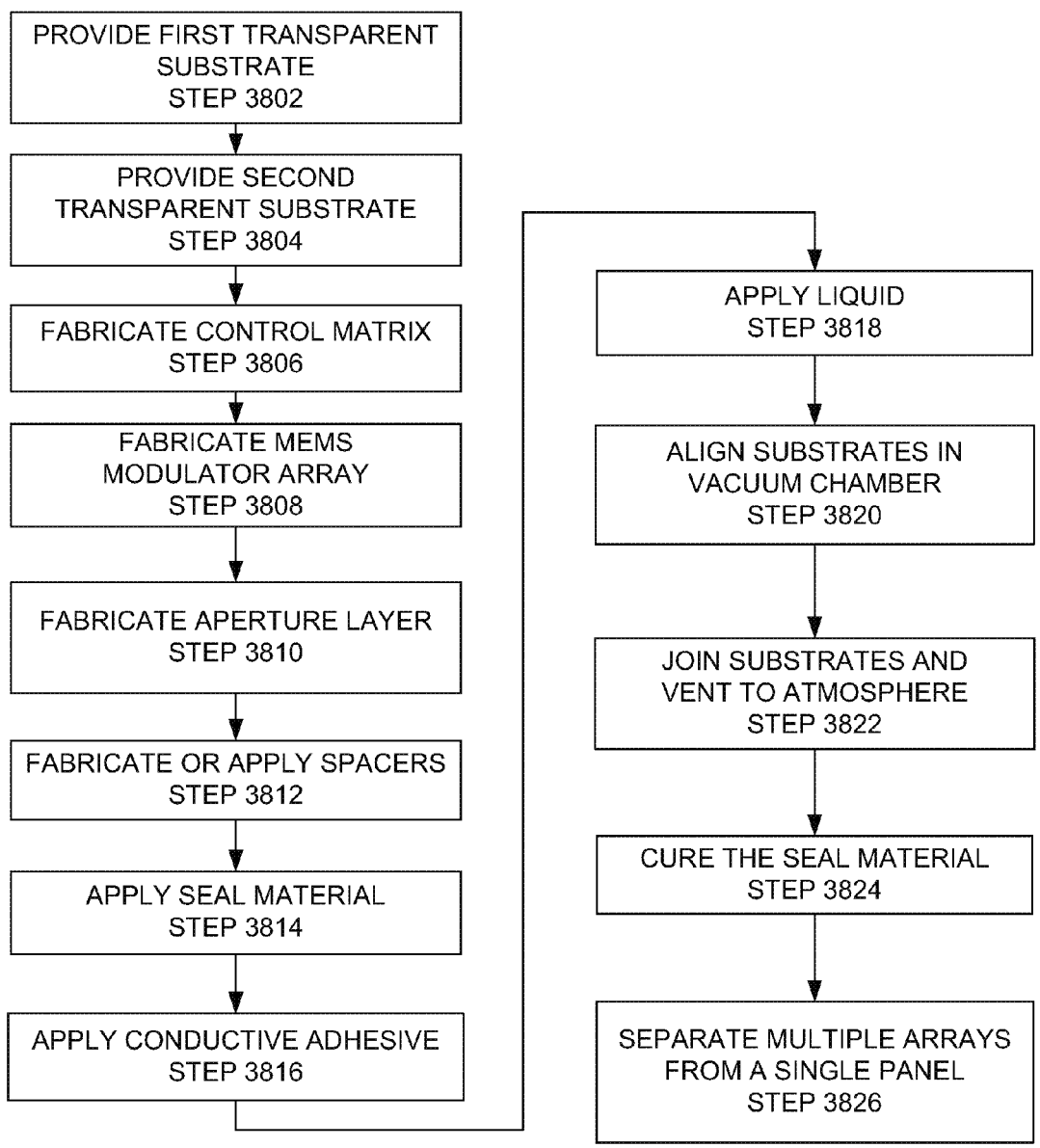
FIG. 13 is a flow chart of a fluid-filled cell assembly method for multiple arrays, according to an illustrative embodiment of the invention.

FIG. 13 illustrates an alternative method for assembling a display apparatus incorporating MEMS light modulators. The method 3800 can be employed for assembling displays into either the MEMS-down configuration or the MEMS-up configurations as described with respect to the method 3600. Similar to method 3600, the assembly method 3800 begins with the provision of two substrates (steps 3802 and 3804) upon which the display components are fabricated (steps 3806, 3608, and 3810). The method 3800 continues with the application of spacers (step 3812) and sealing materials (step 3814) to one or the other of the two substrates. The method 3800 also includes filling the gap in a display assembly with fluid (step 3118). However, in contrast to the method 3600, the order of fluid filling (step 3818) and display assembly (steps 3820, 3822, and 3824) are reversed. The assembly method 3800 is sometimes referred to as the one-drop fill method.

The assembly method 3800 begins with the provision of first and second substrates, steps 3802 and 3804 and continues with the fabrication of the control matrix (step 3806), the fabrication of a MEMS modulator array (step 3808), the fabrication of an aperture layer (step 3810), and the application of spacers (step 3812). These steps comprise substantially the same assembly processes as were used for corresponding steps in the assembly method 3600.

The method 3800 continues at step 3814 with the application of a seal material. Similar seal materials and similar dispense methods can be applied at step 3814 as were used for the seal application step 3612. For the step 3814, however, no gap or filling hole is left in the seal material around the periphery of the active areas of the display.

An optional conductive adhesive application, step 3816, follows which is similar to the adhesive application step 3616.

The method 3800 continues at step 3818 with the application of a liquid. The applicable liquids, comprising lubricating and other electrical, mechanical, and optical properties were described above with respect to display apparatus 500. For a liquid filling step (step 3800), a vacuum filling apparatus, such as apparatus 3700 is not necessary. A correct volume of fluid can be dispensed directly onto the open face of one of the first or second substrates. The fluid is preferably dispensed on the second substrate on which the aperture layer is formed, as this substrate generally has no MEMS components with cavities or re-entrant surfaces where air bubbles might collect. When the substrates are large panels incorporating multiple displays, as in panel 3404, a correct volume of fluid is dispensed into the active area of each array. Generally, the fluid will spread over the face of the substrate until confined by the perimeter of seal material 3414. A correct volume of fluid will completely fill the cavity defined by the perimeter seal. In some embodiments an optical measurement tool is used to determine an accurate volume for each cavity before filling—by measuring actual perimeter dimensions for individual arrays on the panel.

The method 3800 continues at step 3820 with the alignment of the two substrates. As the lubricating fluid has already been applied to one of the substrates, the alignment apparatus required for step 3800 will differ from that shown by apparatus 3300. As a primary difference, the alignment operation is preferably carried out under reduced pressure or vacuum conditions. This means that the first and second substrates, as well as many of the moving parts and parts of the vision system provided for alignment are now operated within a vacuum chamber, referred to as an alignment chamber.

In operation the two substrates would be introduced to the alignment chamber and the chamber would be evacuated. To prevent evaporation of the fluid (already dispensed as at step 3818), the chamber may be backfilled to an equilibrium vapor pressure of the lubricating fluid. After the two substrates are aligned and brought together, the lubricating fluid will make contact with the surface of each of the two substrates and will substantially surround each of the moving parts of the MEMS light modulators. After the substrates are in contact and the fluid has wet all surfaces, the alignment chamber is vented back to atmospheric pressure (at step 3822). A partial cure can also be applied to the adhesive after the substrates have been brought into contact. The adhesive can be cured by either thermal means or by means of UV lamps installed within the vacuum chamber.

In some embodiments, where the lubricating fluid has a high vapor pressure, i.e. where it can evaporate quickly at ambient temperatures, it may not be practical to dispense the fluid at step 3818 before the panels are introduced into the alignment chamber. For this embodiment, after the alignment chamber has been evacuated and backfilled with a vapor pressure of the lubricant, a nozzle can be provided which dispenses the lubricating fluid onto one of the substrates immediately before the step of aligning of the two substrates.

To the extent that the seal material was not completely cured during the alignment operation at step 3820, a further curing step is applied at step 3824. The cure at step 3824 can be carried out as either a thermal, a UV, or a microwave cure.

The method 3800 is completed at step 3826 with the optional separation of individual display arrays from a large panel containing multiple arrays. Such separation is only required if the cell assembly steps up to this point have proceeded according a large panel process, as described in FIGS. 9 and 10. If the modulation substrate and aperture plates where fabricated in the form of individual displays at steps 3806 to 3814, then no final separation step is necessary. The separation may be accomplished by means of either a scribe and break process or by use of a dicing saw.

The final steps for assembling a display, after completion of the method 3600, are often referred to collectively as the module assembly process. The module assembly incorporates the steps of attaching a silicon chip or chips comprising control and drive circuitry directly to the glass substrate, bonding flexible circuits for interconnecting the display to external devices, bonding optical films such as contrast filters, affixing a backlight, and mounting the display into a support structure or enclosure. The flexible circuit may be comprised of simple interconnects or may contain additional electrical elements such as resistors, capacitors, inductors, transistors or integrated circuits.

Figure 14:
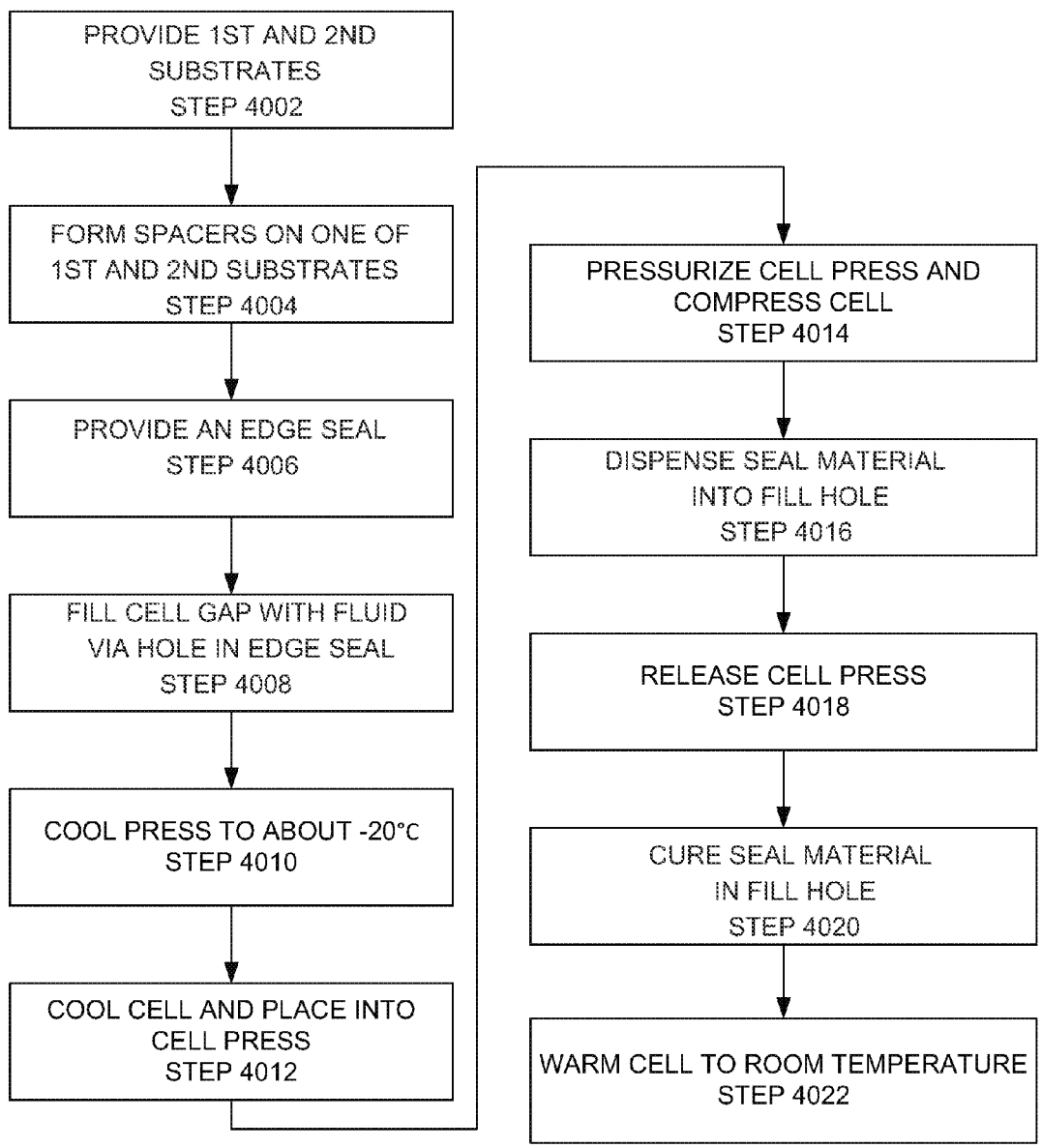
FIG. 14 illustrates a cold seal method for assembling a display apparatus, according to an illustrative embodiment of the invention.

FIG. 14 illustrates an alternative method 4000 for assembling a display apparatus, according to an illustrative embodiment of the invention. The method 4000 is representative of a cold seal process which helps to prevent and avoid the formation of vapor bubbles during operation of the display. The assembly method 4000 is similar and includes many of the same process steps as assembly method 3600, except that in method 4000 the final sealing of the fluid within the cavity is carried out at reduced temperatures.

The assembly method 4000 comprises, inter alia, steps for fluid filling, cell cooling, cell compression, and cold seal. A MEMS display cell, including a first substrate and a second substrate defining a cell gap are provided at step 4002. Each of the substrates is transparent. The first substrate may contain an array of light modulators. The second substrate may comprise either a cover plate, such as cover plate 522, or an aperture plate, such as aperture plate 2804.

In the display cell, the second substrate is positioned adjacent to the first substrate such that the first substrate is separated from the second substrate by a gap. The first substrate and the aperture plate may be formed from any suitable material, e.g., plastic or glass. A plurality of spacers is formed between the first and second substrates (step 4004) which maintain a substantial portion of the gap. The spacers may be formed on either of the first and second substrates. In one embodiment, similar to display assembly 2800, the spacers are formed on both of the first and second substrates. Any of the materials or fabrication methods described with respect to aperture plate 2700 and the spacers 2708 without limitation may be applied for this purpose.

The assembly method 4000 continues with the application of an edge seal (step 4006). The edge seal is applied around at least a portion of the perimeter of the array of light modulators. The seal material is provided as an adhesive for the bonding together of the first and second substrates. Any of the seal materials, including epoxy adhesives, described with respect to step 3614 without limitation may be employed for this purpose. In some embodiments, the seal is cured after the display assembly is filled. The substrates may be aligned, as described above, before the seal is cured. At least one fill hole is provided in the perimeter of the edge seal to allow for the filling of a fluid into the gap. In one embodiment, the seal material is a composite material that includes spacer materials within it. The included spacer materials may be made of plastic, glass, ceramic or other material. A seal material that is suitable for this purpose is a UV curable epoxy sold by the Nagase Chemtex Corporation with the product name XNR5570. The seal material XNR5570 can be enhanced to provide a spacer function by mixing in a concentration of one or more 12 micron radius glass spheres. The spacers may be incompressible. Suitable microstructures for the spacers include beads or spheres, although other shapes and microstructures can be suitable without limitation. In some embodiments, the spacer height established by the seal material is substantially larger than the height of each of the spacers, e.g. spacers 2708, located within the display cell.

The display assembly is then filled, via the fill hole, with a working fluid at step 4008. The filling may occur in a fluid fill chamber, and with a filling process similar to that described with respect to filling apparatus 3700. The working fluid substantially surrounds the movable portions of the MEMS light modulators. Suitable working fluids include those described with respect to fluid 530, without limitation. Additional suitable fluids are described below. In some embodiments, the fluid is a colorless working fluid that wets the surfaces of the display components (including front and rear surfaces of moving mechanical elements) and acts to reduce stiction and improve the optical and electromechanical performance of the display. Steps 4002 to 4008 can be carried out at room temperature. Room temperature may be a temperature in the range of about 18° C. to about 30° C., e.g., about 20° C., about 22° C., about 24° C., about 26° C., or about 28° C. In an alternate embodiment the filling process is carried out at a temperature substantially above room temperature, meaning a temperature substantially above 30° C.

In an alternate embodiment, the assembly method 4000 may be applied to liquid crystal displays or to electrowetting displays. For liquid crystal displays the first and second substrates may correspond to portions of an array of liquid crystal modulators, e.g., the active matrix substrate and the color filter plate. The fluid filling step at step 4008 would comprise the filling of the cell with a liquid crystal material. For electrowetting displays the first and second substrates comprise a control matrix substrate and a black matrix substrate, respectively. The fluid filling step at step 4008 would comprise the filling of the cell with one or both of the fluids 278 or 280, described above.

We will turn next to descriptions of FIGS. 15-20 with continued reference to the assembly method 4000. FIGS. 15-20 show a display cell as it is sealed according to the illustrative embodiments. For simplicity of illustration, some features of MEMS display cells, e.g., the MEMS light modulators, light guide, reflective layer, have been omitted from FIGS. 15-20. Details of the construction, operation, and alignment of these features will be understood to include without limitation the features already described with respect to FIGS. 1-10.

Figure 15:
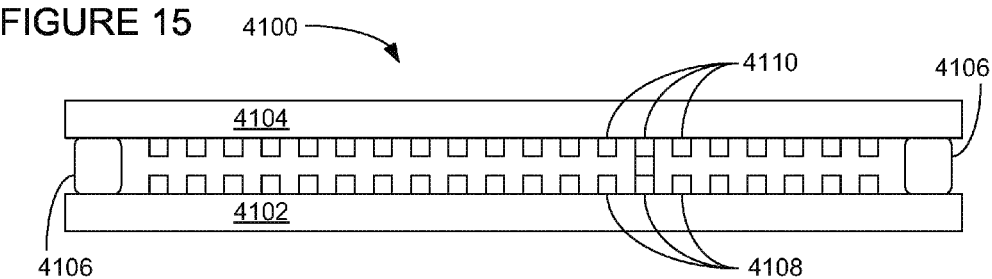
FIG. 15 shows a MEMS display cell, with the aperture plate and the first substrate substantially parallel, according to an illustrative embodiment of the invention.

FIG. 15 shows a MEMS display cell 4100, with the aperture plate and the first substrate substantially parallel. The display cell 4100 comprises a light modulator substrate 4102, a light modulator array (not shown), an aperture plate 4104, and edge seal 4106, and first and second spacers (4108 and 4110) formed on the substrates 4102 and 4104 respectively. The spacers on the first and second substrates may be aligned before the bonding of the edge seal at step 4106. The shape of display cell 4100, shown in FIG. 15, is that which a display cell has prior to sealing. The first substrate and aperture plate may be aligned on a parallel plate bonder at ambient pressure prior to the fluid fill step 4008. The distance between the substrates is determined substantially by the height of the edge seal 4106, and by the spacer materials which are included with the edge seal 4106. The spacers on the aperture plate 4104 and on the substrate 4102 are not in contact.

In order to seal the fluid within the display cell, the display cell is first removed from the fluid fill chamber, at step 4008, at room temperature. Continuing with a description of the method 4000, the equipment holding the displays (e.g., a carrier) is cooled to a temperature in the range of about −15° C. to about −20° C. while keeping the fill hole of each display cell submerged in the working fluid to prevent bubbles from making their way into the display cell gap. In some embodiments, the carrier is cooled to about 0° C., about −5° C., about −10° C., about −15° C., about −25° C., about −30° C., or about −40° C. A cell press is then cooled to about −20° C. (at step 4010), or about 5° C. to about 0° C., or about 0° C. to about −5° C., about −5° C. to about −10° C., about −10° C. to about −15° C., about −20° C. to about −25° C., about −25° C. to about −30° C., about −30° C. to about −35° C., or about −35° C. to about −40° C. In alternate embodiments the cell press can be cooled to any temperature in the range of—about −10° C. to about −25° C. In another embodiment the cell press can be cooled to a temperature below about 0° C. The display is removed from the carrier and placed in the cell press (at step 4012). The cell press is pressurized (i.e., external elastic bladders contacting the outside faces of each substrate are inflated) to a pre-determined pressure above ambient pressure such that the display cell is compressed (step 4014). As the display is compressed, fluid is forced out of the fill hole. The fluid is wiped away and a seal epoxy is dispensed into the fill hole (at step 4016).

While the display cell is still held at the cooled equipment temperature, the seal material within the fill hole is at least partially cured at step 4020. Such a curing can be accomplished by either a chemical reaction between the components of the epoxy, or by applying UV radiation.

Figure 16:
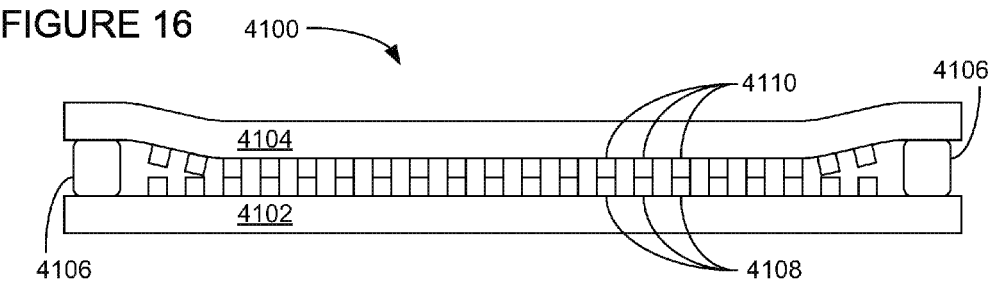

FIGS. 16-19 show display cells under compression during step 4014, according to illustrative embodiments. FIG. 16 shows the shape of the same display cell 4100, from FIG. 15, as it is being compressed by the cell press and as it is being held at the lower temperature. The cell press compresses the cell such that the majority of spacers 4110 on the aperture plate come into contact with the spacers 4108 on the modulator substrate. The remaining spacers that are not in contact will allow for further cell compression, e.g., in response to temperature or pressure changes, which will further reduce the likelihood of vapor bubble formation.

Figure 17:
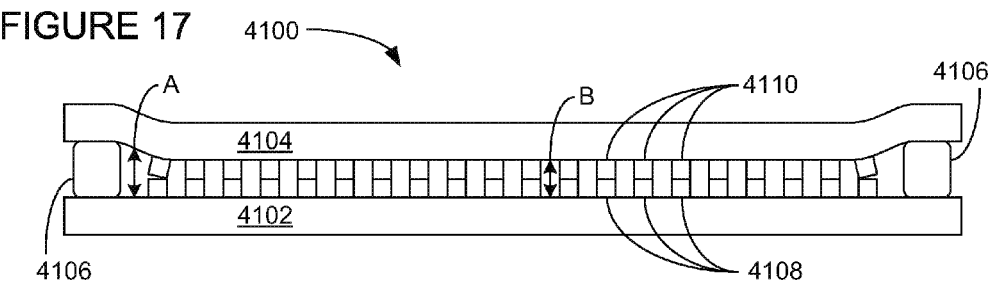

FIG. 17 shows the same display cell 4100 in a condition after it has been further compressed at temperatures below the sealing temperature. The display cell 4100 as illustrated in FIG. 17 comprises two different gaps or separation distances between the substrates 4102 and 4104. In the center of the display assembly the magnitude of the gap is indicated by the marker "B". The separation "B" is established by contact between the spacers in the interior of the display; the separation "B" is substantially the same as the sum of the heights of the spacers 4108 and 4110. At the edge of the display assembly, a different gap, marked "A", has been established by the height of the edge seal 4106. The gap "A" is substantially equal to the height of the edge seal. In embodiments where the seal material 4106 is a composite material, the separation "A" is established by the height of the spacer materials or beads that are included within the edge seal. The height of the gap "A" is preferably in the range of 8 to 14 microns, although cell gaps in the range of 4 to 20 microns can be useful for the purpose. The difference between gaps A and B may be between about 0.5 and 4 microns, such that "B"<"A". Because of the existence of the two cell gaps "A" and "B", the substrates in FIGS. 16 and 17 are no longer flat, but instead are bent or flexed somewhat to accommodate the two different cell gaps.

It is useful to compare the flexures illustrated for display assembly 4100 in the FIGS. 16 and 17. The display assembly 4100 in FIG. 17 is in a relatively more compressed position with respect to the same display assembly in FIG. 16, with a more pronounced flex in the shapes of the substrates 4102 and 4104. Relatively more of the spacers 1408 and 1410 near the edges of the display have come into contact in FIG. 17. Because of the differences in the cell gaps "A" and "B", the display assembly as a whole has been rendered substantially compressible at lower temperatures based on the flexure of the substrates. This cell compressibility is a useful feature for avoiding the formation of vapor bubbles upon changes in environmental temperature.

Figure 18:
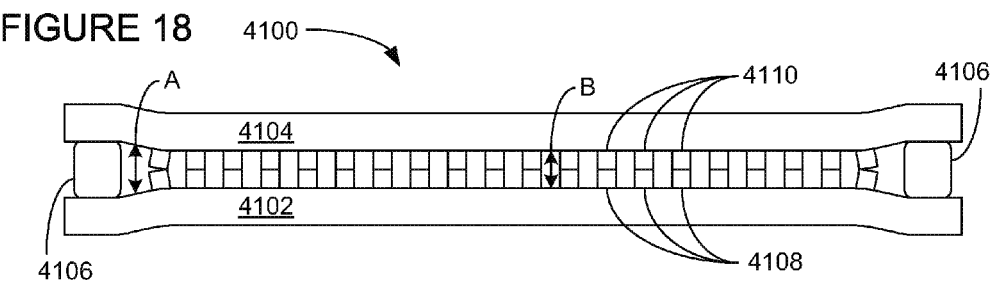

FIG. 18 shows the same display cell 4100 in which the cell is under further compression from the cell pressure or from a colder temperature. Similar to FIG. 17, the display assembly 4100 in FIG. 18 comprises two different cell gaps. The gap height established by the edge seal is greater than that established by the spacers towards the center of the display assembly. In FIG. 18 both substrates 4102 and 4104 are bent or flexed to accommodate the compression at lower temperatures.

Figure 19A:
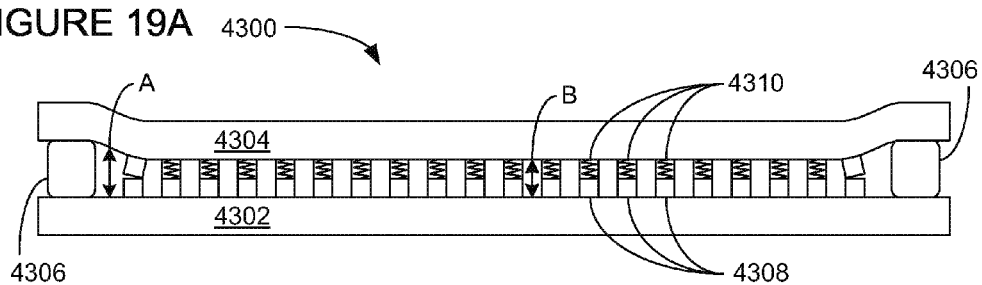
FIG. 19A shows a display assembly, according to an illustrative embodiment of the invention, in which the spacers are made of an elastic material are formed from materials which are chosen for a reduced modulus of elasticity.

FIG. 19A shows a display assembly 4300, according to an illustrative embodiment of the invention, in which the spacers are made of an elastic material, i.e., the spacers 4308 and 4310 are formed from materials which are chosen for a reduced modulus of elasticity. Such spacers are more compressive and elastic, thus allowing for additional cell contraction even after the spacers have come into contact. The spacers' modulus of elasticity may be altered using suitable curing methods. The modulus of elasticity of standard photoresist is about 7-10 GPa, however, if a suitable curing method is used, the modulus of elasticity may be reduced further to allow for some compression but still prevent the aperture plate coming into contact with the MEMS shutter.

Figure 19B:
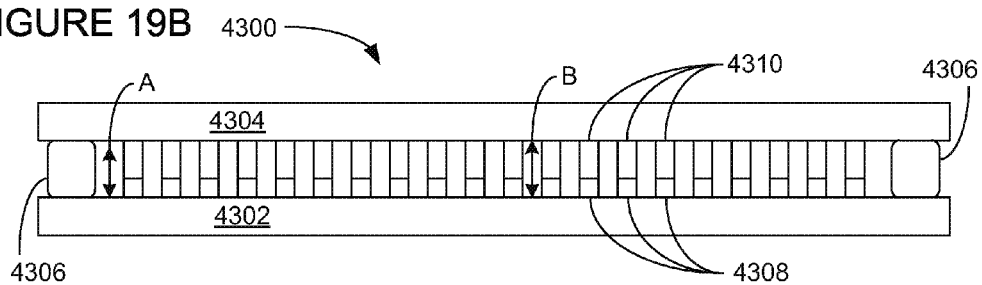
FIG. 19B shows a version of a display assembly under conditions in which the spacers maintain contact with one another even when the cell is allowed to relax at higher temperatures, according to an illustrative embodiment of the invention.

FIG. 19B shows a version of the same display assembly 4300 under conditions in which the spacers maintain contact with one another even when the cell is allowed to relax at higher temperatures. In some embodiments, the spacers may be compressive and elastic, thus allowing for cell contraction when the ambient temperature is lowered or the cell is cooled. For these embodiments or at these temperatures, the height of the spacers 4308 and 4310 on the aperture plate and/or the first substrate can be substantially equal to the height of the edge seal 4306. As described above, the spacers' modulus of elasticity may be altered using any suitable curing method. For these embodiments it is useful when the spacers in the center of the display have compressibility greater than that of the edge seal, such that at lower temperatures a difference in gap exists between the center and edge of the display—as is shown in FIG. 19A.

The display assembly method 4000 provides for compression of the display assembly and the sealing of the display assembly at temperatures substantially below that of room temperature (at least the steps 4012 to 4016.) Substantially below room temperature may be any temperature at least about 15° C. below room temperature, e.g., below about 0° C. After the cell has been sealed, the process of cell assembly is completed by allowing the assembly to return to room temperature. After the display is sealed at step 4016, the cell press is first deflated and depressurized or released (step 4018). The cell retains the shape it was given at the sealing step 4016, because it is sealed and remains under a slight negative pressure. Afterwards, as the cell warms up to room temperature the volume of the fluid increases which will press the first substrate and aperture plate apart. During the warm-up phase, the display cell relaxes into its pre-compression shape. The seal material is at least partially cured for a predetermined time at step 4020. The predetermined time is based at least in part on the time needed for the seal epoxy to wick a particular distance into the cell. The display is allowed to warm to room temperature at step 4022, after which time a final curing step can be applied to the seal material within the fill hole.

Figure 20:
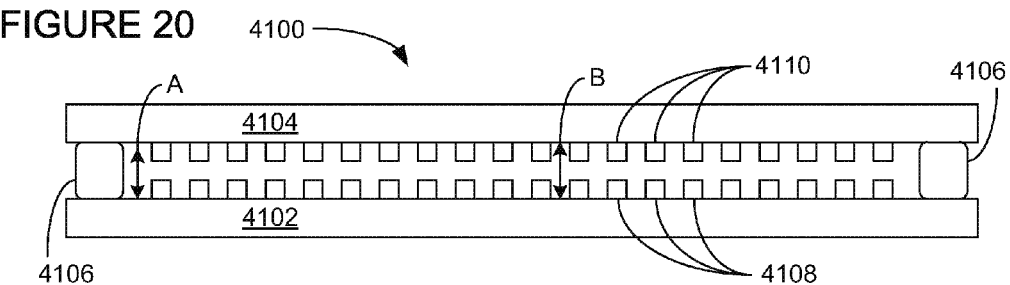
FIG. 20 provides another illustration of display assembly in a condition after the assembly has been released from the press, sealed, and allowed to warm to room temperature, according to an illustrative embodiment of the invention.

FIG. 20 provides another illustration of display assembly 4100 in a condition after the assembly has been released from the press, sealed, and allowed to warm back to room temperature, according to an illustrative embodiment of the invention. The spacers 4108 and 4110 are no longer in contact. The cell gaps at positions A and B are substantially the same height. The fluid within the gap has been allowed to expand without large convex distortions in the shape or flatness of the substrates 4102 or 4104. This flatter shape improves the uniformity of optical properties in the display. In particular the flatter cell shape improves the off-axis contrast performance for the display.

Each of the above described processes for cold sealing a display apparatus may advantageously prevent the formation of vapor bubbles at the expected operating temperatures for the display. For instance, when the ambient temperature around the MEMS display cell decreases, the spacers prevent the MEMS substrates (which may be formed from glass) from making contact even as the fluid contracts further. Furthermore, by performing a cold temperature seal process, vapor bubble formation, which generally occurs at temperatures about 15° C. below the seal temperature, occurs at an even lower temperature.

Working Fluids

As described above, the space between the first and second substrates forms a (cell) gap, which may be filled with fluid, such as a gas, liquid, or a lubricant. Some examples of a working fluid are described above with respect to fluid 530 within display apparatus 500. Further desirable properties of a suitable working fluid are given in Table 2. For example, the fluid should have a low viscosity. Lower viscosities can be facilitated if the liquid or fluid in the display includes materials having molecular weights less than 4000 grams/mole, preferably less than 400 grams/mole.

octane or decane. Useful oils can be nitroalkanes, such as nitromethane. Useful oils can be aromatic compounds, such as toluene or diethylbenzene. Useful oils can be ketones, such as butanone or methyl isobutyl ketone. Useful oils can be chlorocarbons, such as chlorobenzene. And useful oils can be chlorofluorocarbons, such as dichlorofluoroethane or chlorotrifluoroethylene. For use in electrowetting displays, the oils can be mixed with dyes to increase light absorption, either at specific colors such as cyan, magenta, and yellow, or over a broader spectrum to create a black ink.

In some embodiments, it is useful to incorporate mixtures of the above oils or other fluids. For instance mixtures of alkanes or mixtures of polydimethylsiloxanes can be useful where the mixture includes molecules with a range of molecular weights. One can also optimize properties by mixing fluids from different families or fluids with different properties. For instance, the surface wetting properties of a hexamethyldisiloxane and be combined with the low viscosity of butanone to create an improved fluid.

In some embodiments, the working fluid may include, without limitation, alkanes, e.g., octane, heptane, xylenes (i.e., isomers of dimethylbenzene), ionic liquids, divinyl benzene, toluene (also known as methylbenzene or phenylmethane)), alcohols, e.g., pentanol, butanol, and ketones, e.g., methyl ethyl ketone (MEK), or any combination thereof.

In some embodiments, fluids which include carbon, flourine, and oxygen, may be used as the working fluid. Examples

TABLE 2

Desirable properties of the working fluid.

| Parameter or Fluid Property | Units | Desired Property | Motivation |
| --- | --- | --- | --- |
| Appearance | — | colorless | clear liquid |
| Specific gravity at 25° C. | — | <1 | |
| Viscosity at 25° C. | mm$^2$s$^{-1}$ | <1 | less viscous, faster actuation |
| Refractive index | | ~1.5 | match glass or plastic substrate |
| Freeze point | ° C. | <−40 | Allow for lower operating temperatures |
| Boiling point at 760 mmHg | ° C. | >100 | Less likely to form bubbles at elevated temperatures/reduced pressures |
| CTE | /° C. | <0.002 | packaging at colder temperatures |
| Dielectric constant relative to vacuum | — | >2 | Higher givers better performance |
| Dielectric strength | V/mil | >300 | Less likely to break down |
| Vapor pressure at 25° C. | Torr | <25 | In combination with higher boiling point, likely to lead to less bubble formation |
| Vapor pressure at 85° C. | Torr | <500 | In combination with higher boiling point, likely to lead to less bubble formation |
| Conductivity | S/cm | <10$^{-9}$ | |

In addition, it is desirable for the fluid to have high purity, only small viscosity changes with temperature, and low reactivity with a seal epoxy, and to be inflammable.

Suitable low viscosity fluids include water, alcohols, fluorinated silicone oils, polydimethylsiloxane, hexamethyldisiloxane, octamethyltrisiloxane, octane, diethylbenzene, perfluorocarbons, hydrofluoroethers, or any combination thereof. Suitable low viscosity non-polar oils include, without limitation, paraffins, olefins, ethers, silicone oils, fluorinated silicone oils, or other natural or synthetic solvents or lubricants. Useful oils can be polydimethylsiloxanes, such as hexamethyldisiloxane and octamethyltrisiloxane, or alkyl methyl siloxanes such as hexylpentamethyldisiloxane, or any combination thereof. Useful oils can be alkanes, such as of such fluids include fluoroketone, hydrofluoroether, ethoxy-nonafluorobutane, ethyl nonafluorobutyl ether, fluorobutane, fluorohexane, and 2-trifluoromethyl-3-ethoxydodecofluorohexane.

In some embodiments, a blend of perfluorocarbons and/or hydrofluoroethers may be used to create an improved fluid. Perfluorocarbons include FLOURINERT Electronic Liquid FC-84, while hydrofluoroethers include NOVEC 7200 Engineering Fluid or NOVEC 7500 Engineering Fluid (all manufactured by and registered marks of 3M). Examples of suitable blends are shown in Table 3. Those skilled in the art will come to realize that other blend compositions may be suitable as the working fluid.

TABLE 3

Illustrative blends of suitable perfluorocarbons and hydrofluoroethers.

|  | NOVEC 7200 | NOVEC 7500 | FC-84 |
|---|---|---|---|
| BLEND 1 | about 79% | about 21% | — |
| BLEND 2 |  | about 58% | about 42% |
| BLEND 3 | about 85% | about 15% | — |

The invention may be embodied in other specific forms without departing from the spirit or essential characteristics thereof. The forgoing embodiments are therefore to be considered in all respects illustrative, rather than limiting of the invention.

What is claimed is:

1. A method for manufacturing a display assembly including a first transparent substrate and a second transparent substrate comprising:
    providing at least a portion of an array of light modulators on the second transparent substrate;
    providing a plurality of spacers connected to the first and second transparent substrates to establish a first gap between the first and second transparent substrates;
    providing an adhesive edge seal for bonding the perimeter of the first and second transparent substrates;
    filling the display assembly with a fluid at a first temperature;
    cooling the display assembly to a second temperature substantially below the first temperature;
    compressing the display assembly thereby pushing the first and second transparent substrates at least partially together; and
    curing a seal material to seal the fluid between the first and second transparent substrates.

2. The method of claim 1, wherein compressing the display assembly is performed at the second temperature.

3. The method of claim 1, wherein the plurality of spacers maintain at least the first gap between the first and second transparent substrates.

4. The method of claim 1, wherein the adhesive edge seal maintains the edges of the first and second transparent substrates separated by a second gap.

5. The method of claim 1, wherein the adhesive edge seal includes at least one edge spacer.

6. The method of claim 1, further comprising applying the seal material to a fill hole located along an edge of the display assembly after the display assembly is filled and before the display assembly is returned to room temperature.

7. The method of claim 6, wherein the fill hole comprises an opening in the adhesive edge seal.

8. The method of claim 1, wherein the first temperature is substantially room temperature.

9. The method of claim 1, wherein the first temperature is between about 18° C. and about 30° C.

10. The method of claim 1, wherein the second temperature is below about 0° C.

11. The method of claim 1, wherein the curing the seal material occurs at a temperature below about 0° C.

12. The method of claim 1, wherein the second temperature is between about −10° C. and −25° C.

13. The method of claim 1, wherein the fluid comprises a hydrofluoroether liquid.

14. The method of claim 1, wherein the fluid comprises a liquid blend of at least one perfluorocarbon and at least one hydrofluoroether.

15. The method of claim 1, wherein the light modulators are MEMS light modulators.

16. The method of claim 1, wherein filling the display assembly is performed via a fill hole such that the fluid substantially surrounds movable portions of the light modulators at the first temperature.

17. The method of claim 1, further comprising providing at least one MEMS light modulator the first transparent substrate.

18. The method of claim 1, further comprising forming the plurality of spacers on at least one of the first and second transparent substrates.

19. The method of claim 1, wherein the plurality of spacers have an elastic property that allows for compressing the display assembly at the second temperature.

20. The method of claim 1, wherein the plurality of spacers maintain at least the first gap between the first and second transparent substrates, wherein the adhesive edge seal maintains the edges of the first and second transparent substrates separated by a second gap, and wherein the height of the second gap is greater than the height of the first gap.

21. The method of claim 20, wherein the height of the second gap is larger than the height of the first gap by between about 0.5 micron and about 4 microns.

22. The method of claim 20, wherein the height of the second gap is between about 8 microns and about 14 microns.

23. A method for manufacturing a display assembly including a first transparent substrate and a second transparent substrate comprising:
    providing at least a portion of an array of light modulators on the second transparent substrate;
    providing a plurality of spacers connected to the first and second transparent substrates to establish a first gap between the first and second transparent substrates;
    providing an adhesive edge seal for bonding the perimeter of the first and second transparent substrates;
    compressing the display assembly thereby pushing the first and second transparent substrates at least partially together, wherein the compressing occurs at a temperature substantially below room temperature; and
    curing a seal material to seal a fluid between the first and second transparent substrates.

24. The method of claim 23, wherein room temperature is between about 18° C. and about 30° C.

25. The method of claim 23, wherein substantially below room temperature is below about 0° C.

26. The method of claim 23, wherein substantially below room temperature is between about −10° C. and about −25° C.

27. The method of claim 23, wherein the curing of the seal material at least partially occurs at the temperature substantially below room temperature.

28. The method of claim 23, wherein the plurality of spacers have an elastic property that allows for compressing the display assembly at the second temperature.

29. The method of claim 23, wherein the plurality of spacers maintain at least the first gap between the first and second transparent substrates, wherein the adhesive edge seal maintains the edges of the first and second transparent substrates separated by a second gap, and wherein the height of the second gap is greater than the height of the first gap.

30. The method of claim 29, wherein the height of the second gap is larger than the height of the first gap by between about 0.5 micron and about 4 microns.

31. The method of claim 29, wherein the height of the second gap is between about 8 microns and about 14 microns.

32. A display apparatus comprising:
a first transparent substrate;
a second transparent substrate including at least a portion of an array of light modulators and separated from the first transparent substrate by at least a first gap;
a plurality of spacers connected to the first and second transparent substrates to maintain the first gap;
an adhesive edge seal to maintain the edges of the display apparatus separated by at least a second gap, wherein the height of the second gap is greater than the height of the first gap;
a fluid contained within the first gap; and
a cured seal material to seal the fluid in the first gap.

33. The apparatus of claim 32, further comprising a fill hole, wherein the fill-hole comprises an opening in the adhesive edge seal.

34. The apparatus of claim 32, wherein the fluid comprises a hydrofluoroether liquid.

35. The apparatus of claim 32, wherein the fluid comprises a liquid blend of at least one perfluorocarbon and at least one hydrofluoroether.

36. The apparatus of claim 32, wherein the light modulators are MEMS light modulators.

37. The apparatus of claim 36, wherein the MEMS light modulators comprise shutter-based light modulators.

38. The apparatus of claim 36, wherein the MEMS light modulators comprise electrowetting light modulators.

39. The apparatus of claim 32, wherein the light modulators comprise liquid crystal modulators.

40. The apparatus of claim 32, wherein the first transparent substrate includes an additional portion of an array of light modulators.

41. The apparatus of claim 32, wherein the plurality of spacers are fabricated on one of the first and second transparent substrates.

42. The apparatus of claim 32, wherein the first transparent substrate comprises one of a color filter array or an aperture layer formed thereon.

43. The apparatus of claim 32, wherein the height of the second gap is larger than the height of the first gap by between about 0.5 micron and 4 microns.

44. The apparatus of claim 32, wherein the height of the second gap is between about 8 microns and 14 microns.

45. The apparatus of claim 32, wherein the adhesive edge seal is an epoxy seal.

46. The apparatus of claim 45, wherein the epoxy seal is curable using an ultraviolet light source.

47. The apparatus of claim 45, wherein the adhesive edge seal includes at least one edge spacer.

48. The apparatus of claim 32, wherein the plurality of spacers have an elastic property that allows the spacers to maintain the first gap.

49. A display apparatus comprising:
a first substrate;
a second substrate including one or more MEMS devices and separated from the first substrate by at least a first gap; and
a fluid including at least one of a perfluorocarbon and a hydrofluoroether, wherein the fluid is contained within the first gap and at least partially in contact with the one or more MEMS devices.

50. The display apparatus of claim 49, comprising a plurality of spacers connected to the first and second substrates to maintain the first gap.

51. The display apparatus of claim 50, comprising an adhesive edge seal to maintain the edges of the display apparatus separated by at least a second gap, wherein the height of the second gap is greater than the height of the first gap.

52. The display apparatus of claim 51, wherein the one or more MEMS devices include a light modulator.

* * * * *